United States Patent
Carriere et al.

(10) Patent No.: US 8,131,555 B1
(45) Date of Patent: Mar. 6, 2012

(54) SYSTEM AND METHOD FOR FUNNELING USER RESPONSES IN AN INTERNET VOICE PORTAL SYSTEM TO DETERMINE A DESIRED ITEM OR SERVICE

(75) Inventors: Steven Jeromy Carriere, Mountain View, CA (US); Kelly James Slough, San Mateo, CA (US); Steven Gregory Woods, Mountain View, CA (US)

(73) Assignee: AOL Inc., Dulles, VA (US)

( * ) Notice: Subject to any disclaimer, the term of this patent is extended or adjusted under 35 U.S.C. 154(b) by 760 days.

(21) Appl. No.: 09/531,743

(22) Filed: Mar. 21, 2000

(51) Int. Cl.
*G10L 21/00* (2006.01)
*G10L 17/00* (2006.01)
*G06F 7/00* (2006.01)
*G06Q 30/00* (2006.01)

(52) U.S. Cl. .............. 704/270.1; 704/246; 707/708; 705/26.1

(58) Field of Classification Search .............. 705/26; 340/517; 704/1
See application file for complete search history.

(56) References Cited

U.S. PATENT DOCUMENTS

| | | | | |
|---|---|---|---|---|
| 4,659,877 A | | 4/1987 | Dorsey et al. ............... 379/88 |
| 4,716,583 A | | 12/1987 | Groner et al. ............... 379/88 |
| 5,696,962 A | | 12/1997 | Kupiec | |
| 5,749,072 A | * | 5/1998 | Mazurkiewicz et al. ..... 704/275 |
| 5,758,322 A | * | 5/1998 | Rongley ............... 704/275 |
| 5,799,063 A | | 8/1998 | Krane ............... 379/67 |
| 5,819,220 A | * | 10/1998 | Sarukkai et al. .......... 704/270.1 |
| 5,862,325 A | | 1/1999 | Reed et al. | |
| 5,884,262 A | * | 3/1999 | Wise et al. ............... 704/270.1 |
| 6,026,393 A | | 2/2000 | Gupta | |
| 6,101,472 A | * | 8/2000 | Giangarra et al. ............ 704/270 |
| 6,272,455 B1 | * | 8/2001 | Hoshen et al. ............... 704/1 |
| 6,282,272 B1 | * | 8/2001 | Noonen et al. ............ 379/93.05 |
| 6,311,182 B1 | * | 10/2001 | Colbath et al. ............... 379/900 |
| 6,335,928 B1 | * | 1/2002 | Herrmann et al. ........... 370/352 |
| 6,349,132 B1 | * | 2/2002 | Wesemann et al. ....... 379/88.01 |
| 6,400,806 B1 | * | 6/2002 | Uppaluru ................... 379/88.02 |
| 6,401,085 B1 | * | 6/2002 | Gershman et al. ................ 705/2 |
| 6,615,172 B1 | * | 9/2003 | Bennett et al. ............... 704/257 |
| 6,807,574 B1 | * | 10/2004 | Partovi et al. ............... 709/224 |
| 2001/0033564 A1 | * | 10/2001 | Hickman ................... 370/352 |
| 2002/0107838 A1 | * | 8/2002 | Tsai ............................ 707/3 |
| 2004/0117189 A1 | * | 6/2004 | Bennett ................. 704/270.1 |

FOREIGN PATENT DOCUMENTS

EP     0 952 539 A     10/1999

(Continued)

OTHER PUBLICATIONS

Voice eXtensible Markup Language; VoiceXML version 1.0; W3C note May 5, 2000; http://www.w3.org/TR/2000/Note-voicexml-20000505.

U.S. Appl. No. 09/532,802, filed Mar. 21, 2000, entitled System and Method for Voice Access to Internet-Based Information.

(Continued)

*Primary Examiner* — Mussa Shaawat

(74) *Attorney, Agent, or Firm* — Michael A. Glenn; Glenn Patent Group

(57) ABSTRACT

A method of funneling user responses in a voice portal system to determine a desired item or service includes (a) establishing an attribute value associated with a particular attribute of a desired item or service and (b) determining if the attribute value satisfies an end state. If the end state is not satisfied, steps (a) and (b) are performed with a new particular attribute.

3 Claims, 38 Drawing Sheets

FOREIGN PATENT DOCUMENTS

| | | |
|---|---|---|
| WO | WO 99/27742 A1 | 6/1999 |
| WO | WO 9946920 A | 9/1999 |

OTHER PUBLICATIONS

U.S. Appl. No. 09/532,509, filed Mar. 21, 2000, entitled System and Method for Using Voice Over a Telephone to Access, Process, and Carry Out Transactions Over the Internet.

U.S. Appl. No. 09/531,952, filed Mar. 21, 2000, entitled System and Method for Determining if One Web Site has the Same Information as Another Web Site.

U.S. Appl. No. 09/531,951, filed Mar. 21, 2000, entitled System and Method for Advertising with an Internet Voice Portal.

U.S. Appl. No. 09/531,950, filed Mar. 21, 2000, entitled System and Method for Non-Programming Development of Rules Used in the Transformation of Web-Based Information.

U.S. Appl. No. 09/531,949, filed Mar. 21, 2000, entitled System and Method for the Transformation and Canonicalization of Semantically Structured Data.

PCT Search Report for PCT/US01/08749; 2 pages; Nov. 9, 2002.

Villarino M., Elias J., and Gronner S.: "Lucent Technologies, Sun Microsystems and 1Planet"t! plan solution to keep the mobile owrker net-connected"; http://www.sun.com/smi/press/sunflash/2000-02/sunflash.20000228.2.html, Feb. 28, 2000; XP002211610.

Billsus D. et al.: A personal news agent that talks, learns and explains; Proceedings of the 3rd International Conference on Autonomous Agents, Proceedings of the Association for Computing Machinery International Conference on Autonomous Agents, Seattle, WA, USA, May 1-5, 1999, pp. 268-275, XP002211611, 1999, New York, NY, USA; ISBN: 1-58113-066-X.

\* cited by examiner

SYSTEM AND METHOD FOR FUNNELING USER RESPONSES IN AN INTERNET VOICE PORTAL SYSTEM TO DETERMINE A DESIRED ITEM OR SERVICE

BACKGROUND OF THE INVENTION

The present invention relates generally to the Internet. More particularly, the present invention relates to a system and method for funneling user responses in an Internet voice portal system as to determine a desired item or service.

The Internet has developed into a medium by which a person using a computer connected to the Internet can access voluminous amounts of information. The ability to access information via the Internet can be provided in a variety of different ways. Sometimes information is provided by Internet search engines, which typically search the Internet for key words or phrases and then provide a list of web sites which include the search words or phrases in the web page, such as, its text or embedded identifiers (e.g., metatags). Information is also accessible via the Internet by individual web sites. Individual web sites provide a wide variety of information and services which are both time-critical and not time dependent.

The Internet is especially conducive to conducting electronic commerce. Many Internet servers have been developed through which vendors can advertise and sell their products or services. Such products or services may include items (e.g., music) that are delivered electronically to the purchaser over the Internet and items (e.g., books) that are delivered through conventional distribution channels (e.g., a common carrier). The services can include providing information (e.g., weather, traffic, movies, cost comparisons) that is available over the Internet and transactions (e.g., stock trading, restaurant reservations) that are carried out over the Internet.

Unfortunately, while the Internet provides users with the potential to access a tremendous amount of information, finding useful Internet-based information is often time-consuming and cumbersome. Further, it is difficult to find and compare the same information available at multiple individual web sites because the same information can be organized in many different ways, described in many different forms, and changed at many different times. Added to these inherent difficulties with the Internet is the simple fact that a person cannot access the information available on the Internet without having a computer or other such electronic device which is connected to the Internet via an Internet Service Provider (ISP). Furthermore, to effectively find desired Internet-based information, a person must learn how to locate information via the Internet. As such, persons without computers, people without connections to ISPs, and people without experience or training on use of the Internet are limited from access to Internet-based information. These factors contribute to reasons why industry experts estimate that by the end of 1999, only 30% of the United States population has ever accessed the Internet, or "surfed the web." (Statistics from Forrester Research, October 1999).

Hence, it is desirable to provide a system and method by which people can access Internet-based information without directly using a computer, having a personal ISP connection, or gaining experience or training on use of the Internet. In addition, it is desirable to provide a system and method which allows people to obtain Internet-based information using convenient and readily available means, such as, by way of voice over a public telephone. Further, it is desirable to provide a system and method which funnels user responses in an Internet voice portal system as to accurately and quickly determine a desired item or service.

Many challenges have heretofore made such a system and method impossible. For example, people using such a system and method would want to have the information quickly or, at least, within some tolerable amount of time. Such speed is difficult. Even with conventionally high speed computers and fast communication connections, the delay required to access the Internet has made many people call it the "world wide wait." Another challenge to such a system and method is the recognition of voice communications. Conventional voice recognition technology is slow and inaccurate. Convenient and meaningful access to Internet-based information by voice would require simple, quick, and accurate voice recognition. Nevertheless, known processors and memory devices do not allow quick access to the large vocabularies and processing speeds which would be necessary for voice recognition as done in human-to-human interaction.

Yet another challenge to such a system and method is how to provide free access to Internet-based information while financially supporting the service. Conventional advertising on the Internet requires the ability to see advertising information, such as "banners", and make some manual selection, such as "clicking" the banner, to get more information on the advertised product or service.

Therefore, in addition to the above-mentioned capabilities, it is desirable to provide a system and method by which people can gain quick and accurate voice access to Internet-based information free of charge. It is further desirable to provide a system and method by which people can communicate with accurate and fast voice recognition capabilities.

BRIEF SUMMARY OF THE INVENTION

One aspect of an embodiment of the invention is a method of funneling user responses in a voice portal system to determine a desired item or service. The method includes (a) establishing an attribute value associated with a particular attribute of a desired item or service and (b) determining if the attribute value satisfies an end state. If the end state is not satisfied, steps (a) and (b) are performed with a new particular attribute.

Briefly, another aspect of an embodiment of the invention is a system for funneling voice portal user responses to determine a desired item or service. The system includes a user interface and a database coupled to the user interface. The user interface coordinates communications with a user. The database stores information regarding attributes, attribute vocabulary sets, and Internet-based information. The user interface establishes an attribute value associated with a particular attribute of a desired item or service and determines if the attribute value identified satisfies an end state.

Briefly, another aspect of an embodiment of the invention is a voice portal configured to funnel user responses to determine a desired item or service. The voice portal includes means for establishing an attribute value associated with a particular attribute of a desired item or service and means for determining if the attribute value satisfies an end state.

Briefly, another aspect of an embodiment of the invention is a computer program product including computer readable program code for identifying user inputs to a voice portal system. The program code in the computer program product includes first computer readable program code for establishing an attribute value associated with a particular attribute of a desired item or service and second computer readable program code for determining if the attribute satisfies an end state. The end state signifies the identification of a user-desired item or service.

Other principle features and advantages of the present invention will become apparent to those skilled in the art upon review of the following drawings, the detailed description, and the appended claims.

BRIEF DESCRIPTION OF THE DRAWINGS

The invention is illustrated by way of example and not limitation in the figures of the accompanying drawings, in which like references indicate similar elements and in which.

DETAILED DESCRIPTION OF EXEMPLARY EMBODIMENTS

Figure 1:
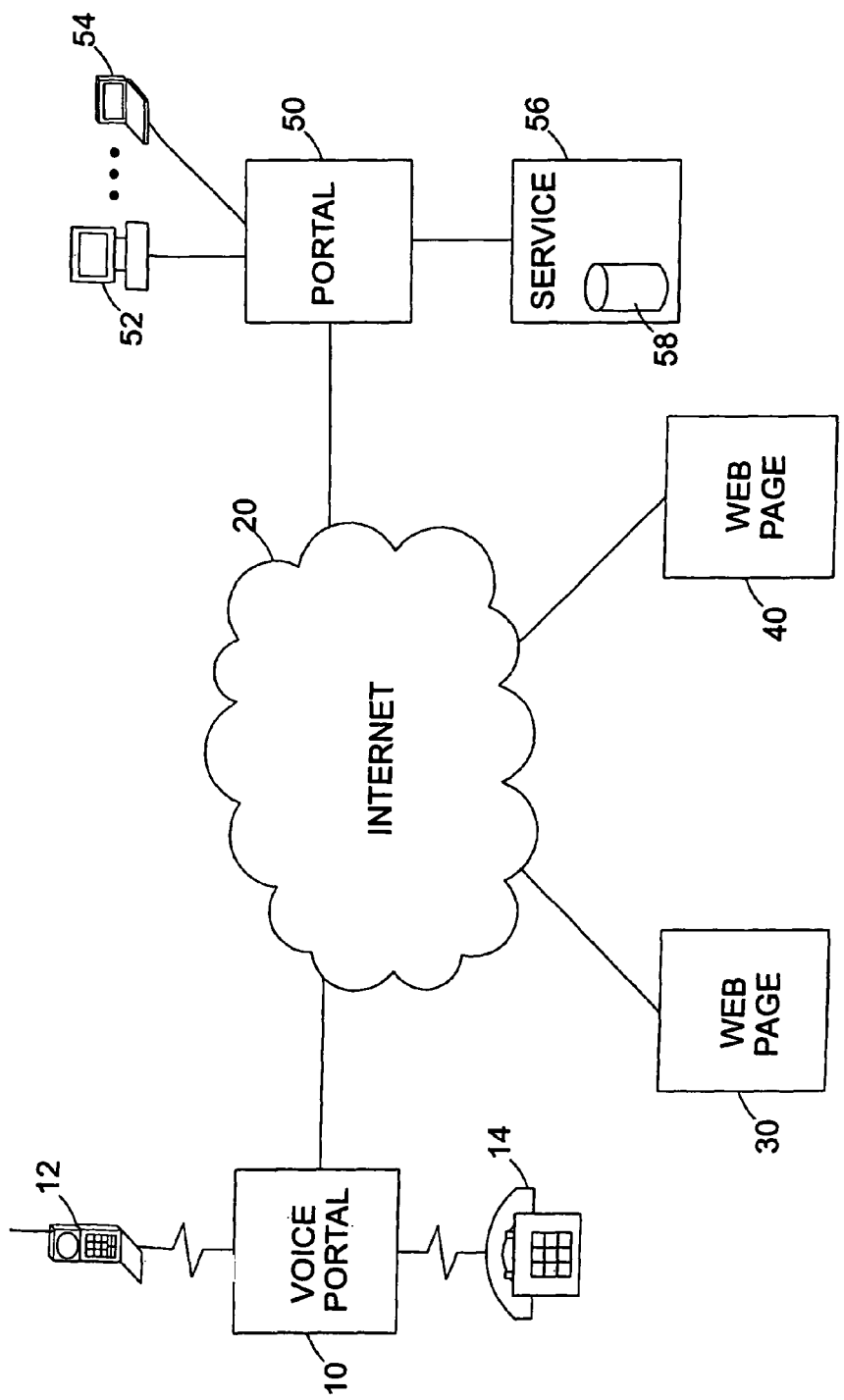
FIG. 1 is a general diagrammatical representation of a voice portal connected to the Internet.

A system and method for funneling user responses in an Internet voice portal system as to accurately and quickly determine a desired item or service are described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description of the preferred embodiments of the present invention.

One aspect of an exemplary embodiment of the present invention includes a system for funneling voice portal user responses to determine a desired item or service. The system includes a user interface and a database coupled to the user interface. The user interface coordinates communications with a user. The database stores information regarding attributes, attribute vocabulary sets, and Internet-based information. The user interface establishes an attribute value associated with a particular attribute of a desired item or service and determines if the attribute value satisfies an end state. If the end state is not satisfied, steps (a) and (b) are performed with a new particular attribute. The user interface may establish an attribute value by establishing an attribute vocabulary set related to a particular attribute of a desired item or service, querying the user for an attribute value associated with the particular attribute, and identifying the attribute value given by the user. The user interface may establish an attribute value by assigning a user preference to that value.

Another aspect of an embodiment of the present invention is related to a system which provides voice access to Internet-based information. Another aspect of an embodiment of the present invention is related to a system and method for using voice over telephone to access, process, and carry out transactions over the Internet. Yet another aspect of an embodiment of the present invention is related to a system and method for determining if one web site has the same information as another web site. Even yet another aspect of an embodiment of the present invention relates to a system and method for advertising using an Internet voice portal. Still yet another aspect of an embodiment of the present invention relates to a system and method for non-programming development of rules used in the transformation of Internet-based information. Another aspect of an embodiment of the present invention is related to a system and method for the transformation and canonicalization of systematically structured data.

In one embodiment, a computer system is used which has a central processing unit (CPU) that executes sequences of instructions contained in a memory. More specifically, execution of the sequences of instructions causes the CPU to perform steps, which are described below. The instructions may be loaded into a random access memory (RAM) for execution by the CPU from a read-only memory (ROM), a mass storage device, or some other persistent storage. In other embodiments, hardwired circuitry may be used in place of, or in combination with, software instructions to implement the present invention. Thus, the embodiments described herein are not limited to any specific combination of hardware circuitry and software, nor to any particular source for the instructions executed by the computer system.

FIG. 1 illustrates a connection between a voice portal 10 and a network 20. In an exemplary embodiment, network 20 is the Internet, a worldwide network of computer networks that use the TCP/IP network protocols to facilitate data transmission and exchange. In alternative embodiments, network 20 is any type of network, such as, a virtual private network (VPN). Network 20 preferably provides communication with Hypertext Markup Language (HTML) Web pages 30 and 40. Web pages 30 and 40 include a variety of data on a variety of Web servers. Network 20 also provides communication with non-voice portal 50 which couples computers 52 and 54 and a service 56 including a database 58 to network 20. Service 56 is any type of company, content or service provider with a connection to network 20. Database 58 is a storage medium for data and may be an optical, magnetic, or any other suitable storage medium.

Generally, voice portal 10 is implemented as a network of servers. Servers can be configured by software. Preferably, the servers include a significant amount of read/write memory including disc drives and other storage. In general, users access voice portal 10 via telephones, such as, a cell phone 12 or a standard telephone 14 by calling a telephone number (using the plain old telephone service (POTS)) which initiates communication between the telephones and voice portal 10. Alternatively, other types of telephone service can be utilized to communicate voice or voice data to portal 10. The portal 10 can be connected to telephones 12 and 14 via a variety of lines, networks, and stations. Advantageously, voice portal 10 provides for voice communication with the user. Voice portal 10 allows the user access to information and services from web pages 30 and 40 as well as other sources available via network 20. Such access is provided in a quick and efficient way by voice portal 10 continually retrieving, organizing, and storing information from a variety of web sites and Internet services. Other user interface platforms may also be provided for using voice portal 10. Such user interface platforms include, for example, WAP (wireless application protocol) and web interfaces.

Figure 2:
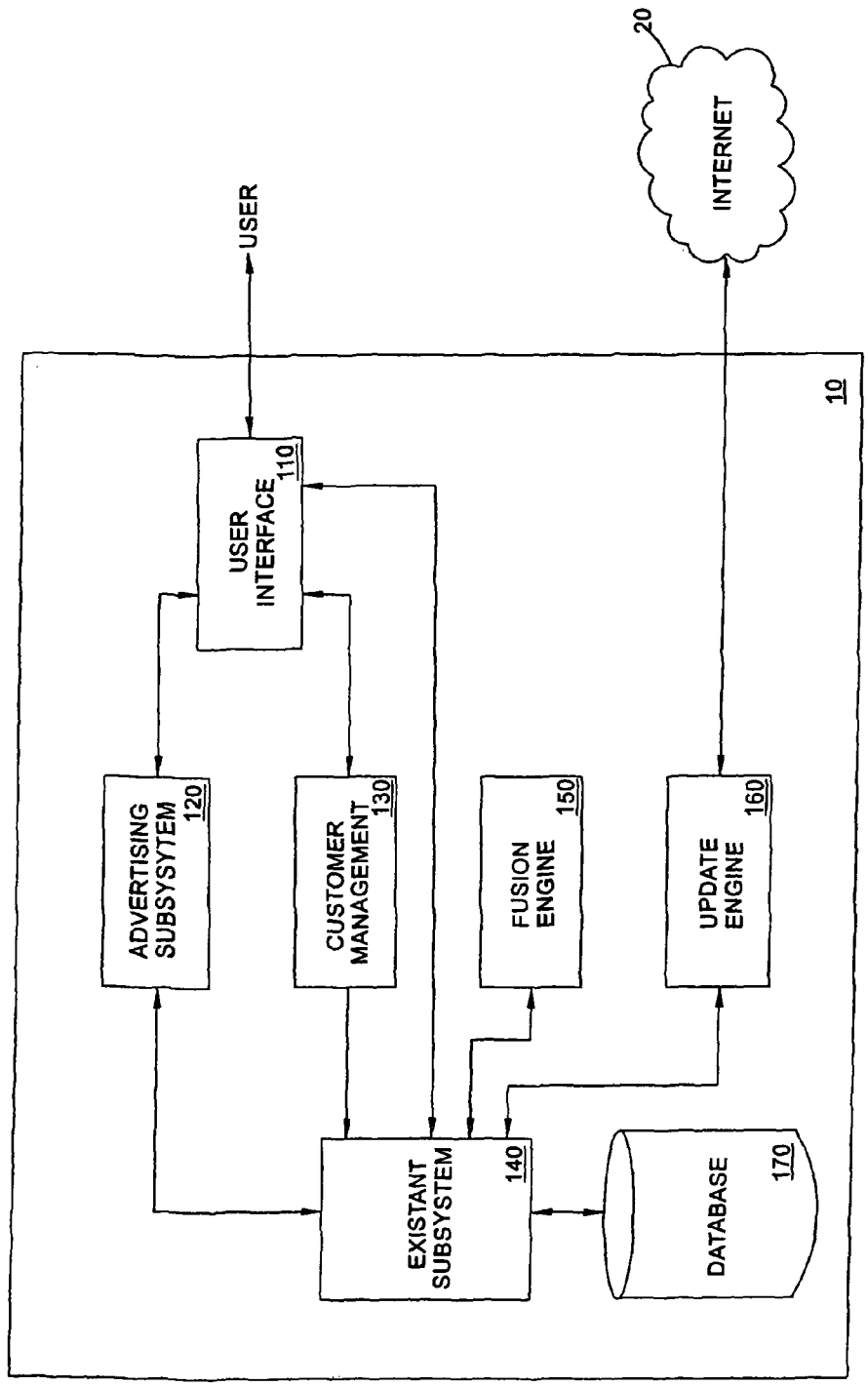
FIG. 2 is a general functional block diagram of an exemplary functional embodiment of the voice portal of FIG. 1.

FIG. 2 illustrates exemplary functional operations carried out by voice portal 10. These functions may be carried out in any variety of ways, including any number of physical structures. In an exemplary embodiment, voice portal 10 includes a user interface 110, an advertising subsystem 120, a customer management subsystem 130, an existant subsystem 140, a fusion engine 150, an update engine 160, and a database 170.

Figure 4:
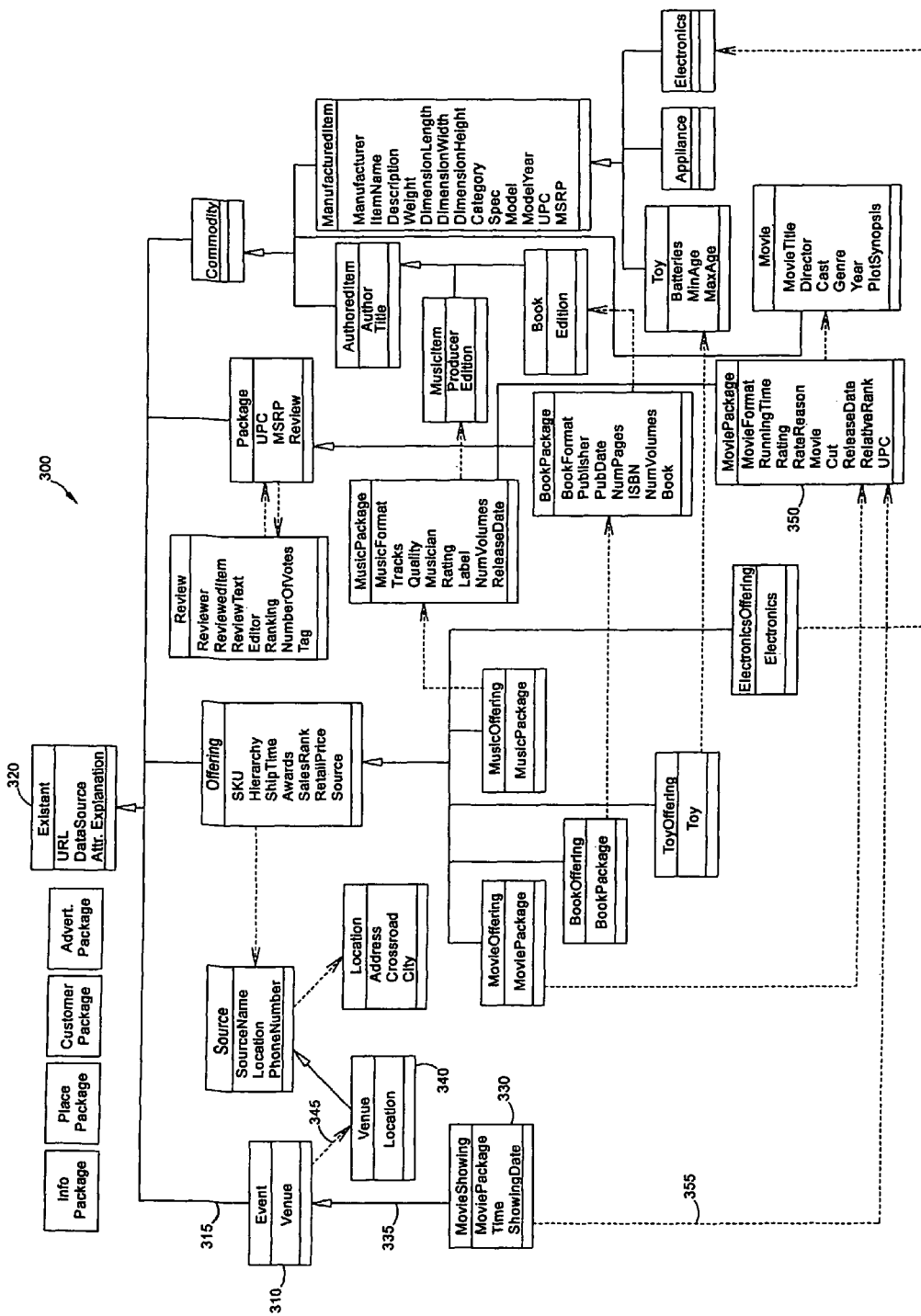
FIG. 4 is a diagrammatical representation of an exemplary data structure model used by the voice portal of FIG. 1.

User interface 110 coordinates voice communications between voice portal 10 and the user. User interface 110 can be either via speech, via the Internet or "world wide web" (WWW), via a wireless application protocol (WAP) interface, or any other platform interface. In an exemplary embodiment, user interface is speech oriented. In such a speech oriented embodiment, user interface 110 uses word-based automatic speech recognition (ASR) for accepting user input wherever possible. User interface 110 can use a speech recognition software package, such as, Speech Works provided by Speech Works International of Boston, Mass. For high rates of speech recognition, user interface 110 advantageously utilizes a funneling process which funnels user response to a set of recognizable answers. Funneling is described further with reference to FIG. 34. User interface 110 also uses spelling-based ASR for accepting user input when word-based ASR is not possible. Finally, user interface 110 uses keypad entry for accepting user input only when advantageous to user. The key entry utilizes the keys on telephones 12 and 14 (FIG. 4).

In an exemplary embodiment, user interface 110 performs one or more of the following tasks: (1) Identify a user with a phone number and other user-specific information. (2) Start a new session for a given user on a given platform. (3) Add a new interaction for a given user on a given platform. (4) Update a user's preference within the set of vertical domains of interest available in voice portal 10. (5) Enable or disable user preferences for that vertical domain of interest. (6) Update a user's expertise level either generally or within a specific vertical. (7) Update a user's demographic or personal information (as well as credit card information). (8) Update a user's session state with user interface-specific information. (9) Add a new credit card to the database. (10) Update an existing credit card with new information. (11) Identify a credit card with the credit card type and number and check if it is in the database already. (12) Set the list of vertical domains available to the user and its order. (13) End a user's session normally. (14) Notify customer management subsystem 130 that the user's session abnormally terminated into some defined status (e.g., call dropped, session timeout). (15) Determine the most recent session of a user given a certain platform, such that it is possible to resume a session if a session was abnormally terminated (e.g., dropped call, session time-out), and return the session state that was stored. User interface 110 can perform additional functions related to identification, session, user, and payment protocols.

Advertising subsystem 120 coordinates activities related to the advertisements to be presented to the user during a communication session. In an exemplary embodiment, advertising subsystem 120 includes advertisements, such as, sponsored advertisements, advertisements targeted to particular users, and permission-based advertisements which are presented only after an affirmative request from the user. In an exemplary embodiment, advertising subsystem 120 provides one or more of functions: (1) Choose an advertisement to play based on the user, session, location, content and item being explored. (2) Record that an advertisement was played and if it was completed or not. (3) Record that a speak-through (i.e., as described below, an advertisement where the user selectively chooses to hear more on an advertised subject) was made. (4) Store customer and session information within a bean so that repeated database calls are not needed. (5) Create a record for a company that provides advertisements, and be able to identify one. (6) Create an advertisement and an advertisement's contract to be stored in the database (as an advertisement may have different contracts for usage on the system). (7) Create a new sales employee or employer contact for Advertising sales purposes. (8) Update an advertisement and/or the contract of that advertisement. (9) Update an advertisement company to change contact information and address information. (10) Update sales employees and employer contacts. (11) Place/remove an advertisement in/from the active list. (12) Mark the advertisement's contract to be completed or incomplete based on external information. (13) Display a list of active advertisements based on the advertisement type. (14) Display a list of advertisements relating to a company based on criteria of either inactive, active, incomplete, complete or simply all the advertisements. (15) Display a list of contracts relating to an advertisement based on the above criteria. (16) Display a list of contracts relating to a sales' employee based on the above criteria. (17) Retrieve the completed listing of an employee, company, advertisement or advertisement contract by simply passing in a unique identifier. (18) Search the database for near string matches of employee, company, advertisement and advertisement contract existants. (19) Keep track of the deliveries paid for a company on a specific contract and be able to update the outstanding balance of the company. (20) Search the update logs to make sure that no data integrity errors are present. (21) Create and modify a playlist needed to store advertisements for a specific genre.

A variety of different methods may be used to carry out each of these operations. Advertising operations are described further with reference to FIG. 36. Advertising subsystem 120 can perform additional functions related to identification, session, user, and payment protocols. The advertising techniques disclosed herein can also be used with a conventional personal computer (PC) interface web connection.

Customer management subsystem 130 coordinates the management of information related to the user and the users' use of voice portal 10. In an exemplary embodiment, customer management subsystem 130 acquires information on the user, such as, preferences and demographics, which are selectively used by user interface 110, advertising subsystem 120, and other functions of voice portal 10. Customer management subsystem 130 can perform additional functions related to identification, session, user, and payment protocols. Although subsystem 110, 120 and 130 are described separately, the operations of each can be integrated in a single unit without departing from the principles of the invention.

User Interface (UI) 110 and customer management subsystem 130 interact to provide for the selection of vertical domains and the access of Internet-based information. Vertical domains categorize various fields or areas from which a user may select within voice portal 10. In order for UI 110 to communicate effectively with a user, certain preferences and user facts must be ascertained and understood either passively or actively. Customer management subsystem 130 stores such information into database 170. Alternatively, a separate customer database could maintain such information.

Customer management subsystem 130 acquires information needed to determine customer preferences and facts from UI 110. UI 110 passes data into customer management subsystem 130, which processes it, and then relays it to at least one database. Further, there are the updates of preferences in existant subsystem 140 for further parsing. Then, existant subsystem 140 passes information such as user preferences and facts back to UI 110.

Advantageously, customer management subsystem 130 is modifiable and extensible without making response times appreciably longer. As such, the process to add new vertical domains to voice portal 110 is rapid and consistent. The type of customer facts and demographics can never be completely defined, as new vertical domains can always be added.

Customer management subsystem 130 records all transactions made by users that are subscribed and unsubscribed via a database. Customer management subsystem 130 also records items that the user locates in a formed history list and tracks the collections that the user looked at (on the web site and through WAP devices).

Customer management subsystem 130 identifies subscribed customers whenever possible, and as passively as possible. Thus, recognition of customers preferably takes place via some sort of identification key, such as, for example, a telephone number and an ID ("PIN") upon entering a system. This identification preferably leads to certain preferences associated with the customer and experience level of a customer within each set of preferences. Additionally, the system allows for an additional level of identification (e.g. password identification) before authorizing a purchase to be made against stored credit card information.

Customer management subsystem 130 maintains, within each of the vertical domains, a set of preferences to facilitate the user interactions via voice portal 10. For example, in an exemplary embodiment, customer management subsystem 130 gathers information from the customer in order to further help determine what type of advertising to give to the customer, and how to improve the customer's service. Customer management subsystem 130 maintains customer preferences appropriate to each supported domain and updates customer data from data sources dynamically. For example, in the Auctions domain of interest, current bid status updated on user request. Voice portal 10 advantageously presents user data with currency appropriate to the domain. For example, in the Auctions domain of interest, bids are always current to within seconds. In the e-commerce domain of interest, pricing information is current when purchase price is presented.

Advantageously, customer management subsystem 130 provides reporting and analysis to allow determination of which users are accessing which services. Further, customer management subsystem 130 provides reporting on session and transaction history by different demographic segment such as, for example, determining which services are accessed by users from a certain income bracket, gender, or age group. Customer management subsystem 130 also provides reporting of relatedness based on actual use (e.g., the ability to report what other services are accessed by users who are interested in movies).

In order to continually add value and transition with users from one platform to another (for example from the phone to the web, or from the phone to WAP), customer management subsystem 130 advantageously supports personalization features to improve customers experience with the services. In addition to personalization, other sources of "stickiness" (customers "sticking" with the service in light of competition) includes the support of community features such as networks of friends or of folks with common interests. Thus, customers tend to be more loyal to the particular service provider if personalization features and community features are included with customer management subsystem 130.

To support any adaptation of service (or advertising) to customer behavior, customer management subsystem 130 advantageously tracks use of services. Further in the area of interface evaluation, typical user explorations of interface hierarchies may help identify problem areas or very useful areas, or correlated sets of sub-features in single sessions. Another example of an important attribute the services of voice portal 10 is timing. For example, the use of a "barge-in" (where a user can interrupt with an answer before a list or prompt is finished) can signify a more advanced user and a string of barge-in selections to a single sub-tree repeatedly for a specific user may advantageously be detected by customer management subsystem 130 and lead to an opportunity for a short-cut—either a general one, or possibly a customer-specific one.

An aspect of "stickiness" is adaptation of services to a customer's preferences. While this can include relatively simple features such as customer information retention in support of non-repetitive "sign-up" or "purchasing" data-entry requirements, it can also include preferences for navigation of particular sub-trees of interaction in different front-ends, and preferences for service/vendor ordering or selection. As an example of vendor preference or ordering, a user may select a "preferred vendor," allowing voice portal 10 to limit a list of vendors for a found product to two: cheapest and preferred.

Vertical preferences should be passively set based on user's actions That is, after requesting a particular attribute more than once, a passive preference would be set. Alternatively, preferences are dynamic, changing based on user's actions. Preferably, users are able to override all passive preferences, by setting or resetting them either through voice or web interfaces.

Customer management subsystem 130 can pull user preferences, such as stock information, weather preferences and (the like) from personalized web pages such as MyYahoo, and MyExcite. The personalized web pages can be previously created by the user via a conventional Internet connection. Alternatively, the personalized web pages can be built by customer management subsystem 130 in response to user voice commands. These pages can then be translated to be used with voice portal 10. General preferences can advantageously be used as a default preference if specific vertical preferences or current call preferences do not exist.

The following is a listing of exemplary vertical preference requirements and their descriptions. Each preference is used differently throughout each interface. In an exemplary embodiment, the only preference for weather is the weather for the location that the customer requests. By default, the user's location is their ZIP code. The Most Commonly Used Location could be overridden by a current call location, if available.

In the Sports domain of interest, there are several different preferences to be looked at. First, favorite sports are an option. Certain sports scores, schedules, and standings can also be sent to the user. For web sites, exclusivity can be used to not send advertisements and information of certain sports. For example, one user may not want to hear information on hockey games, rather the user wants baseball information. Second, the preference granularity can be increased with certain teams being preferred over others. In each of these granularities, it is possible that a most-recently used (MRU) list of limited choices is used to determine the preference list. Besides type of sport and team preferences, preferred events may be used.

In the Movies domain of interest, needed preferences include locality of customer and locality of theaters, types of movies (e.g., thrillers, horror, action, etc. . . . ), ratings of movies (AA, G, R, etc. . . . ), and movies with a customer's favorite actors/actresses in the movies. Each of these preferences may be listed in an MRU list of limited choices.

In the Traffic domain of interest, the main preference used would be specific routes that the customer would like to use to reach a destination, with an attribute being the time (the current being the default). Thus, an MRU list of limited routes could make up the preference list of a customer.

In an exemplary embodiment, there is a two-level hierarchy of preferences for the Stocks domain of interest. First, there is a preference for a market list and second, within each market, there is a preference of which stocks and indices to look at. Again, an MRU list of TBD choices of markets and stocks may be tabulated. Other vertical domains of interest may include restaurants, concerts and live events, taxis, and airline reservations.

Referring still to FIG. 2, existent subsystem 140 coordinates access by user interface 110, advertising subsystem 120, customer management subsystem 130, fusion engine 150, and update engine 160 to database 170. Data contained in database 170 is gathered from Internet sources by update engine 160. In an exemplary embodiment, the data structure used in database 170 is based on a hierarchy of "existents" or things and their relationships and associations with each other. Advantageously, the ability to replicate and modify information in database 170 is more easily done because database 170 interacts only with the existant subsystem 140. Existants and their creation are described further with reference to FIGS. 4-10. Specifically, an exemplary data structure model for existants is described with reference to FIGS. 4-6 although various other structures for existants is described with reference to FIGS. 4-6 although various other structures for existants can be utilized. Creation and updating of existants are described with reference to FIGS. 7-10.

Fusion engine 150 determines whether two existants are the same and, if so, fuses the existants to form a third canonical existant. As such, fusion engine 150 establishes whether information gathered from one source is related or the same as information gathered from another source. Functions of fusion engine 150 are described further with reference to FIGS. 25, 26, and 27.

Update engine 160 retrieves information from the Internet to update information and attributes contained in database

170. In an exemplary embodiment, update engine 160 utilizes "spiders" which retrieve information from the Internet in order to update information in database 170. Operations of update engine 160 are described further with reference to FIGS. 7 and 8.

Database 170 stores information used by voice portal 10, such as, customer data, advertising information, and product and services information. Information in database 170 is stored into existants, existant attributes, existant relationships, and existant associations. What existants are, how they are formed, how they are related to each other, and how they relate to the functionalities of voice portal 10 are described further below. In alternative embodiments, multiple databases may be used for specific types of information, such as, customer data, advertising information, and operations records.

Figure 3:
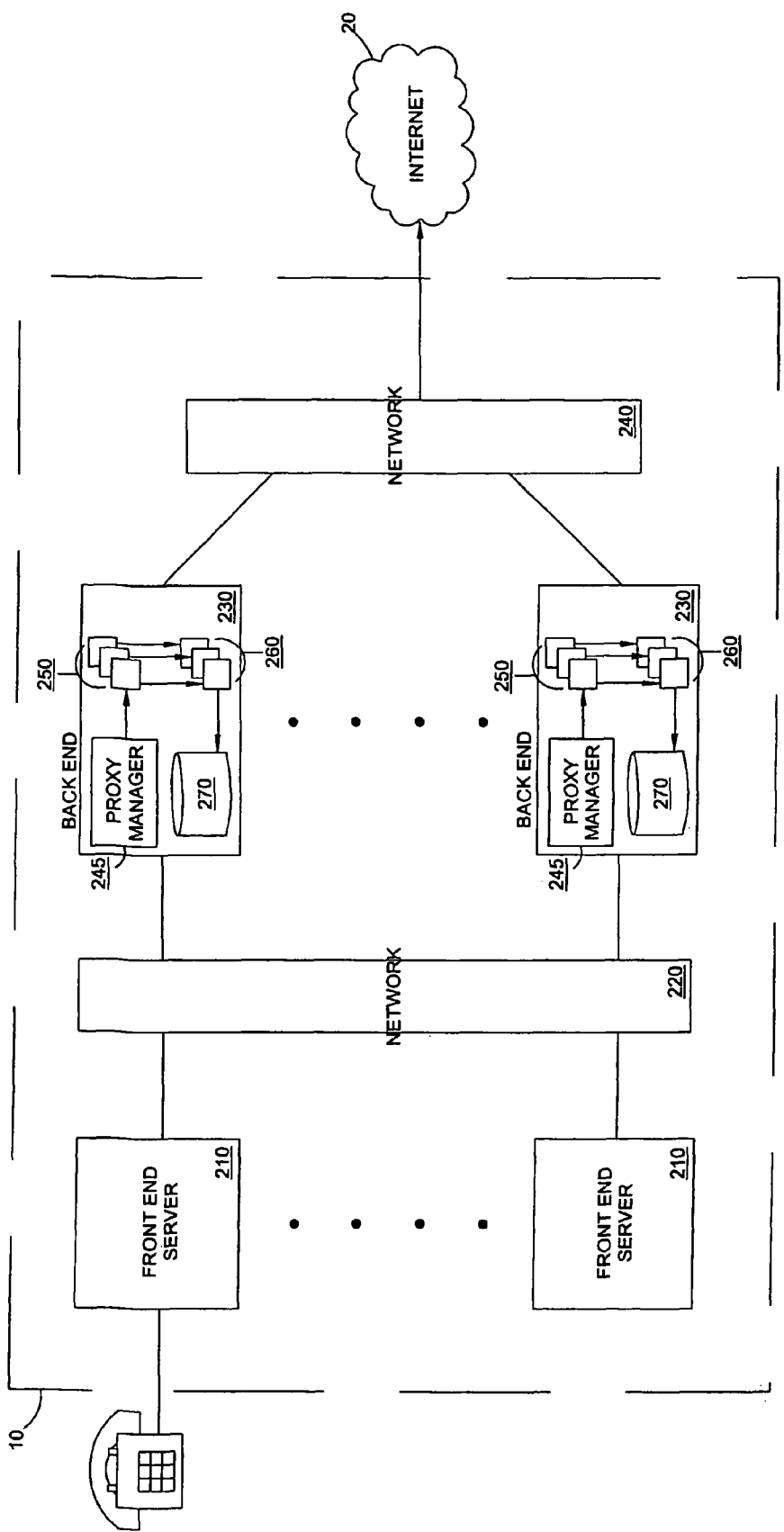
FIG. 3 is a more detailed block diagram of an exemplary physical embodiment of the voice portal of FIG. 1.

FIG. 3 illustrates an exemplary physical layout of voice portal 10. These physical structures are by way of example only. Other structures may be used in combination with or in lieu of those shown. In an exemplary embodiment, voice portal 10 includes front end servers 210, a front-to-back network 220, back end servers 230, and a back-end network 240. Users communicate via telephone with one of the front end servers 210, which is coupled to back end servers 230 by front-to-back network 220.

In an exemplary embodiment, back end servers 230 include a proxy manager 245, proxies 250, beans 260, and a database 270. Proxy managers 245 receive requests for information from one of front end servers 210 via front-to-back network 220. Proxy managers 245 communicate via back end network 240 to determine work load levels at each of proxy managers 245. Once an appropriate proxy manager 245 is determined, the appropriate proxy manager 245 pulls a free proxy from a pool of free proxies 250 and assigns the proxy to a bean 260. Bean 260 is associated with database 270 in order to retrieve information, insert information, search existants or existant relationships, or perform any other function possible with database 270.

The virtual database structure described with reference to FIG. 3 is designed to deliver information garnered from Internet 20 to users of voice portal 10 in a timely and highly utilitarian way. People need and use information in a variety of settings and ways, and, advantageously, voice portal 10 supports this on a variety of platforms including, but not limited to, the phone (e.g., voice, WAP and both), the web, and portable connected computing devices (e.g., Palm® OS device, WinCE® device, RIM pager).

Back end servers 230 include a database service support with a variety of features, including data collection and fusion. Data collection includes the amassing of data from Internet sources at regular intervals to be scheduled for particular item types and/or sites, as described with reference to FIGS. 7 and 8. Voice portal 10 detects changes to data source sites and notifies the appropriate site rule manager, as described with reference to FIGS. 9 and 10. Voice portal 10 also supports non-expert definition of data extraction for data sources, as also described with reference to FIGS. 9 and 10.

In the process of "fusion," voice portal 10 identifies identical items from different Internet vendors. During the fusion process, voice portal 10 retains meta data about the source of all information. Meta data includes data about data. For example, meta data may document data about data elements or attributes, (name, size, data type, etc.) and data about records or data structures (length, fields, columns, etc.) and data about data (where it is located, how it is associated, ownership, etc.). Further, voice portal 10 supports interactive clarification of fusion decisions or non-decisions by non-experts in cases where certainty cannot be determined automatically. Voice portal 10 also supports additions of new data types and data elements, without code change. Even further, voice portal 10 supports domain-specific concepts of relatedness that are identified through market research, trial, and opportunity. For example, in the e-commerce domain of interest, cheaper, better, often-bought-with, and most-popular are important relatedness concepts. In the movies domain of interest, related movies and products, and best movies in a category, most popular, best by reviewer, and cast, are important relatedness concepts. Voice portal 10 collects and retains related information necessary to provide additional detail about an item (e.g., product descriptions). The operation and functionalities of fusion are further described with reference to FIGS. 25-27.

FIG. 4 illustrates an exemplary data structure model 300 used by database 170 of voice portal 10 in which "existants" (or things) are given attributes, associations, and relationships. An "inheritance" relationship between existants is depicted by a solid line with a triangle head. An "association" relationship between existants is depicted by a dashed line with an open head arrow. For example of an inheritance relationship, in the data structure model 300, a block 310 is an "event". An "event" is an "existant" or thing, illustrated by a triangle headed arrow 315 to a block 320. Similarly, a "movie showing" (block 330) is an "event" (block 310), illustrated by a triangle headed arrow 335. For example of an association relationship, events are associated with "venues", as illustrated by an open headed arrow 345 to a block 340. Similarly, a movie showing (block 330) is associated with a "movie package" (block 350), as shown by an open headed arrow 355. Events can also be sporting events, dramas, concerts, comedy shows, fireworks presentations, dancing performances, or any other activity.

Data structure model 300 includes more existants, associations, and relationships which are illustrated in FIG. 4, but not described here. Further, data structure model 300 may include more existants, associations, and relationships which are not included in the illustration. FIG. 4 is for illustration only.

Figure 5:
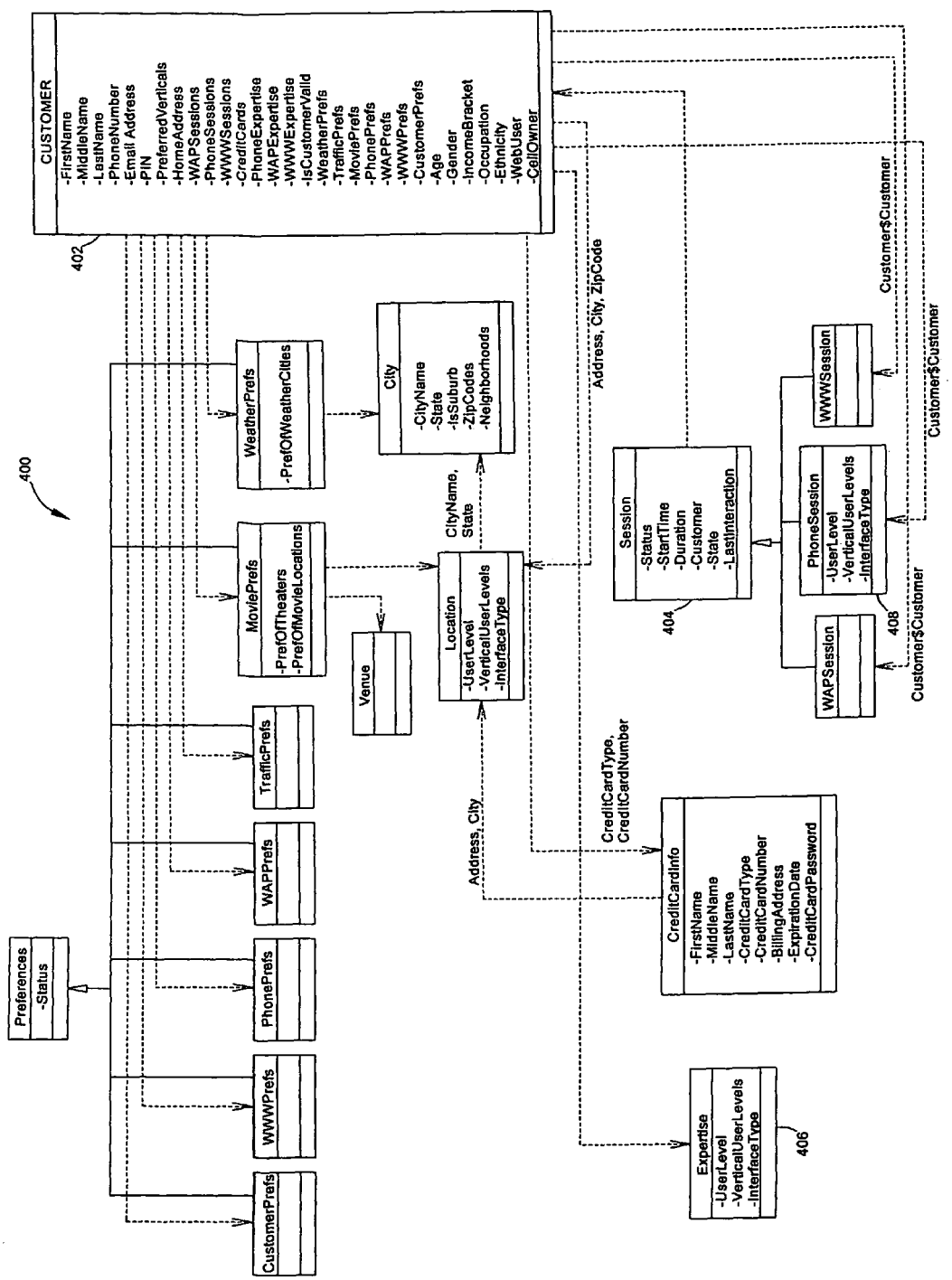
FIG. 5 is a diagrammatical representation of the exemplary data structure model of FIG. 4 for user related information.

Referring now to FIG. 5, an exemplary data structure model 400 is illustrated to show the object oriented relationships between a user or customer object and the different vertical classes. Depictions of inheritance and association relationships are the same as in the depiction of data structure model 300 described with reference to FIG. 4. In an exemplary embodiment, user information arranged in data structure model 400 is contained in database 170. However, in alternative embodiments, such user information may be contained in a separate customer database.

The customer is an Existant (Customer Existant Block 402) and is a direct descendent of the top level, or the "Existant" existant, within the hierarchy, and thus inherits all of its properties and methods. The reason behind this structure is that database 170 and its methods are already created and the structure allows reuse of code.

The customer object contains various pieces of information. The generic Preferences class contains information on preferences, such as, "Traffic", "Weather", and "Movies". Each time a customer entered a new and different vertical domain of interest, an instance of the Preferences object to the vertical domain's name is created with preference data inserted. If the vertical domain already exists, then the object is modified with the updated information.

Session class records the information directly about a user's session (session block 404). The session may be a call, a search through the website, or a call using the WAP. Data, such as, time of day and duration are general attributes but analysis on whether the user made a call from a landline or cell phone is specific to phone sessions. This type of data is useful for determining to whom voice portal 10 directs marketing (for advertising purposes), and improving both performance and service. As well, a customer object has a link to each of these session objects to determine what was the last session on that platform (in case a user terminated the session and would like to reconnect at that specific time).

A Phone Session block 408 records information relating to a communication session where a telephone is used to communicate with portal 10. Phone Session block 408 includes information, such as, the current level of interaction, the current domain of interest, the type of interface platform (e.g., WWW, WAP, ASR), and previous levels visited. Advantageously, Phone Session block 408 allows the user to rejoin a session where he or she left off in a previous session or from an interrupted session. Other existant blocks, such as, credit card info existant, location existant, and preferences existant contain associated attributes and record information as needed.

The Expertise class (Expertise block 406) serves the purpose of maintaining different levels of usability (generically, and for different preferences) across different platforms (i.e. Phone, WAP, WWW). The Customer has links to each of these class instances. These are not included in the Preferences class since references can cross platforms and user's capabilities cannot.

Figure 6:
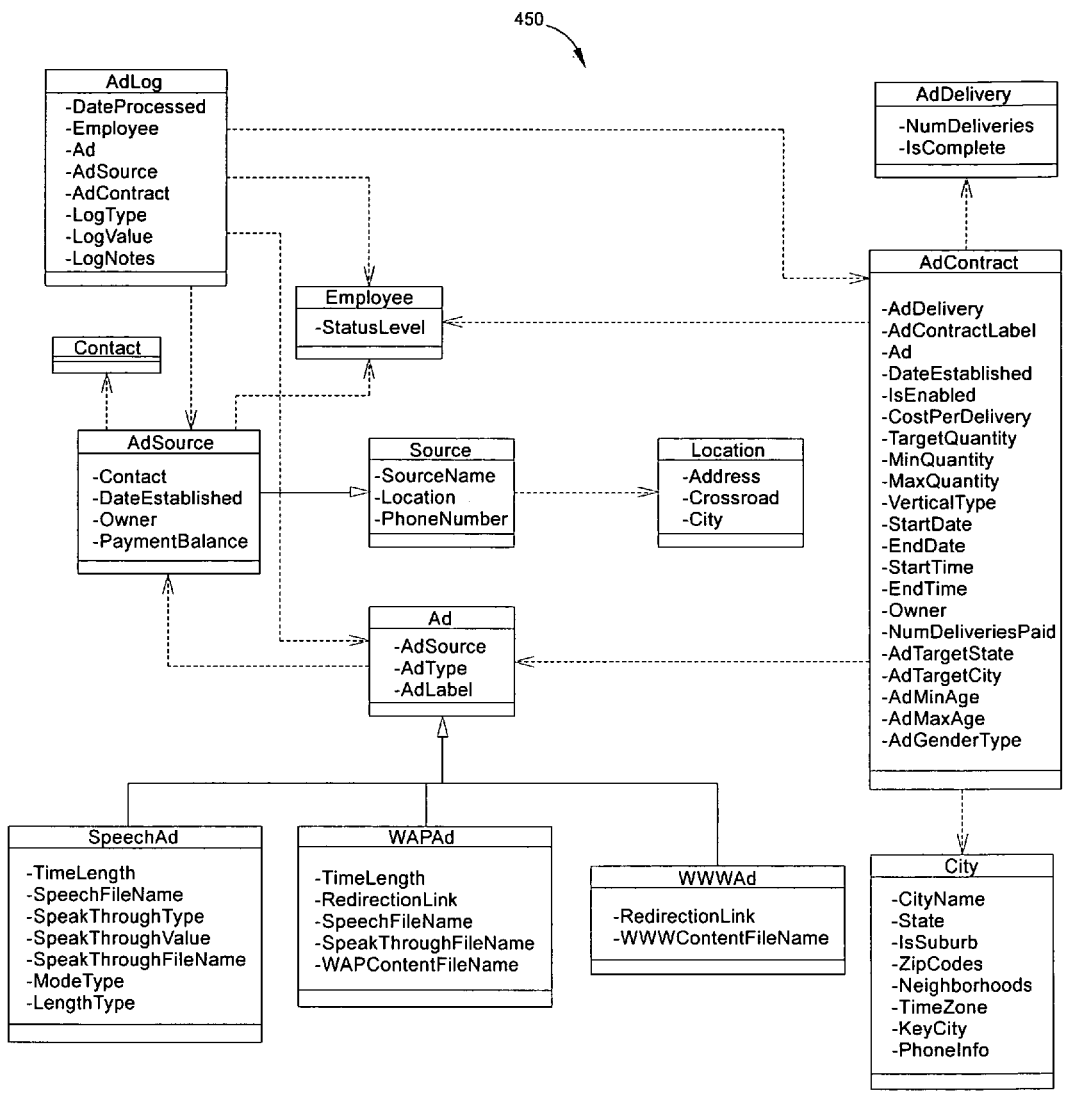
FIG. 6 is a diagrammatical representation of the exemplary data structure model of FIG. 4 for advertising related information.

FIG. 6 illustrates an exemplary data structure model 450 used by database 170 of voice portal 10 for information related to advertising. Depictions of inheritance and association relationships are the same as in the depiction of data structure model 300 in FIG. 4. In an exemplary embodiment, advertising information arranged in data structure model 450 is contained in database 170. However, in alternative embodiments, such advertising information may be contained in a separate advertising database.

Advantageously, data structure models 300, 400 and 450 provide for a continually expanding arrangement of information on existants, associations, and relationships. Furthermore, models 300, 400, and 450 allow for the creation of new vertical domains of interest quickly and without changing previously entered information. For example, model 300 includes information related to events, such as, movies and concerts as well as commodities, such as, books, toys, and electronics. Any event, such as, ballets can easily be added as an existant with an inheritance relationship with "event" and appropriate association relationships. Similarly, any commodity, such as, a vehicle can easily be added as an existant with an inheritance relationship to "manufactured item" and appropriate association relationships. The dynamic nature and expansive capabilities of data structure models 300, 400, and 450 allow voice portal 10 the advantage of being a unitary voice portal to a wide range of Internet-based information and services.

Figure 7:
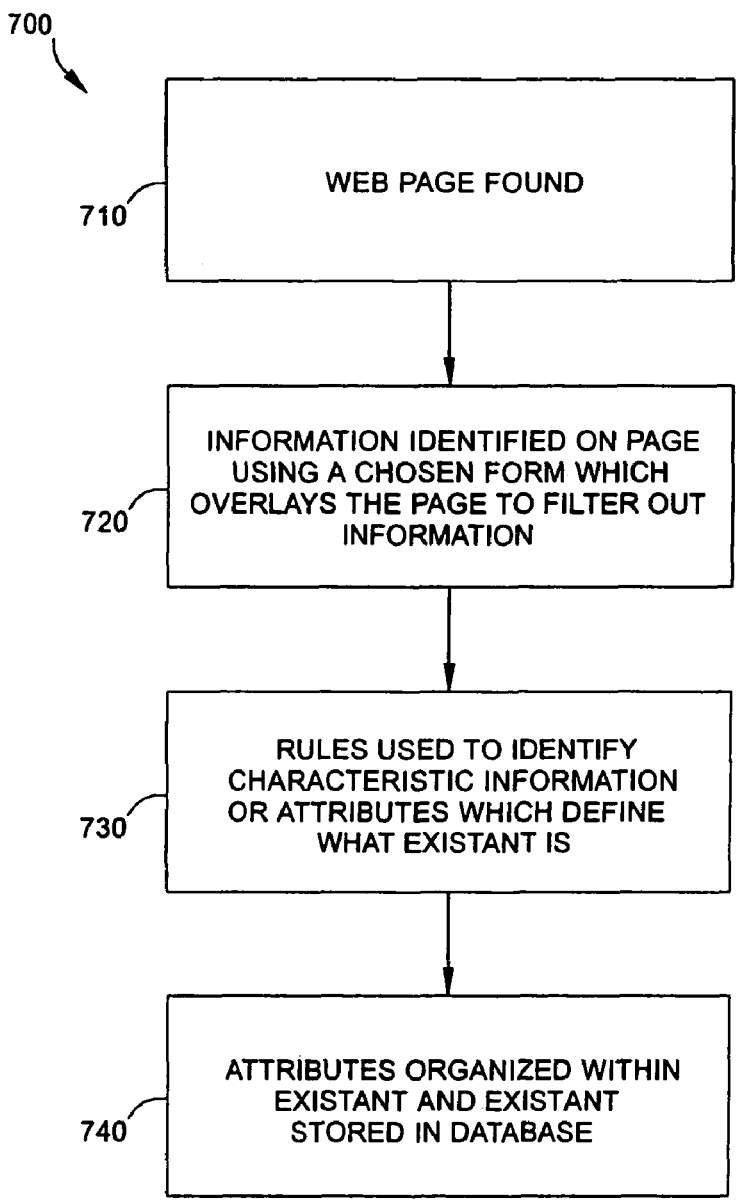
FIG. 7 is a flow diagram illustrating an exemplary creation process of the exemplary data structure model of FIG. 4.

FIG. 7 illustrates a flow diagram 700 of an exemplary creation process of an existant, such as, existants shown in exemplary data structure model 300 (FIG. 4), data structure model 400 (FIG. 5), and data structure model 450 (FIG. 6). In a step 710, a web page on the Internet is found. In an exemplary embodiment, a spider is used to find particular web pages relating to a pre-determined category of items. A spider is a conventionally known program that automatically explores the World Wide Web (WWW) by retrieving a document and recursively retrieving some or all of the documents that are referenced in it. In contrast, a normal web browser operated by human does not automatically follow links other than in line images and URL redirection. After step 710 is performed, a step 720 is performed in which information is identified on the found web pages by using a chosen form which overlays the page to filter out particular information. After step 720, a step 730 is performed in which rules are used to identify characteristic information or attributes from the information retrieved by the form overlay in step 720. Characteristic information or attributes define what the existant is. Rules define the organization of existant attributes. For example, a movie existant may include the attributes of a title, a director, a cast, a release year, and a synopsis.

After step 730 is performed, a step 740 is performed in which attributes are organized within the existant and the existant is stored in database 170. Preferably, the organization and arrangement of attributes within the existant are structured by pre-defined rules.

Figure 8:
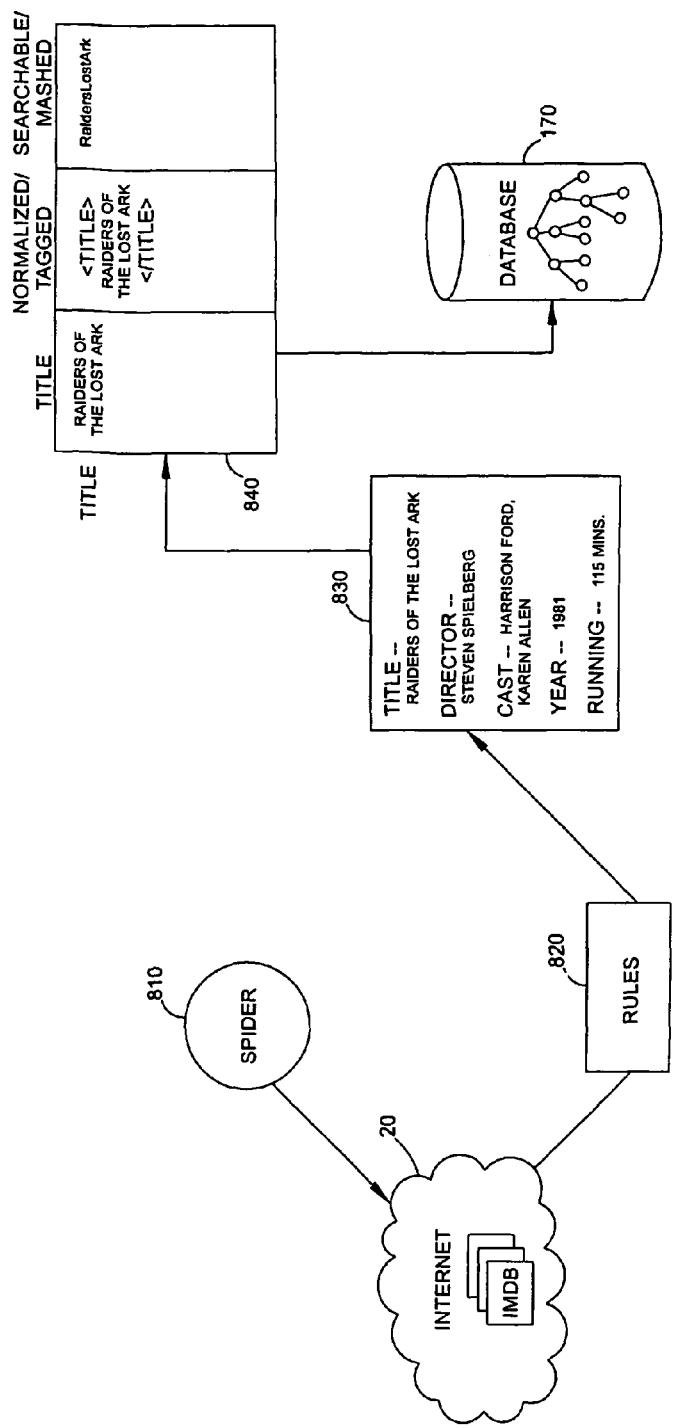
FIG. 8 is a diagrammatical representation of the exemplary creation process of FIG. 7.

FIG. 8 illustrates the exemplary creation process of existants as described with reference to FIG. 7. A spider 810 traverses Internet 20 for information stored on a wide variety of different web pages. Information retrieved by spider 810 is organized and arranged according to rules 820 in order to place information in a data structure 830. In an exemplary embodiment, spider 810 retrieves information from Internet 20 regarding movies. For example, spider 810 may traverse the IMDB web site and retrieve information regarding the title, director, cast, year of release, and running time for a particular movie. Once movie information is stored in data structure 830, data structure 830 is applied to a lexical table 840. Lexical table 840 organizes attributes contained in data structure 830 and places the information in three columns. In an exemplary embodiment, the first column of lexical table 840 includes the original data, the second column includes the original data in a normalized and tagged format, and the third column includes the data in a searchable and mashed format. Lexical table 840 and data structure 830 are contained within memory structures in database 170.

By way of an example, if spider 810 traverses Internet 20 for information related to the movie "Raiders of the Lost Ark," data retrieved from Internet 20 will be applied against a rule corresponding to movies and placed in data structure 830. Such a rule for movies may include title, director, cast, and release year, all of which are attributes of movies. In this example, the title would be "Raiders of the Lost Ark," the director would be "Steven Spielberg," the cast would be "Harrison Ford and Karen Allen," the year would be "1981," and the running time would be "115 minutes." As such, lexical table 840 would contain the title in its original format: "Raiders of the Lost Ark," the data in normalized and tagged format: <title>Raiders of the Lost Ark </title>, and in searchable mashed format: RaidersLostArk, without any spaces or identifying articles (e.g., the, a, an).

Figure 9:
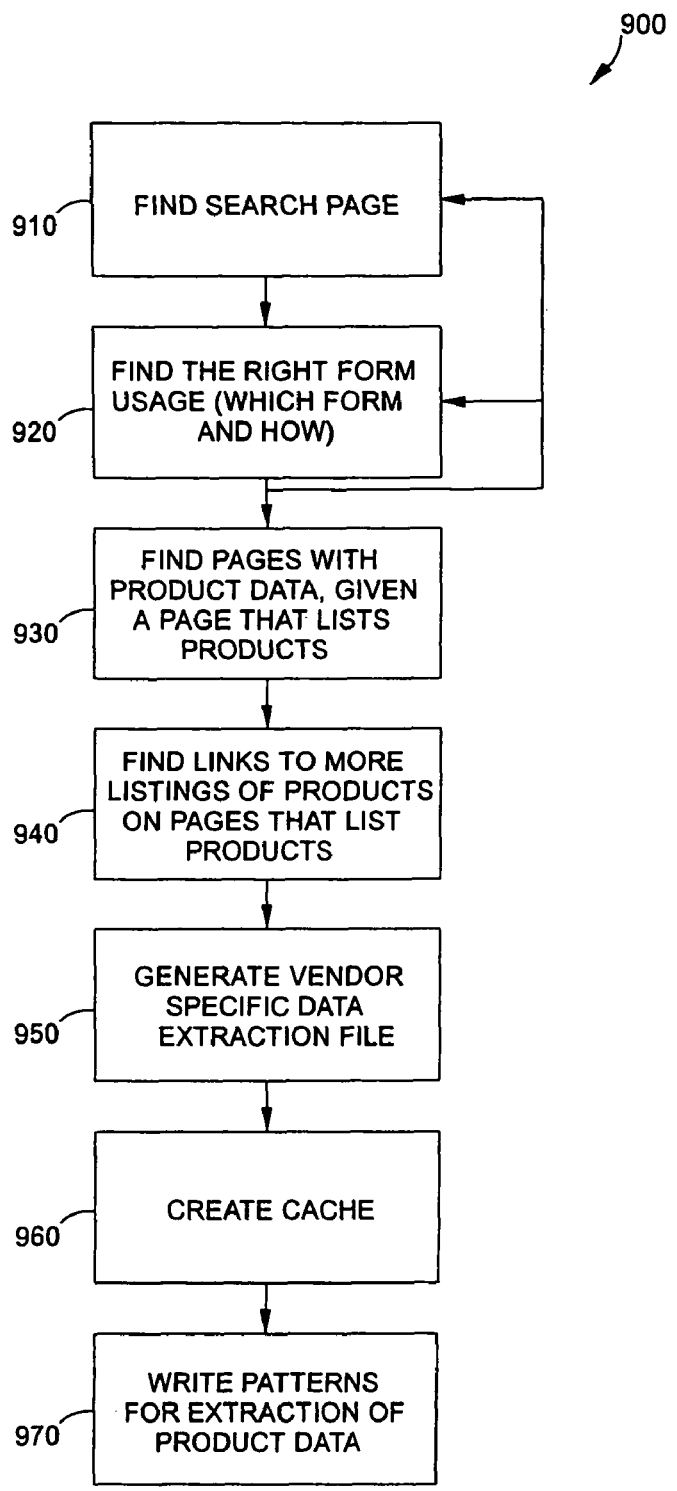
FIG. 9 is a flow diagram illustrating an exemplary process of gathering Internet-based information using non-programming means.

FIG. 9 illustrates a flow diagram 900 which depicts an exemplary process of gathering Internet-based information using non-programming means. In a step 910, a search page is found and patterns are used to isolate the area on the page containing relevant information. After step 910 is performed, a step 920 is performed in which an appropriate form is found and special routines are invoked to extract actual data and information. After step 920, a step 930 is performed in which multiple pages with related information is found given a particular page. Apart from the data specific patterns, there is an area pattern that defines where data specific patterns operate in the particular page. After step 930 is performed, a step 940 is performed in which links to more listings of products or services on the multiple pages are found. In an exemplary embodiment, a prediction routine is used to compute actual patterns of product listings from code samples.

In general, the prediction routine computes a pattern from a desired output given by a rule writer. Advantageously, the pattern prediction routine speeds up production because a rule writer simply has to paste from the HTML code the text fragments that he or she wants extracted, without having to develop the patterns to make that happen. The input fields currently used to write the patterns are used to insert this data.

By way of example, a prediction routine develops a pattern for Author data for web pages giving data on books by first having the rule writer copy a sample author name on the web page into the Author field. The algorithm then matches the sample data to its location on the web page. Characters or tags proximate the matched data are identified as a "prefix" and "suffix". Prefixes are characters before the matched data and suffixes are characters after the matched data. The prefix and suffix are used to construct a pattern.

The constructed pattern is applied to the web page to match against other data. If the constructed pattern picks up data which is not equal to the desired result, then the prefix and suffix used to develop the pattern are added to, for a more complete and accurate pattern. This procedure repeats to improve the pattern.

To further clarify this example, take the following HTML code from a web page giving product data on books:
    <html>
    <title> Programming Perl </title>
    written by <b> Larry Wall </b>
    </html>
    <html>
    <title> Learning Perl (<b>2nd edition </b>)</title>
    written by <b> Randal Schwartz </b>
    </html>

The rule writer dumps "Larry Wall" in the Author field to indicate that this is the data to extract for Author.

The pattern prediction algorithm roughly works as follows:
    n=1;
    repeat
    $page=~m/({.}n) Larry \s+Wall ({.}n)/x;
    $prefix=$1;
    $suffix=$2;
    $page="m/$prefix (.*?) $suffix/x;
    n=n+1;
    until ($1 eq <desired_data>);

Starting with n=1 on the first page, the algorithm matches"> Larry Wall <"which means that $prefix gets value">"and $suffix gets value"<". Next, the pattern prediction algorithm builds the pattern"> (.*?)<"using the values for $1 and $2 it got from the first step. Matching this pattern against the web page results in ">Programming Perl<"which is not equal to the desired result "Larry Wall". Therefore, n is incremented to n=2 and the pattern is refined to include another character in the prefix and suffix. Matching the web page with "({.}2) Larry \s+Wall ({.}2)" results in "b> Larry Wall </" which means that $prefix gets value "b>" and $suffix gets value "</". Next, the pattern prediction algorithm builds the pattern "b>(.*?)</" using the values for $1 and $2 it got from the first step. Matching this pattern against the web page results in "Larry Wall", the desired output.

Now, as the rule writer steps through web pages to apply the same pattern on different pages, he or she discovers that the pattern matches: "2nd edition" on the page about book "Learning Perl". The rule writer then improves the algorithm by giving a second example of a desired result, (i.e., he or she dumps "Randal Schwartz" into GUI input field), which triggers the pattern prediction algorithm to further increment n until a pattern enforcing a "y" before the <b> is created. The algorithm may perform several iterations, depending on the complexity of the web data and the pattern needed.

After step 940 is performed, a step 950 is performed in which a vendor specific data extraction file is generated. In an exemplary embodiment, a routine is used that computes relevant URLs from code samples. Alternatively, the routine that computes URLs can be passed as a form. After step 950 is performed, a step 960 is performed in which a cache is created. After step 960 is performed, a step 970 is performed in which patterns for extraction of product data are created. In a preferred embodiment, a regression test mechanism supports editing the special routines.

Figure 10:
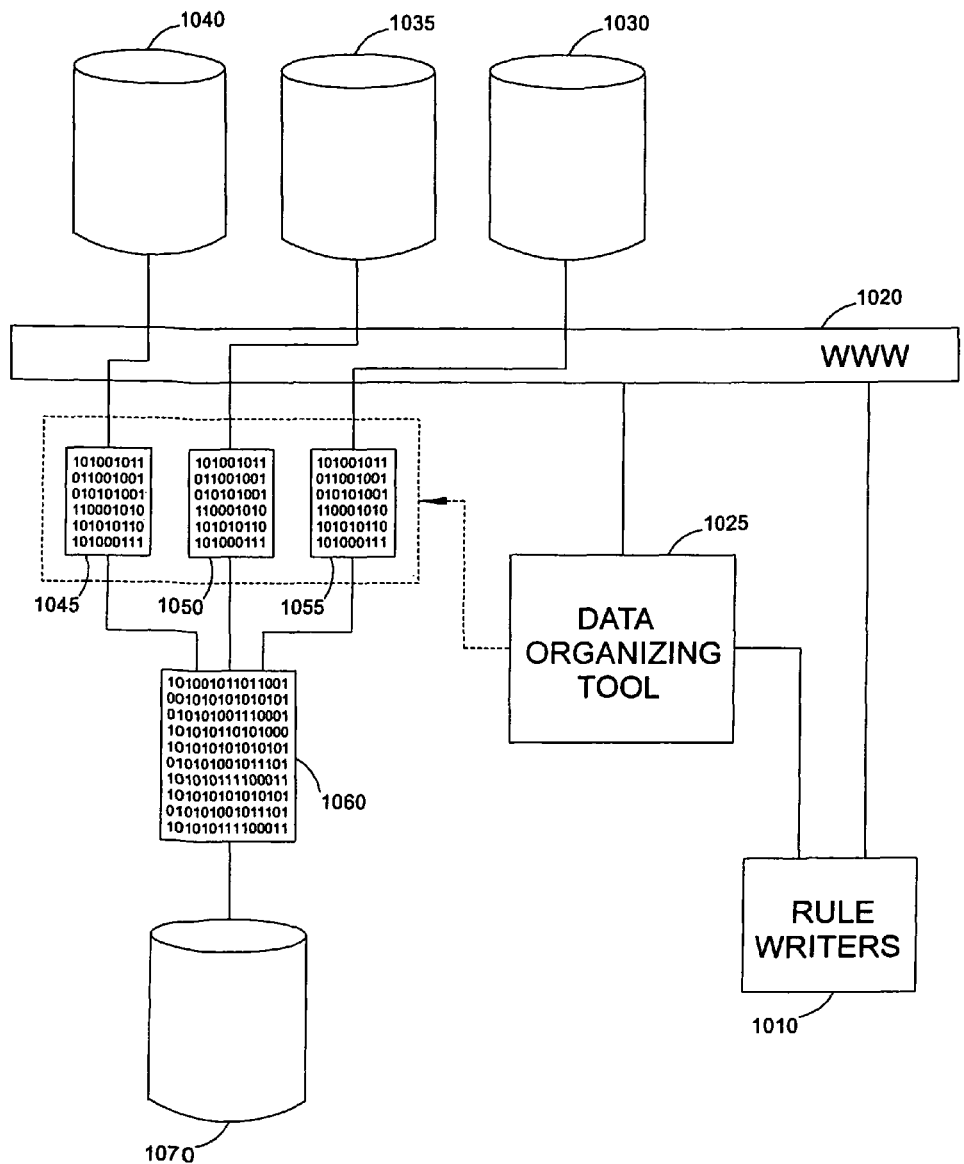
FIG. 10 is a diagrammatical representation of an exemplary process of the non-programming development of rules associated with the voice portal of FIG. 1.

FIG. 10 illustrates an exemplary process of the non-programming development of rules associated voice portal 10. In the exemplary process, a rule writer from a set of rule writers 1010 accesses the World Wide Web ("WWW") 1020 in order to access information from any one of data source 1030, data source 1035, data source 1040, or any other data source connected to WWW 1020. Data retrieved from a data source is placed into a data structure utilizing a data organizing tool 1025. Rule writers 1010 use data organizing tool 1025 to apply one of a multitude of possible forms to "pages" of information available via WWW 1020. Such forms provide indications for the location of relevant information on the page and labeled with some distinctive tag. For example, a page provided on WWW 1020 may include a data input box in the upper left hand corner of the page. Further, relevant information on a part or service may be located after a HTML tag, such as, "<title>" for the title of a book.

It should be noted that as used herein the term "page" includes a user interface screen or similar arrangement which can be viewed by a user of the diagnostic system, such as screens providing graphical or textual representations of data, messages, reports and so forth. Moreover, such pages may be defined by a markup language or a programming language such as Java, perl, java script, or any other suitable language.

Using the form selected by rule writers 1010 from data organizing tool 1025, data from data sources is organized into a data structure 1045, data structure 1050, data structure 1055, or any similar structure for maintaining information. Data structures 1045, 1050, and 1055 may be compared, fused, or utilized in the formation of a unified data structure 1060. Unified data structure 1060 is stored in a database 1070.

Advantageously, the exemplary process illustrated in FIG. 10 allows non-expert rule writers 1010 to select from a variety of forms provided by data organizing tool 1025 to use in the retrieval of information from particular web sites available via WWW 1020. As such, data contained on web pages from data sources 1030, 1035, and 1040 can continually be updated to database 1070 with the form selected by rule writers 1010 using data organizing tool 1025. As information contained in data structures 1045, 1050, and 1055 are compared for accuracy, data organizing tool 1025 detects when web pages have changed the format or arrangement of data on their corresponding web page.

FIGS. 11-24 illustrate an exemplary process of creating a new rule. Further, FIGS. 11-24 illustrate possible interactions between a rule writer and data organizing tool 1025 (FIG. 10). One exemplary rule is based off an existing rule: the Amazon.com book products. The steps taken in constructing this rule are similar to the steps taken in constructing any other rule.

Figure 11:
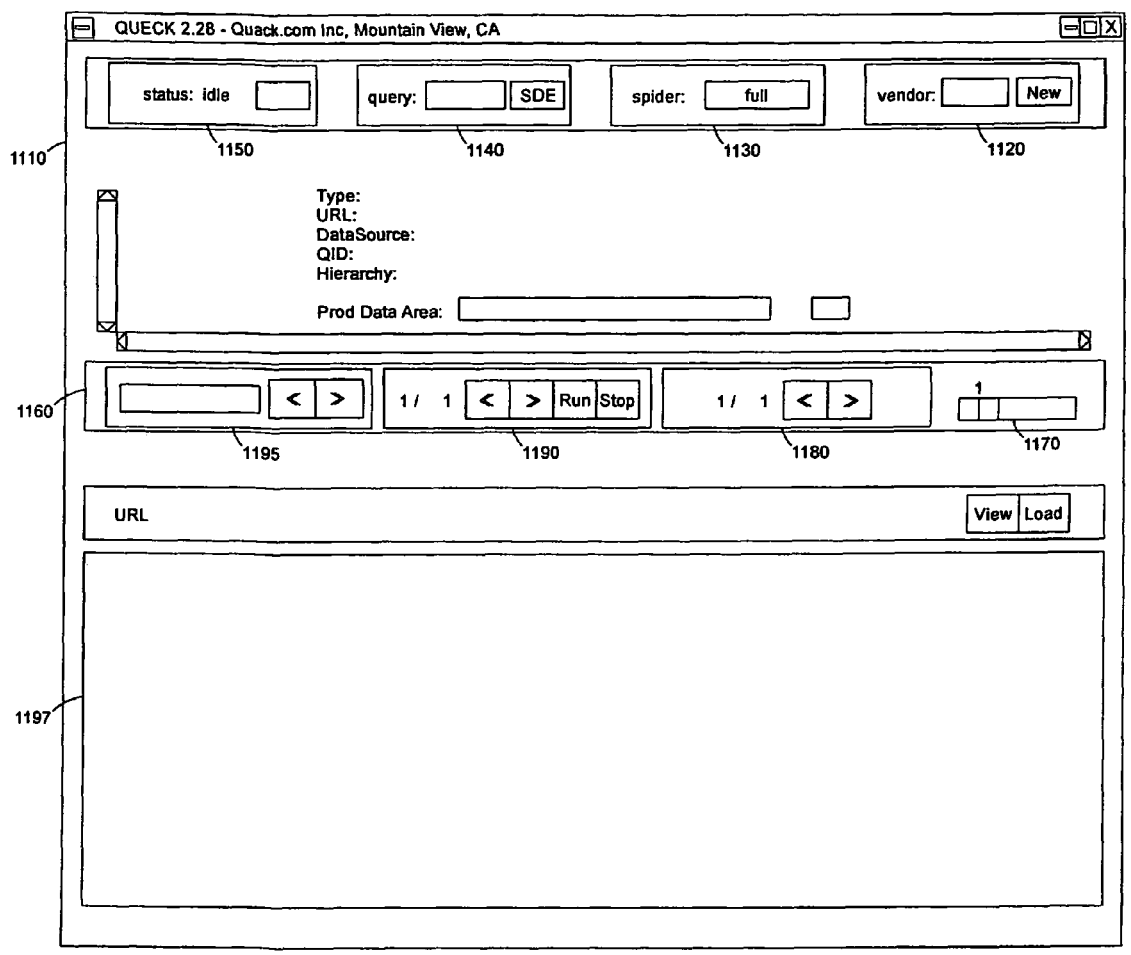
FIG. 11 is an exemplary graphical user interface for the non-programming development of rules associated with the voice portal of FIG. 1.
Figure 12:
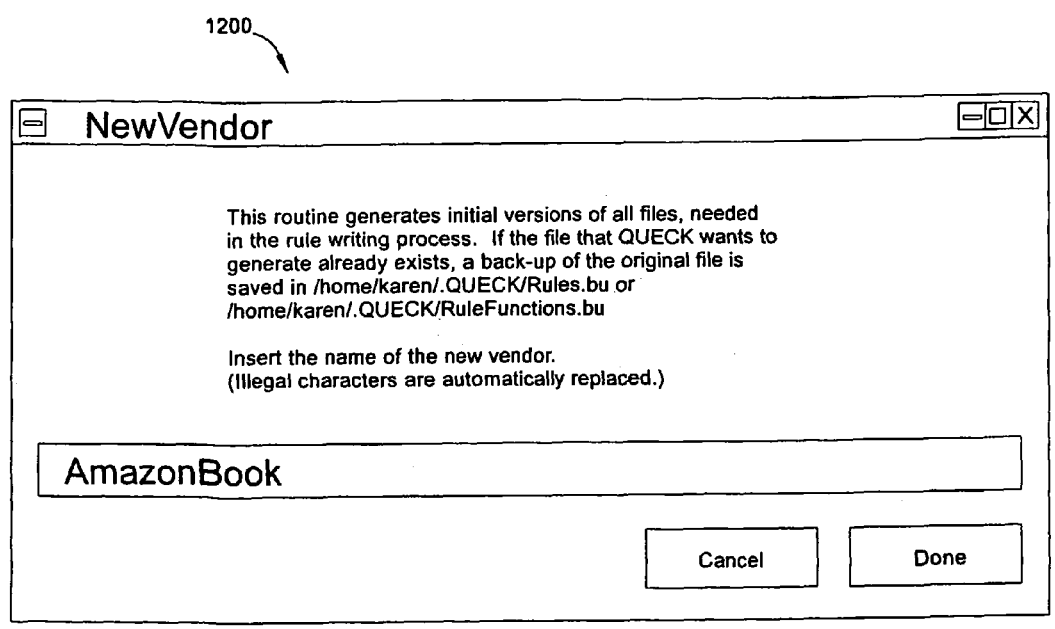
FIG. 12 is an exemplary graphical user interface window used in the non-programming development of rules associated with the voice portal of FIG. 1.

FIG. 11 illustrates a graphical user interface (GUI) 1110 which is used to initiate the creation of rules 820 (FIG. 8). GUI 1110 includes a vendor window 1120, a spider selection window 1130, a query window 1140, a status window 1150, a search box area 1160, and a code window 1197. Search box area 1160 includes a slider bar 1170, right set of arrows 1180, left set of arrows 1190, and a search window 1195.

Figure 13:
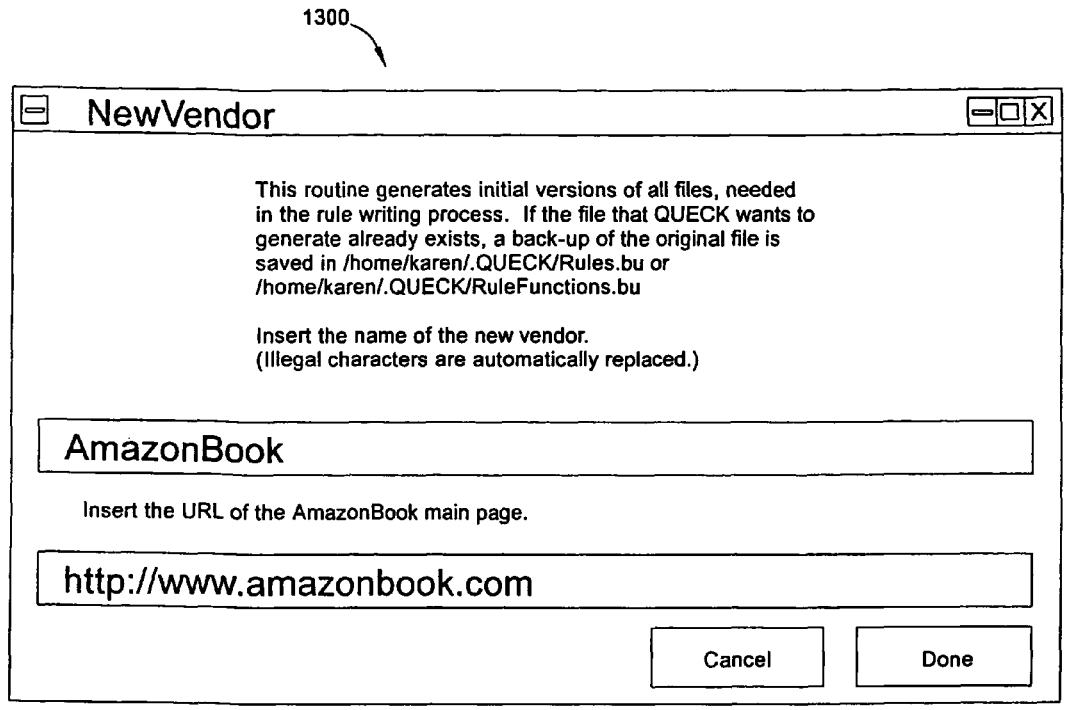
FIG. 13 is an expanded form of the graphical user interface window of FIG. 12.
Figure 14:
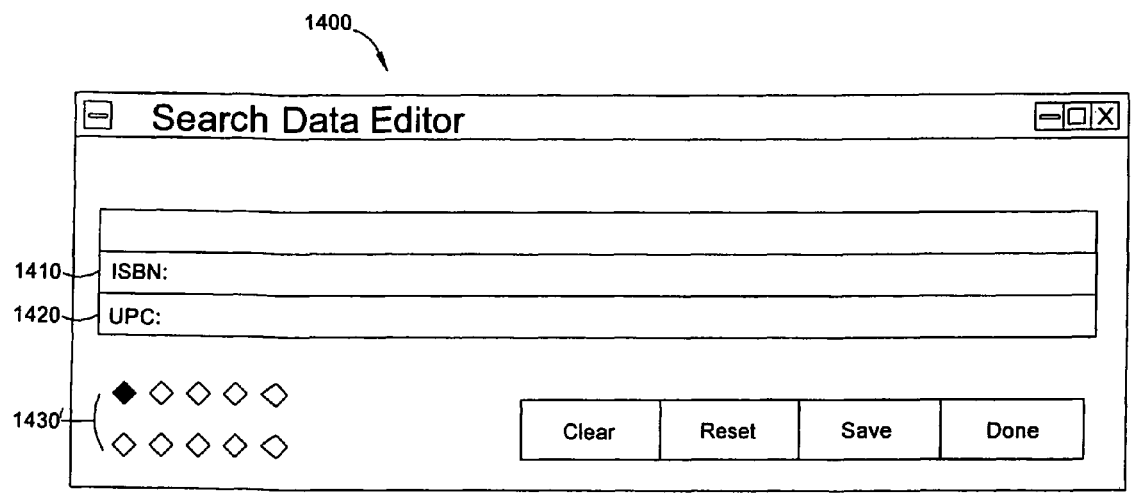
FIG. 14 is an exemplary graphical user interface search data editor window used in the non-programming development of rules associated with the voice portal of FIG. 1.
Figure 15:
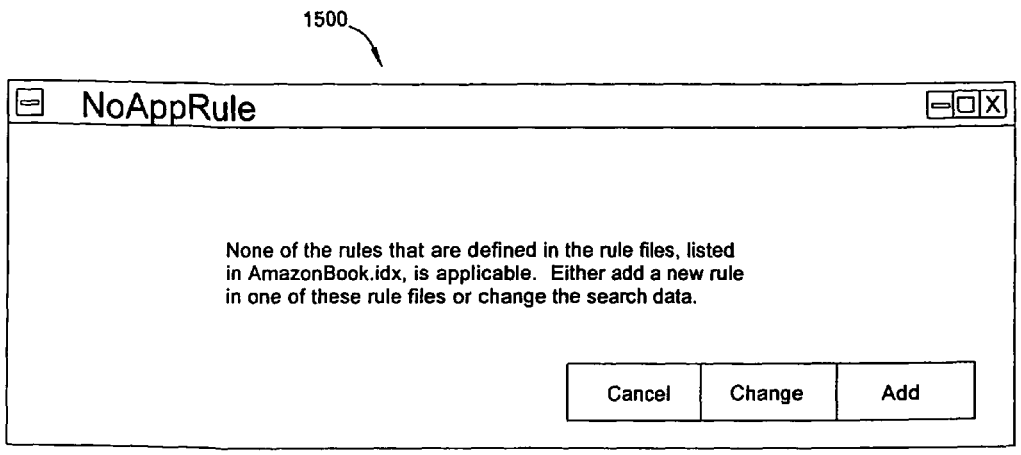
FIG. 15 is an exemplary graphical user interface window used in the non-programming development of rules associated with the voice portal of FIG. 1.

To start a new data source, a rule writer enters the data source (e.g. AMAZON Book) in a new vendor window 1120. The rule writer presses 'Enter' and clicks the 'New' button. After this action is performed, a graphical, a graphical user interface (GUI) 1300 illustrated in FIG. 13 is shown. A URL is displayed corresponding to the selected vendor name. The rule writer is asked to confirm the correct URL. In the example of AMAZON book, a URL for a domain "AMAZONBook.com" appears. However, the domain in the URL link should read "AMAZON.com." The rule writer corrects the URL and clicks the "done" button.

Referring now to FIG. 11, the rule writer selects the type of query that is desired. First, the rule writer selects query window 1140 and chooses from a list of potential queries. For example, "book package" may be a possible query for the book vertical domain of interest. This search is started when the rule writer clicks on the "SDE" (search data editor) button in query window 1140. The SDE button invokes a search data editor, which provides a graphical user interface (GUI) 1400 illustrated in FIG. 14. GUI 1400 shows a list of attributes useable in a search for the particular item of interest. For example, where books are being searched, attributes such as ISBN 1410 or UPC 1420 are shown. Where searches are for other items, attributes are listed which correspond to that item. A search for "Movie Showings" results with attributes listed, such as, Movie Package, time and showing date (see block 330 described with reference to FIG. 14.

The rule writer types a ISBN number into the corresponding data box and clicks 'Done.' Buttons 1430 in GUI 1400 advantageously allow the rule writer to save different search criteria during different searches. Once the search criteria is entered, the rule writer clicks 'Done' and because no rules have been defined for the particular data source (i.e., AMAZON Book), a graphical user interface (GUI) 1500 illustrated in FIG. 15 appears. GUI 1500 asks whether the rule writer wants to add a new rule or change the search data. In this example, the rule writer clicks on the "add" button and GUI 1500 expands to become graphical user interface (GUI) 1600 illustrated in FIG. 16.

Figure 16:
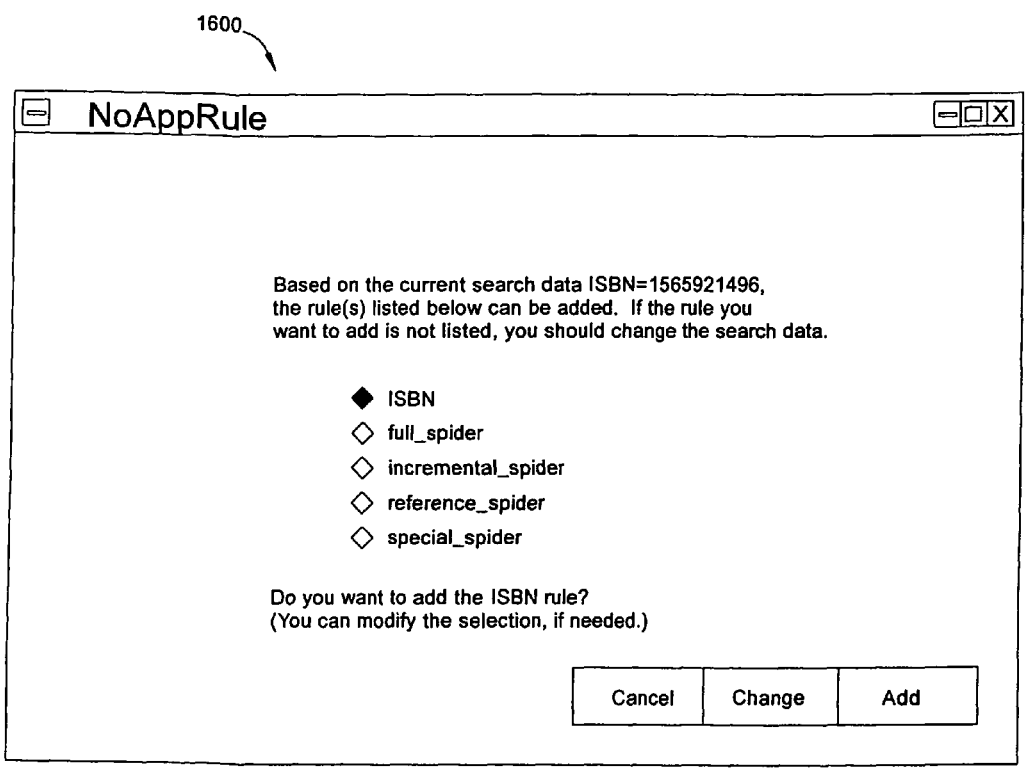
FIG. 16 is an expanded form of the graphical user interface window of FIG. 15.
Figure 17:
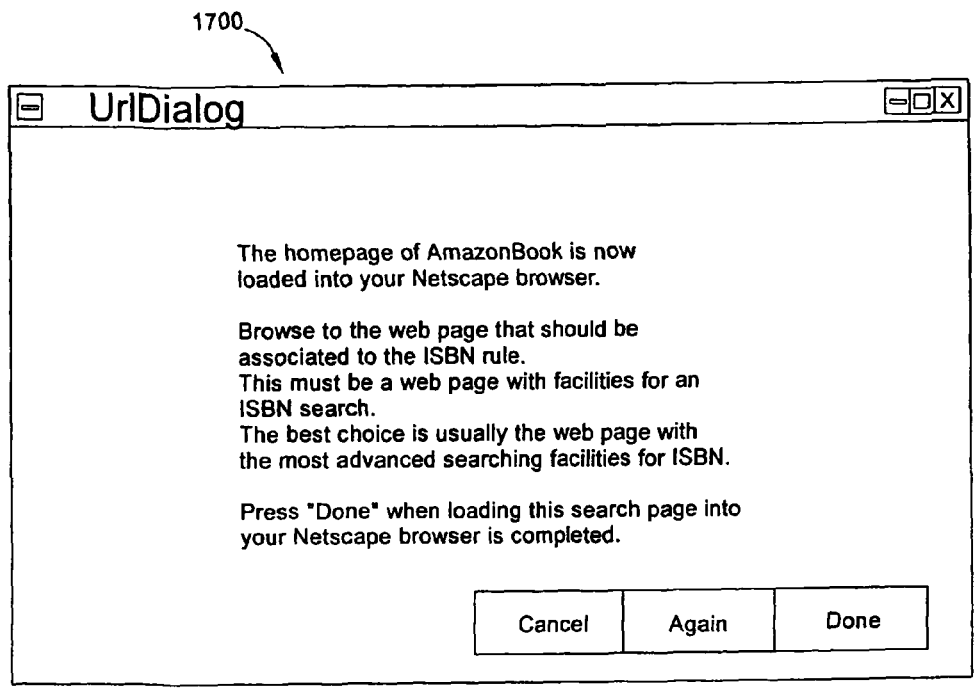
FIG. 17 is an exemplary graphical user interface window used in the non-programming development of rules associated with the voice portal of FIG. 1.

Referring now to FIG. 16, the rule writer confirms that the correct type of query is highlighted. In this example, ISBN is highlighted and the rule writer clicks on the "yes" button. A graphical user interface (GUI) 1700 illustrated in FIG. 17 appears to instruct the rule writer that the home page of AMAZON Book is loaded into the netscape browser. The rule writer is instructed to browse the web page associated to the ISBN rule. Once the search page is loaded into the Internet browser, the rule writer clicks the "done" button.

Figure 18:
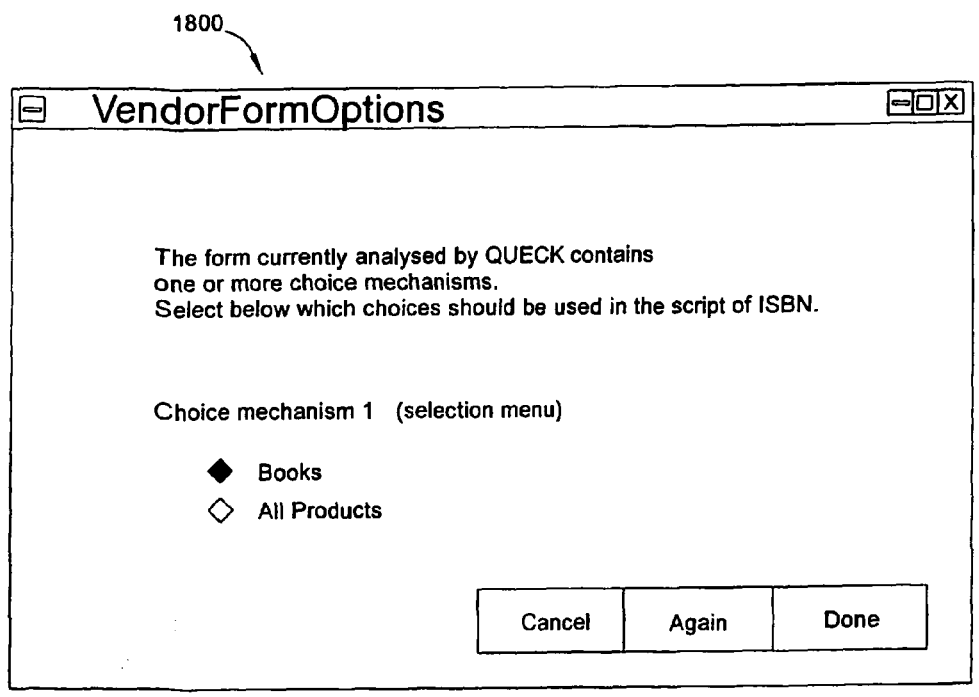
FIG. 18 is an exemplary graphical user interface window for vendor form options used in the non-programming development of rules associated with the voice portal of FIG. 1.
Figure 19:
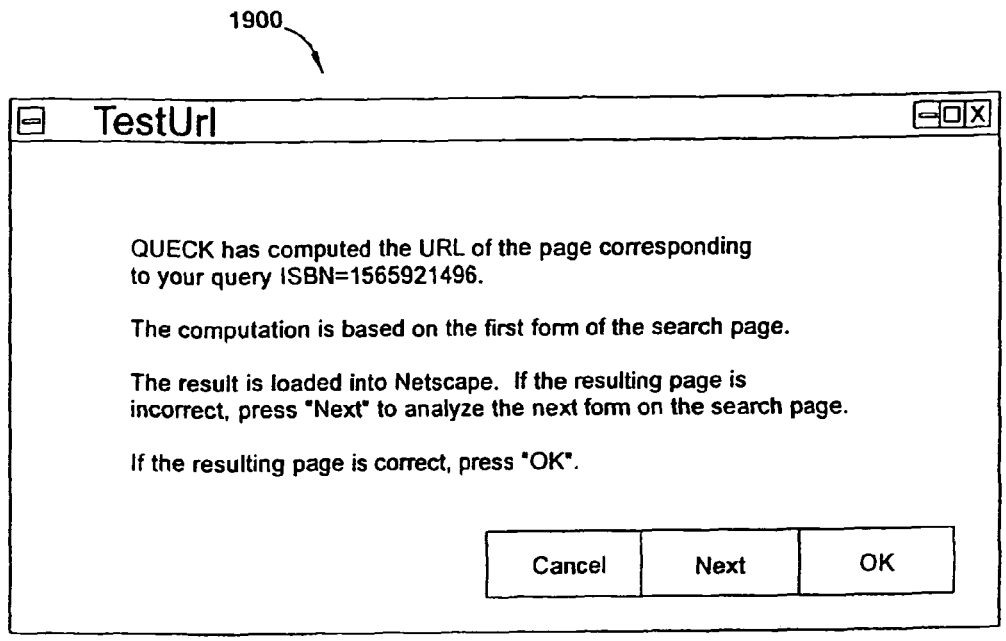
FIG. 19 is an exemplary graphical user interface window for the testing of a URL in the non-programming development of rules associated with the voice portal of FIG. 1.
Figure 20:
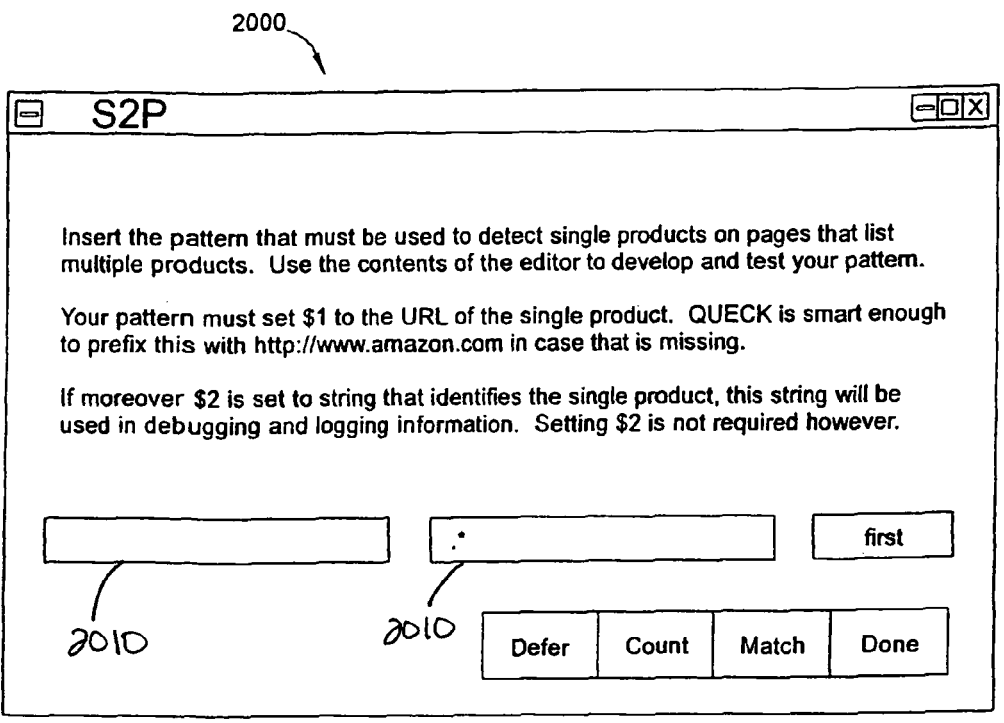
FIG. 20 is an exemplary graphical user interface window for the selection of patterns in the non-programming development of rules associated with the voice portal of FIG. 1.

A graphical user interface (GUI) 1800 illustrated in FIG. 18 shows a form option to be selected by the rule writer. If the form is correct, the rule writer clicks the "done" button. If the form listed does not give the rule writer the choices required, the rule writer clicks on the "next" button to see other forms on the page. Once a page that matches is found; a graphical user interface (GUI) 1900 illustrated in FIG. 19 is displayed.

Data organizing tool 1025 (FIG. 10) displays the resulting page in the Internet browser. If the page is correct, the rule writer clicks on "OK" on GUI 1900. A graphical user interface (GUI) 2000 illustrated in FIG. 20 appears and asks how to detect single items on the page if the search matches on multiple items. GUI 2000 is also used to indicate where to find the URL to get details about the queried item. If only a single item was found, the rule writer clicks the "defer" button because not enough information is present to build the regular expression. If multiple items are found, a regular expression is entered into a data window 2010. For example, an author search may return multiple items because a single author may have written several books. In other cases, even if the query only matches one item, it may be necessary to follow an additional URL link to get the information.

Figure 21:
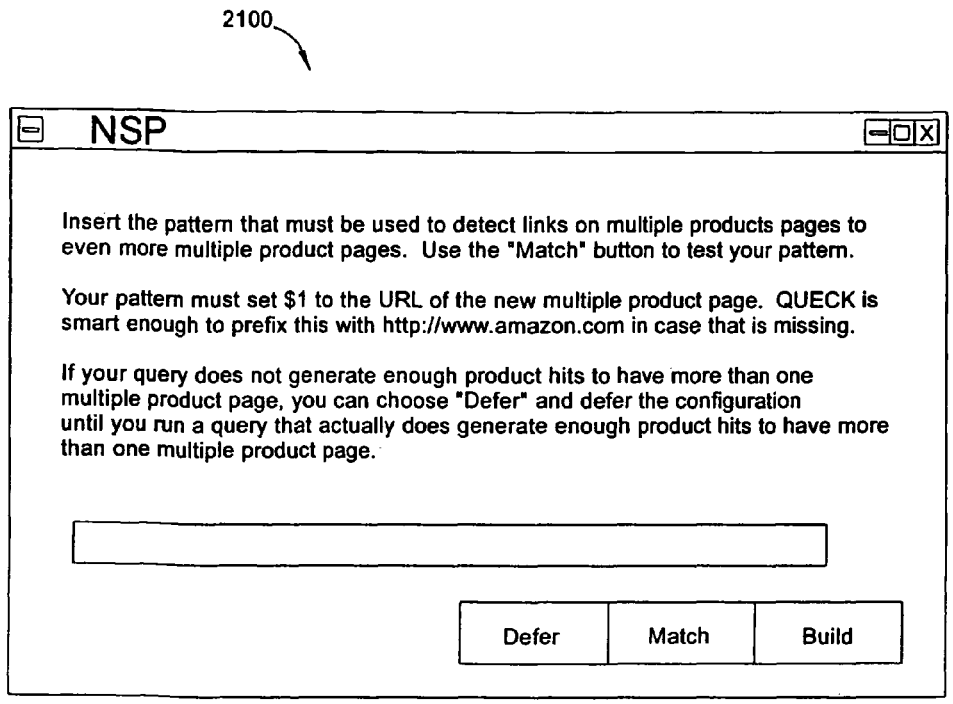
FIG. 21 is an exemplary graphical user interface window used to identify patterns for the detection of links on multiple pages during the non-programming development of rules associated with the voice portal of FIG. 1.

A graphical user interface (GUI) 2100 illustrated in FIG. 21 appears next and is used to detect multiple product pages. If the rule writer goes directly to the item searched for, there is no need for information to build the regular expression. Referring again to FIG. 11, code window 1197 is filled with HTML code from the retrieved page. At this point, the rule writer is ready to specify attributes. Attributes are specified by entering a regular expression into the box next to their name. The regular expression must specify one substring in it (using parenthesis) as a result of the expression. For example, the regular expression: "this (all) matches" would return "all" as its result (assuming that the regular expression was able to match). For example, determining the pattern used to find the title of a book requires that the rule writer type in the title of the book into search window 1195. A variety of HTML signals may be used. The "\s*" is required to indicate possible blank space between words. The first match of the search string entered in search window 1195 will highlight the first match found in the HTML code. For example, a title may be found inside a pair of <title> tags with some extra information. An exemplary attribute for title of a book may be "<title>([<]*)</title>". Once the attribute is entered, all matches to the attribute are found.

Referring again to FIG. 14, search data editor 1400 consists of a form which can be used to assign values to type dependent attributes. The status window indicates what data organizing tool 1025 is doing. In an exemplary embodiment, the status states are idle, running the query over the Internet, and using the cache. Query window 1140 allows the rule writer to set the type of query desired for the data source in question as well as set the search criteria by using the SDE button.

Spider selection window 1130 allows the rule writer to set the spider to be used if not doing a query search. In an exemplary embodiment, the possible spider types are full, incremental, special, and reference. A full spider takes all items that match the chosen type. Incremental spiders are usually used to pick up updates of data from Internet data sources. Special spiders are usually used to pick up something that the site has that is special, such as, best sellers for books. Reference spiders are usually used to confirm that the site is still up and rules are working.

Vendor window 1120 allows the rule writer to set the data source to work on. Search window 1195 allows the rule writer to keep text to be searched for in the HTML code. In code window 1197, there is a cursor to indicate position of text entry. Left set of arrows 1190 includes a first number, which is the starting point of where the search will run when running from the cache. The second number indicates the total number of pages in the cache. The set of arrows in this window controls the page to start from when the rule writer runs from the cache. Right set of arrows 1180 includes arrows to scroll through pages retrieved.

Figure 22:
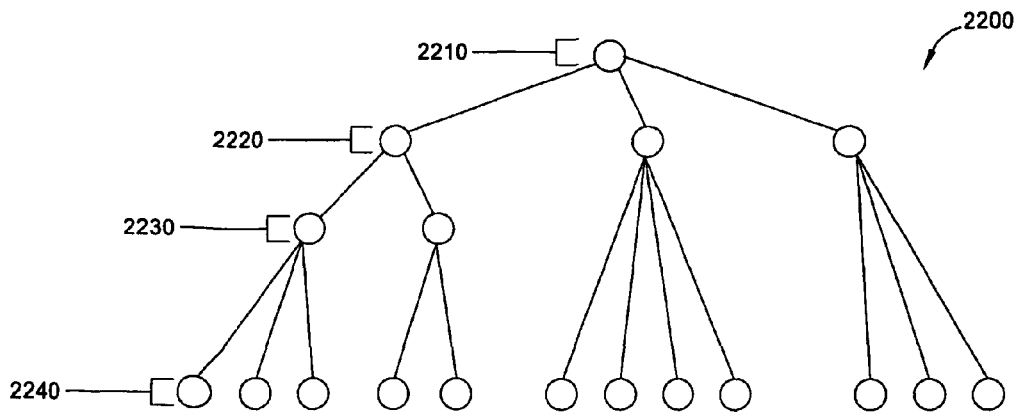
FIG. 22 is a diagrammatical representation of the hierarchical structure used in the programming of a spider.

Spiders are similar to queries but they are called when no other rules are applicable. Spiders are responsible for gathering information on every object in the web site that matches the specified type. The spider consists of several nested loops, each designed to go one level deeper into the hierarchy. Referring now to FIG. 22, an exemplary spider hierarchy 2200 is shown for a book spider where a level 2210 is the start page, a level 2220 represents book category pages, level 2230 represents book sub-category pages, and a level 2240 represents book pages.

Figure 23:
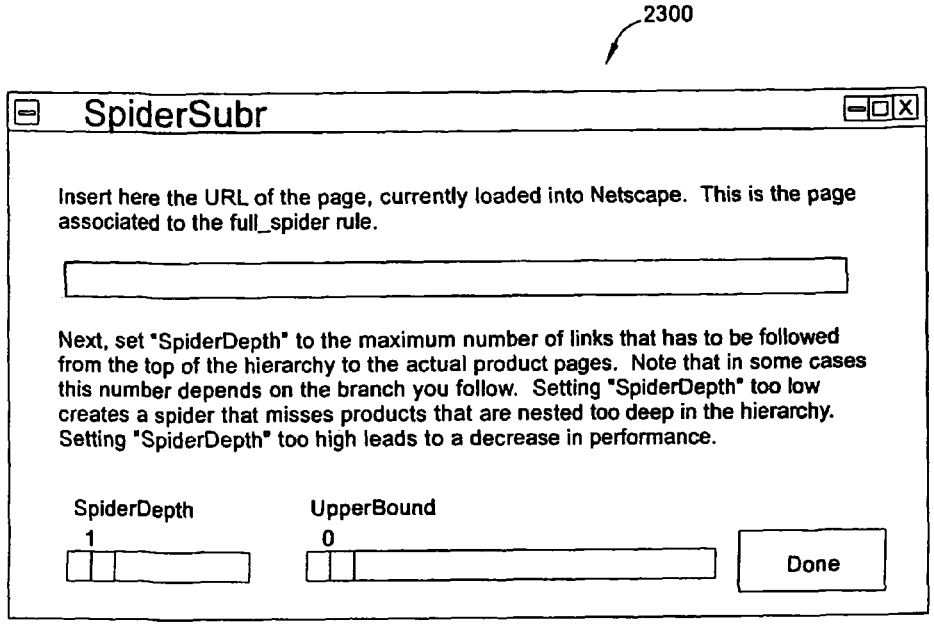
FIG. 23 is an exemplary graphical user interface window for the programming of a spider used with the voice portal of FIG. 1.
Figure 24:
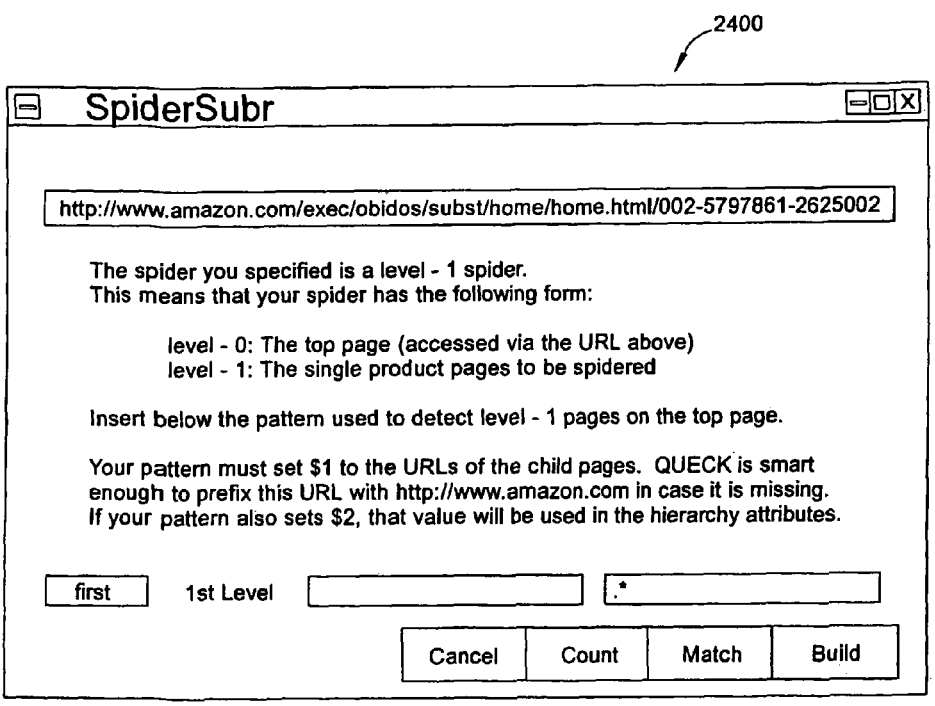
FIG. 24 is an expanded form of the exemplary graphical user interface window of FIG. 23.

Referring now to FIG. 23, a graphical user interface (GUI) 2300 is used to retrieve the URL of a page to be associated with a spider rule. A spider depth slide rule allows the rule writer to tell data organizing tool 1025 how many links down it takes to get to the actual product page. The upper bound slide rule allows the rule writer to specify a limit on how many items to spider. Once the URL is selected and a spider depth and an upper bound is selected, the rule writer clicks on the "done" button. A graphical user interface (GUI) 2400 illustrated in FIG. 24 is shown. The rule writer enters search patterns for the spider to use in a similar fashion to the search patterns entered for a query described with reference to FIG. 11. Once the pattern is entered, the rule writer clicks on the "build" button and the spider will start to run.

Advantageously, the graphical user interfaces shown and described with reference to FIGS. 11-24 allow non-expert rule writers to perform data searches and create forms of rules for information retrieval. Once the forms are created, the forms can be frequently used to gather updated information. Further, forms are helpful to retrieving large amounts of information available at a vendor's web site using a common form corresponding to the arrangement and display of information by the vendor on the web site. Advantageously, forms of rule creation by non-experts provides for lower costs to update information available at web sites. Further, the forms advantageously automate accurate retrieval of Internet-based information.

Figure 25:
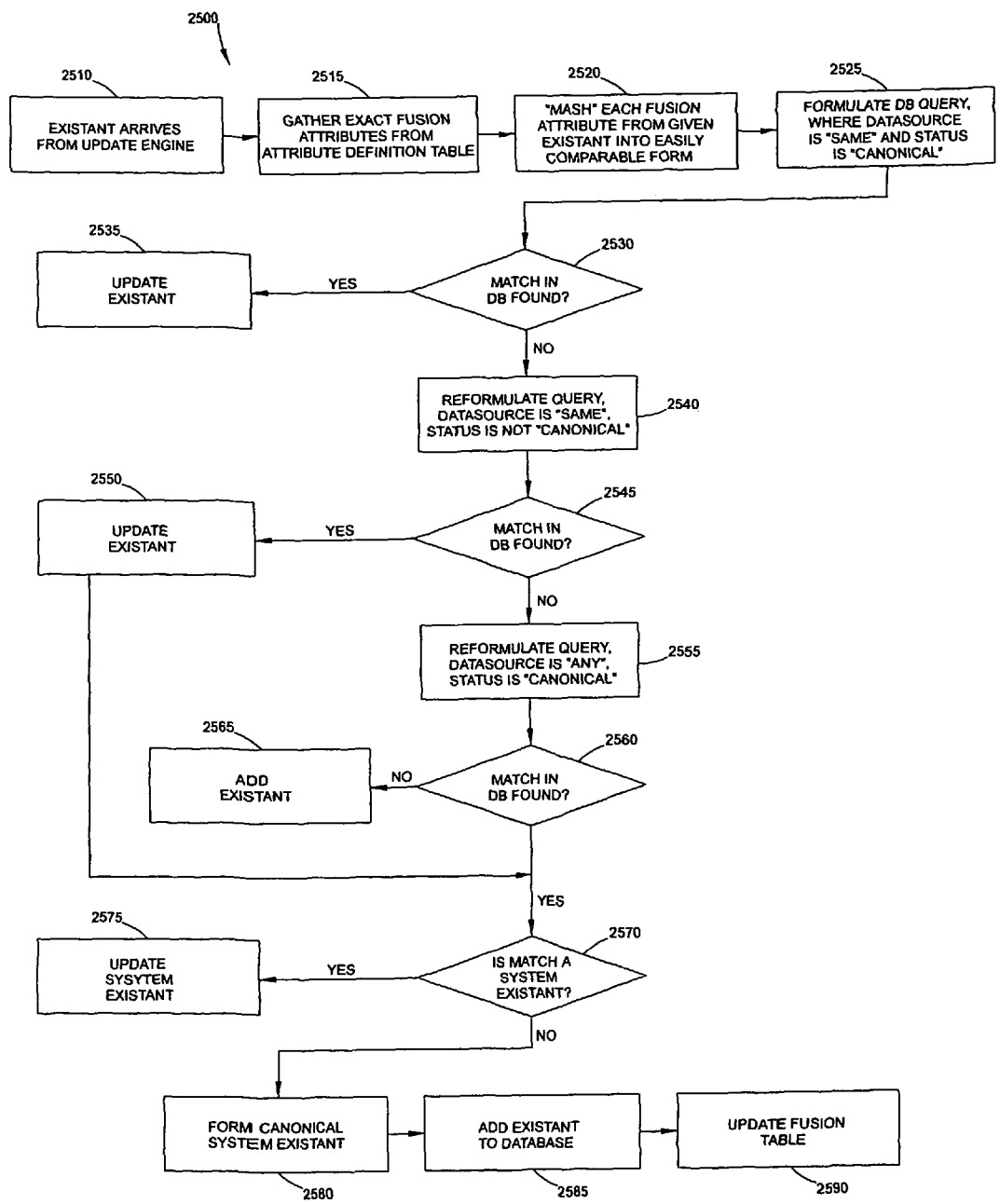
FIG. 25 is a flow diagram illustrating an exemplary process of fusing information into a unified database of the voice portal of FIG. 1.

FIG. 25 illustrates an exemplary process of fusing information in a database. In exemplary embodiment illustrated by FIG. 25, a flowchart 2500 depicts a simplistic fusion process, or "quick fusion", executed by fusion engine 150 (FIG. 2). In a step 2510, update engine 160 receives information from network 20 and places the information in a existant data structure in database 170 via existant subsystem 140, which accesses database 170. After step 2510 is performed, a step 2515 is performed in which fusion engine 150 gathers exact fusion attributes from an attribute definition table corresponding to the existant retrieved in step 2510. After step 2515 is performed, a step 2520 is performed in which fusion engine 150 executes a "mash" of each fusion attribute from existants retrieved from database 170 into an easily comparable form. In an exemplary embodiment, a "mash" form removes spaces, prepositions, and other non-essential words. Advantageously, a "mashed format provides for quick searching capabilities."

After step 2520 is performed, a step 2525 is performed in which fusion engine 150 formulates a database query in which the data source is set to "same" and the status is set to "canonical". This query is intended to find an already existing canonical existant from the same data source file which matches the current information. After step 2525 is performed, a step 2530 is performed in which a decision is made whether a match in database 170 is found. If a match in database 170 is found due to the query of step 2525, a step 2535 is performed in which the existant contained in database 170 is updated.

If no match in database 170 is found from the query of step 2525, a step 2540 is performed in which the query of step 2525 is reformulated and the data source is set to "same" and the status is set to "non-canonical". This query is intended to find an already existing existant from the same data source file which matches the current information. After step 2540, a step 2545 is performed in which a decision is made whether a match is found in database 170 from the reformulated query of step 2540. If a match is found, a step 2550 is performed in which the existant is in database 170 is updated.

If no match is found in database 170, a step 2555 is performed in which the query is reformulated with the data source being set to "any" and the status is set to "canonical". This query is intended to find an already existing canonical existant from any data source which matches the current information. After step 2555, a step 2560 is performed in which a determination is made whether a match in database 170 is found. If no match in database 170 is found, a step 2565 is performed in which an existant is added to database 170.

If a match in database 170 is found or after step 2550 is performed, a step 2570 is performed in which a determination is made whether the match is a system existant. If the match is a system existant, a step 2575 is performed in which the system existant is updated. If the match is not a system existant, a step 2580 is performed in which a canonical system existant is formed. After step 2580 is performed, a step 2585 is performed in which the existant is added to database 170. After step 2585, a step 2590 is performed in which the fusion tables are updated.

Advantageously, the exemplary process of fusing information in a database illustrated by FIG. 25 provides for the comparison of information on multiple web sites. As such, a determination can be made if one web site contains the same information as another web site. Furthermore, information contained in database 170 of voice portal 10 can continually add information, relationships, and associations of information from Internet-based sources, which provides for greater usability of information retrieved from data sources.

Figure 26:
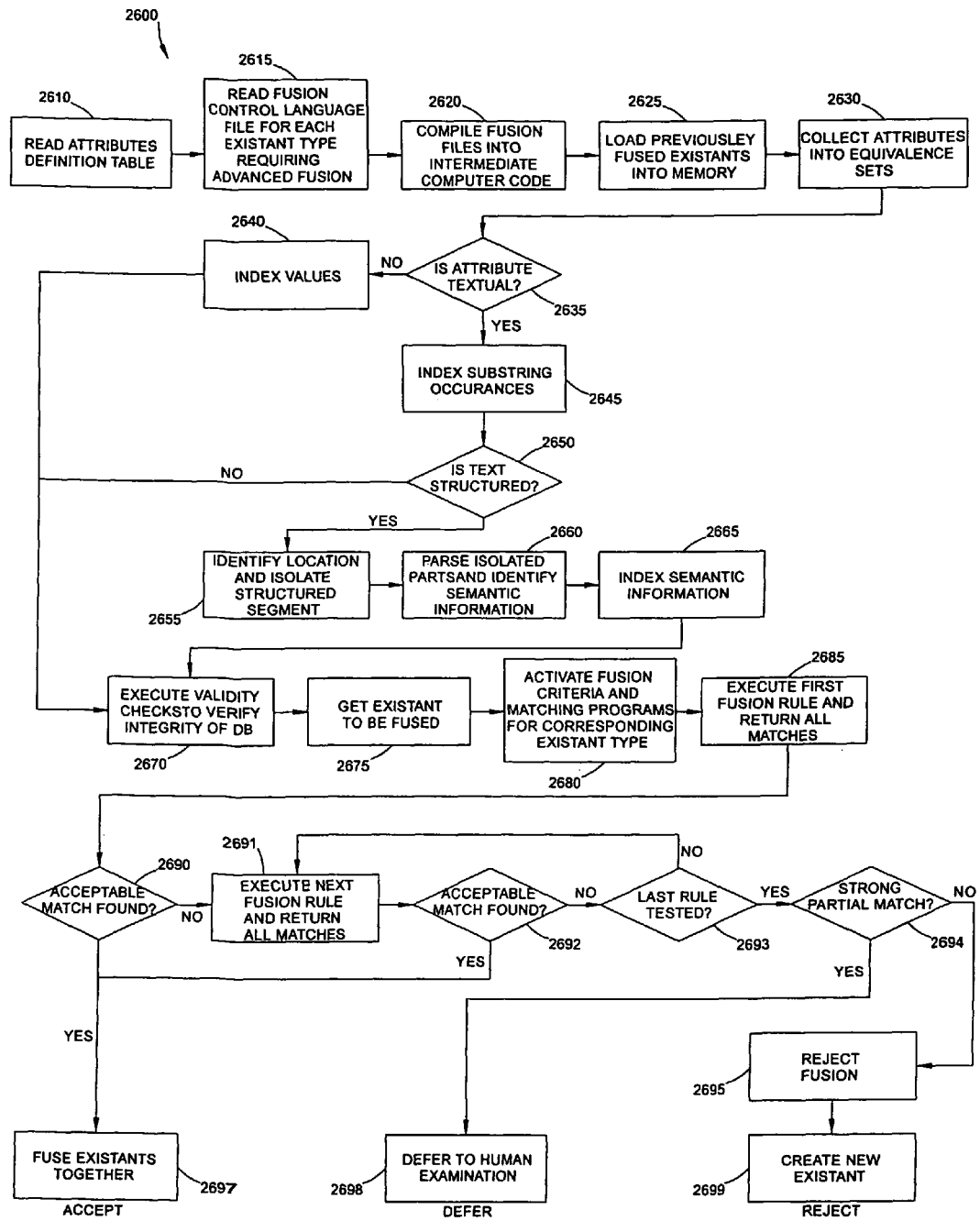
FIG. 26 is a flow diagram illustrating a second exemplary process of fusing information into a unified database of the voice portal of FIG. 1.

FIG. 26 illustrates a flow chart 2600 depicting steps taken in an exemplary process of fusion. In the exemplary process described with reference to FIG. 26, a fusion process is shown which is more comprehensive than the fusion process depicted in flow chart 2500 described with reference to FIG. 25. In a step 2610, fusion engine 150 reads an attributes definition table from database 170. After step 2610 is performed, a step 2615 is performed in which fusion engine 150 reads a fusion control language file for each existant type requiring advanced fusion. After step 2615 is performed, a step 2620 is performed in which fusion engine 150 compiles fusion files into an intermediate computer code. After step 2620 is performed, a step 2625 is performed in which fusion engine 150 holds previously fused existants into memory. After step 2625, a step 2630 is performed in which fusion engine collects attributes into equivalent sets. After step 2630, a step 2635 is performed in which a decision is made whether an attribute is textual. If fusion engine 150 determines that the attribute is not textual, a step 2640 is performed in which the values are indexed. If fusion engine 150 determines attribute is textual, a step 2645 is performed in which fusion engine 150 indexes substring occurrences in the attribute.

After step 2645, a step 2650 is performed in which fusion engine 150 determines whether the text is structured. If the text is determined to not be structured, a step 2670 is performed. If the text is determined to be structured, fusion engine 150 identifies location and isolated structural segment of the text in a step 2655. After step 2655, a step 2660 is performed in which fusion engine 150 parses isolated parts and identifies semantic information. After step 2660, a step 2665 is performed in which fusion engine 150 indexes semantic information. After step 2665, step 2670 is performed in which fusion engine 150 executes validity checks to verify the integrity of database 170. After step 2670, a step 2675 is performed in which fusion engine 150 retrieves the existant to be fused.

After step 2675, a step 2680 is performed in which fusion engine 150 activates fusion criteria and matching programs for corresponding existant types. Fusion criteria and matching programs involve the use of existant rules which are established as described with reference to FIG. 10. After step 2680, a step 2685 is performed in which fusion engine 150 executes the first fusion rule from the fusion criteria and matching programs and returns all matches. After step 2685, a step 2690 is performed in which a decision is made whether an acceptable match has been found. In an exemplary embodiment, an acceptable match is one in which a predetermined percentage (e.g., 70%) of attributes are common. In an alternative embodiment, an acceptable match is one in which all attributes which have values that are the same. If an acceptable match has been found, a step 2697 is performed in which a fusion engine 150 fuses existants together. If an acceptable match is not found, a step 2691 is performed in which the next fusion rule is executed and all matches are returned.

After step 2691, step 2692 is performed in which a determination is made whether an acceptable match is found. If an acceptable match is found, step 2697 is performed in which fusion engine 150 fuses existants together. Fusion of existants includes the creation of a new existant which is associated with the existants to be fused and contains all information therein. If an acceptable match is not found, a step 2693 is performed in which a determination is made whether the last rule has been tested. If the last rule has not been tested, step 2691 is performed again. If the last rule has been tested, a step 2694 is performed in which fusion engine 150 determines whether there are strong partial matches. In an exemplary embodiment, a strong partial match is one in which a match is within a certain percentage, such as, 70%. If strong partial matches exist, a step 2698 is performed in which a deference is made to human examination. If partial matches are not found, a step 2695 is performed in which fusion engine 150 rejects the fusion creation, and a step 2699 is performed in which a new existant is created.

Advantageously, the exemplary process of fusing information in a database illustrated in FIG. 26 provides for the automatic comparison of information from the same or different data sources. As such, information contained in database 170 can continually be updated and given added relatedness to information from other data sources. Further, fusion allows for the compilation of a more complete and robust unified database than the millions of databases individually available on the Internet.

Figure 27:
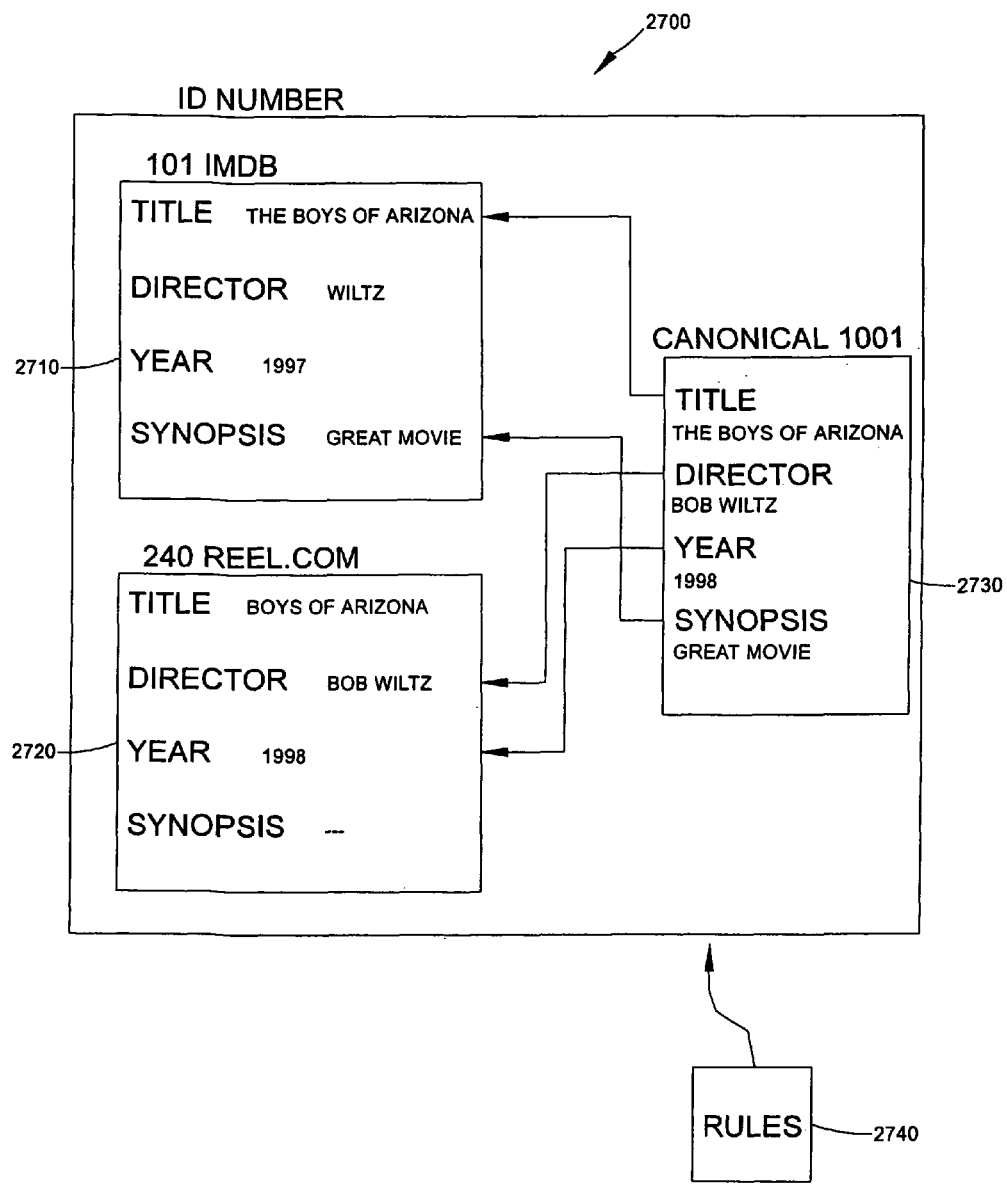
FIG. 27 is a diagrammatical representation of the creation of a canonical existant from two existants for more complete information on a given item.

FIG. 27 illustrates an exemplary process of creating a canonical data structure from two data structures. A data file 27 is identified by a unique identification number and contains a first data file 2710, a second data file 2720, and a canonical data file 2730. In an exemplary embodiment, first data file 2710 contains information relating to particular movie retrieved from the IMDB ("Internet Movie Database") website. Second data file 2720 includes movie information for a particular movie obtained from the REEL.com website. In the example illustrated by FIG. 27, data file 2710 includes a title "Boys of Arizona," the director "Wiltz," the release year "1997," and a synopsis "great movie." Similarly data file 2720 includes a title "The Boys of Arizona," the director "Bob Wiltz," the release year "1998," and a synopsis which is blank.

During the process of creating a canonical data file, a rules file 2740 is introduced which contains rules for a particular type of information. In the example shown in FIG. 27, rules file 2740 contains information relating to the attributes of movies. By application of rules 2740, a chronicle data file 2730 is created by taking the most complete title from data file 27 and data file 2720, which is the title from data file 2710: "The Boys of Arizona." Director information is obtained from data file 2720 because it is more complete than data file 2710 because it contains the director's first and last name. A conflict exists as to the release year listed by data file 2710 and that listed by data file 2720. Based on prior information, the conflict is resolved to indicate that data file 2720 has a more correct release year. Chronicle data file 2730 include the synopsis data file 2710 because the synopsis of data file 2720 is blank.

Advantageously, the process of creating chronicle data files described with reference to FIG. 27 creates data files with more complete and accurate information. Furthermore, the process allows comparison of information between multiple websites. Even further, the process of creation of chronicle data files allows the increase in relatedness and association relationships among data files.

Figure 28:
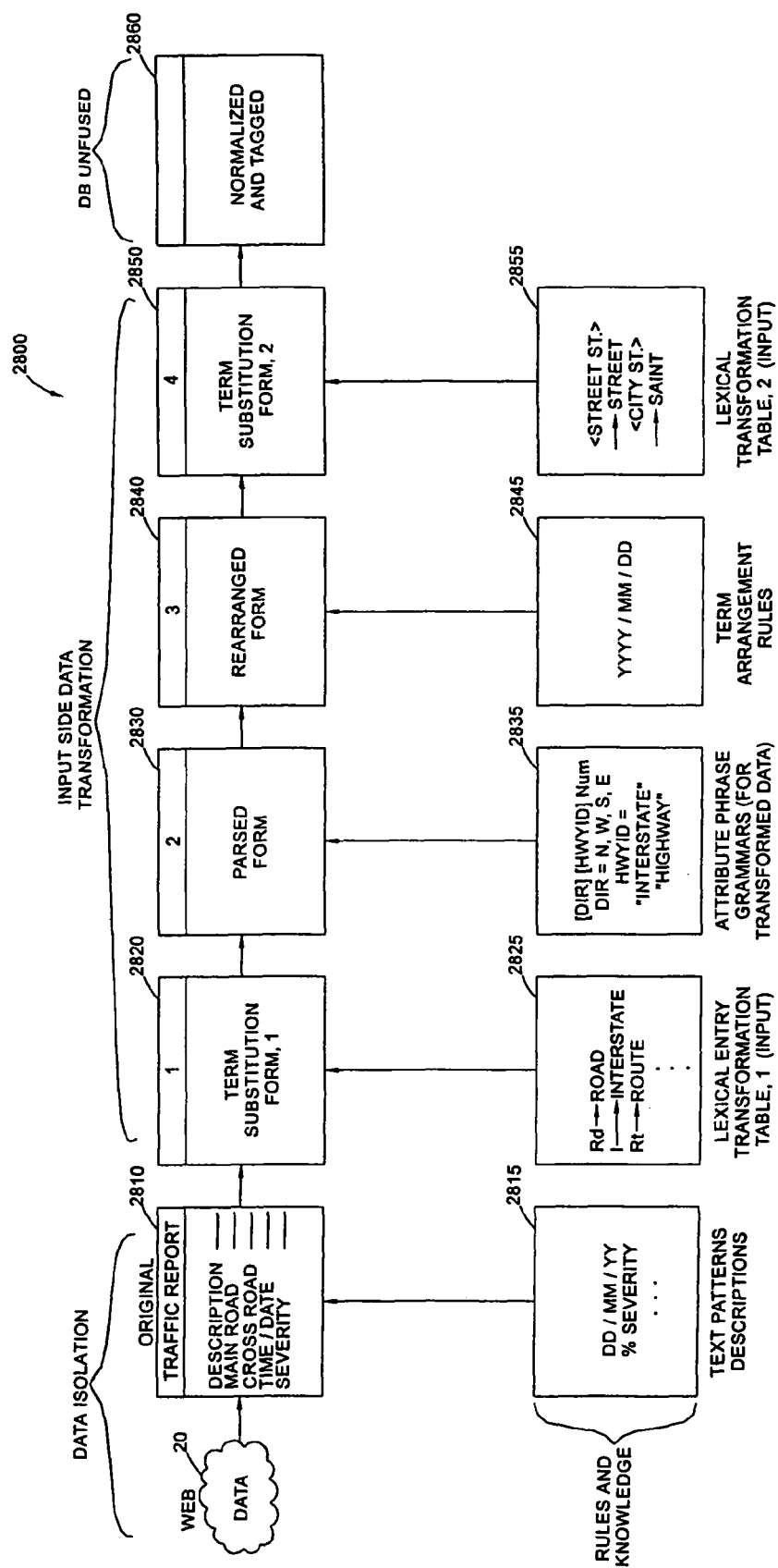
FIG. 28 is a diagrammatical representation of a first portion of an exemplary process of data isolation and transformation from an Internet source to a user of the voice portal of FIG. 1.

FIG. 28 illustrates a functional diagram 2800 of the operations carried out during isolation of data obtained from the web and transformation of that data for storage in a database. The exemplary process includes extracting data from network 20 into a data structure 2810 in which data is arranged and organized. For example, data related to a traffic report may be extracted from the Internet to include information on a description, a main road, a crossroad, a time, a date, and a severity rating. Data structure 2810 is created and organized by use of rules 2815 which include text patterns and descriptions which permit the arrangement and organization of data into data structure 2810. Data structure 2810 is stored in a data file on a database. Data in data structure 2810 undergoes a transformation in which a first term substitution form is applied to create a data structure 2820. Rules 2825 are applied during the term substitution to create data structure 2820, including lexical entry of the transformation table. In the traffic report example, "Rd." is transformed to be "road", "I." is transformed to be "interstate", and "Rt." is transformed to be "route".

Data contained in data structure 2820 is then put in a parsed form in a data structure 2830 according to rules 2835 which apply attribute phrase grammars for transferred data. In the traffic report example, a "direction", such as, north, west, south, and east is identified and a "highway identifier" is determined, such as "interstate" or "highway". Data in data structure 2830 is then placed in a re-arranged form in data structure 2840 by applying term arrangement rules 2845. Data in data structure 2840 is manipulated by a second term substitution form and placed in data structure 2850 by applying rules 2855 from the lexical transformation table. For example, the term "St." is determined to be either "street" or "saint" based on its locational identifier <street st.> or <city st.> in the lexical transformation table.

After the lexical transformations are performed, data is placed in data structure 2860, an unfused, normalized, and tagged format. Data structure 2860 preferably resides in database 2850. Normalized and tagged format refers to a format including a uniform organization such that data can be easily searched and compared and HTML tags. Often, HTML tags provide information on the type of data, its location, and its length. Unfused means that the data has not gone through the fusion process described with reference to FIGS. 25 and 26.

Advantageously, the data isolation process described with reference to FIG. 28 takes data from the Web and transforms it into a normalized and tagged format in a database. Normalized and tagged data is prepared for organization, manipulation, and fusion. Advantageously, the data isolation process is uniform and works for data from a wide range of data sources. Thus, generally the process includes obtaining data from Internet sources, creating a first data file with the obtained data in a first format, and generating phrases from the obtained data where the phrases are in a second format associated with a specific interface. A wide range of applications may be used to convert the obtained data into the first and second formats. For example, text patterns, lexical transform tables, attribute phrase grammars, and term arrangement rules may be used to convert obtained data into a uniform and searchable format, which is saved in a data file in a database, and then convert the saved data to an interface specific format. In alternative embodiments, other patterns, tables, rules, and data manipulation applications may be used.

Figure 29:
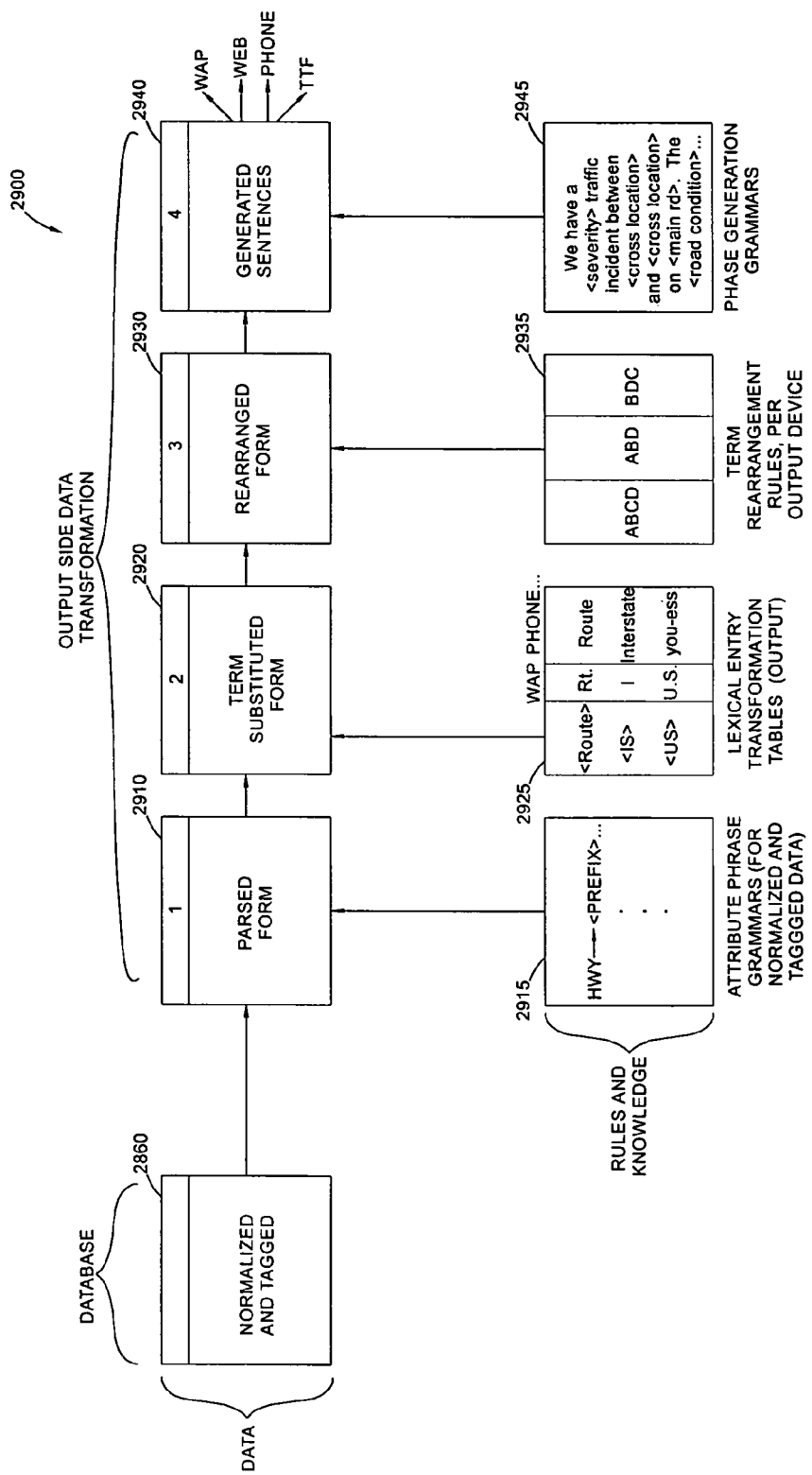
FIG. 29 is a diagrammatical representation of a second portion of the exemplary process of FIG. 28 in which data is isolation and transformed from an Internet source to a user of the voice portal of FIG. 1.

FIG. 29 is a functional diagram 2900 illustrating the transformation of data from database 170 to a user of voice portal 10 via some user interface platform (e.g., WAP, Web, phone, ASR, TTF). Data contained in data structure 2860 (shown also in FIG. 29) is put in a parsed form in a data structure 2910 by applying rules 2915 with attribute phrase grammars for normalized and tagged data. Attribute phase grammars take normalized and tagged data to create sensible phrases which include the attributes identified. Data from data structure 2910 is then placed in data structure 2920 by applying a term substituted form using rules 2920 containing lexical entry transformation tables. In the exemplary embodiment, the lexical entry transformation tables of rules 2920 list the data output structure corresponding to a particular interface. For example, the term "route" is transformed into "Rt." for WAP applications and transformed into "Route" for telephone applications using speech. Similarly, the term "U.S." is transformed into "U.S." for WAP applications and to "you ess" for phone applications using speech.

Data from data structure 2920 is placed in a re-arranged form in a data structure 2930 by applying rules 2935 in which term replacement rules are applied, depending on the output device used. Term rearrangement rules move terms around to the arrangement which best suits different user interfaces. Data in data structure 2930 is then placed in a data structure 2940 in which sentences are generated by applying rules 2945 which include phase generation grammars. For example, a sentence may be generated which says "we have a <severity> traffic incident between <cross location> and <cross location> on <main road>." Once data is in the format of data structure 2940, it is prepared for a variety of output interfaces, such as, WAP, Web, phone, and ASR.

Advantageously, the data transformation process described with reference to FIG. 29 is a uniform process which takes data and prepares it for a wide range of user interfaces. For example, the process allows for data to be extracted from web sources and be semantically identified and prepared for speech transmission via a speech interface. At the same time, the process allows for the same data to be prepared for transmission to WAP devices or web applications.

FIGS. 30-33 illustrate several operational paths that demonstrate exemplary interactions between the user and voice portal 10. User interface 110 preferably makes use of explicit prompting to guide the user into making appropriate utterances as described with reference to FIGS. 32-33.

Figure 30:
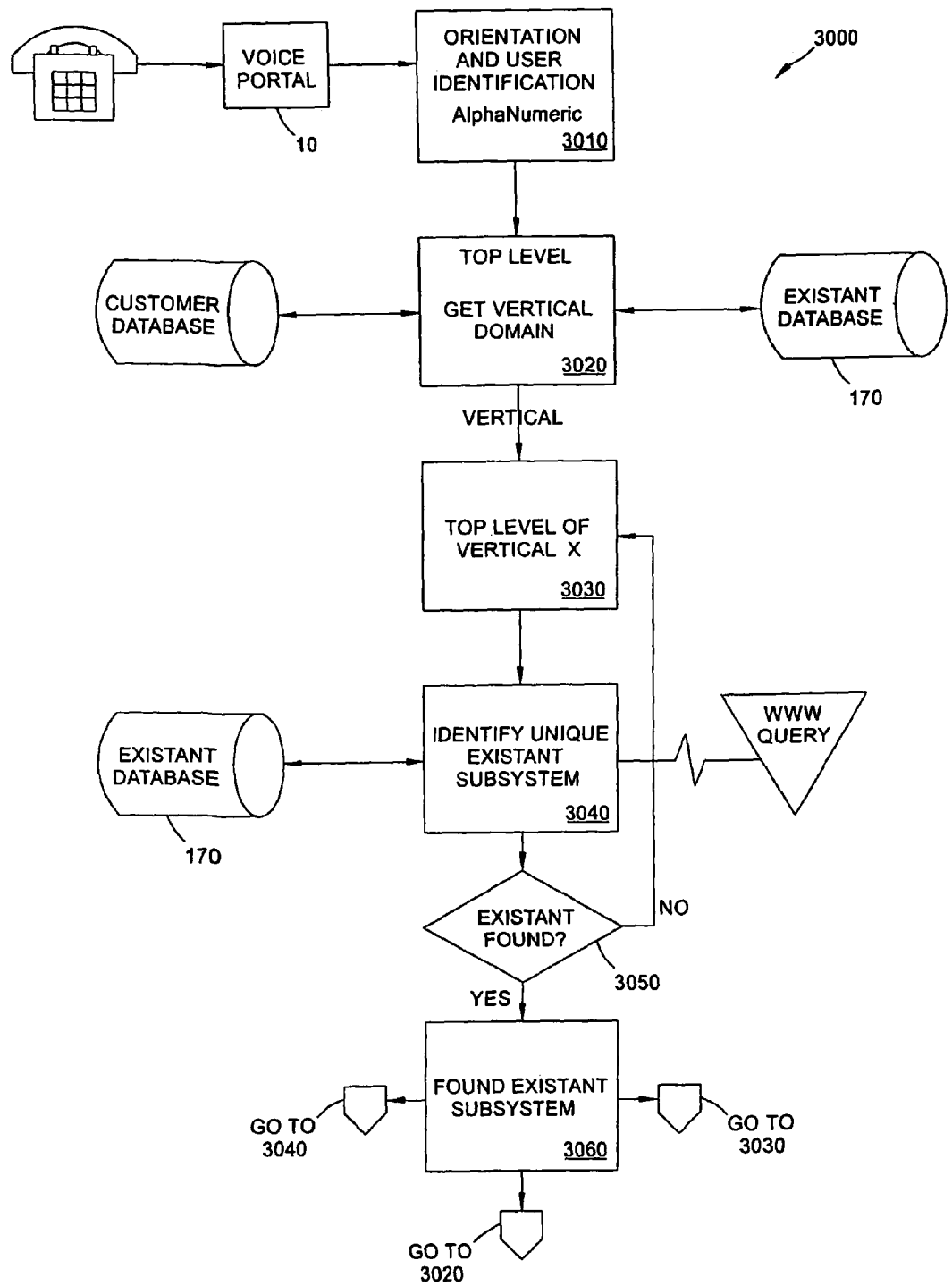
FIG. 30 is a flow diagram illustrating an exemplary operational flow of the voice portal of FIG. 1.

FIG. 30 is a flow diagram 3000 depicting an exemplary system overview, including process blocks representing various functionalities of voice portal 10. In an exemplary execution path, at a block 3010, voice portal 10 greets the user by saying, "Welcome to Quack, brought to you by American Express." Preferably, voice portal 10 uses caller-ID as means of identifying the user. In a preferred embodiment, phone numbers are stored as a customer attribute in database 170. Alternatively, phone numbers are stored in a customer database. Voice portal 10 continues by stating, "Hello, Steve Woods. Please say your PIN or enter it on the numeric keypad. If this is not Steve, please say or enter your phone number."

The user then responds verbally "5082" to give his or her PIN. Once authentication is made, voice portal 10 goes to a block 3020. At block 3020, voice portal 10 indicates "You are at the Quack runway. Please say the name of the category you are interested in from the following list: movies, weather, traffic, stocks, and sports." The user responds with a category name or a goodbye. If a category name is provided, voice portal 10 goes to a block 3030. If a goodbye is given, voice portal 10 provides a graceful exit to voice portal 10. In an exemplary response, the user says "Weather" and voice portal 10 goes to block 3030. At block 3030, voice portal 10 says, "Welcome to Weather, brought to you by The Weather Channel," and goes to a block 3040. At block 3040, the identify unique existant subsystem is performed.

After block 3040, a block 3050 is performed in which a determination is made as to whether the existant was found in the identify unique existant subsystem of block 3040. If the existant was not found, control returns to block 3030. If the existant was found, a block 3060 is performed in which the found existant subsystem (described with reference to FIG. 33) is performed.

Figure 31:
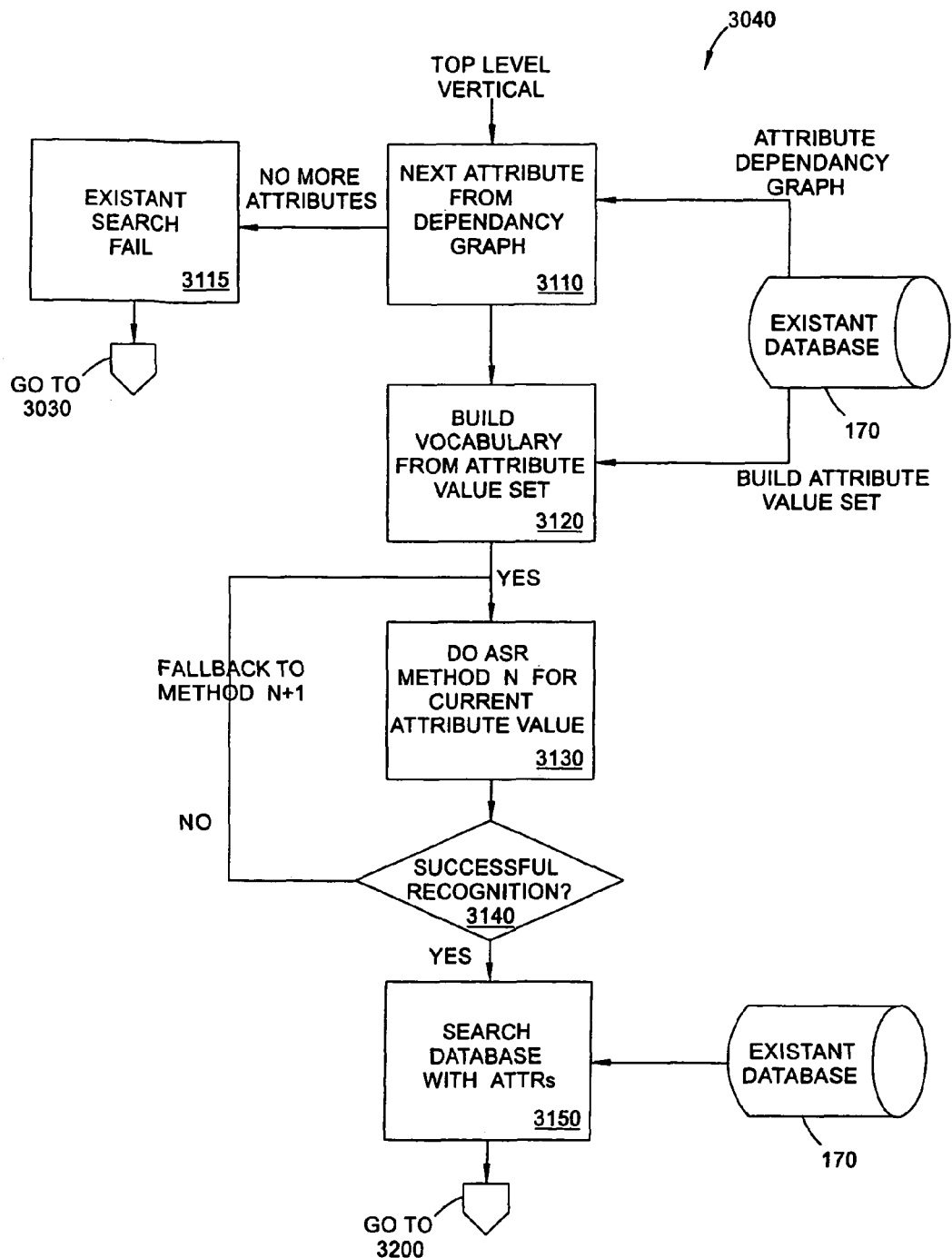
FIG. 31 is a flow diagram illustrating an exemplary operational subsystem of the flow diagram of FIG. 30.

Referring now to FIG. 31, the identify unique existant subsystem executed at block 3040 (FIG. 30) includes a block 3110 in which database 170 provides an attribute from an attribute dependency graph for the current vertical domain (e.g., weather, traffic, movies). If there are not more attributes in the attribute dependancy graph, control passes to a block 3115 where an existant search fail is noted. After block 3115, control passes to block 3030 (FIG. 30). After block 3110 (FIG. 31), a block 3120 is executed in which an attribute vocabulary is built from an attribute value set provided by database 170. After block 3120 is performed, a block 3130 is performed in which voice portal 10 uses automatic speech recognition (ASR) techniques following a method N to acquire the user's response to an attribute value prompt. For example, voice portal 10 may request the user's location by ZIP code, one exemplary method N. The user may respond by giving his or her ZIP code, such as, "53045".

At a block 3140, a decision is made as to whether the voice recognition was successful. If not successful, block 3130 is performed with ASR techniques following a fallback method N+1. For example, in the weather vertical domain, a fallback method N+1 may be to ask for the state and city of the user's location. In preferred embodiments, fallback methods include choosing an attribute from a list, constraining the attribute value set by partitioning space (e.g., get state, then city name), and spelling the attribute value. If voice recognition is successful, a block 3150 is performed in which voice portal 10 searches database 170 with the acquired attribute. After block 3150 is performed, a flow chart 3200 (FIG. 32) is performed.

Figure 32:
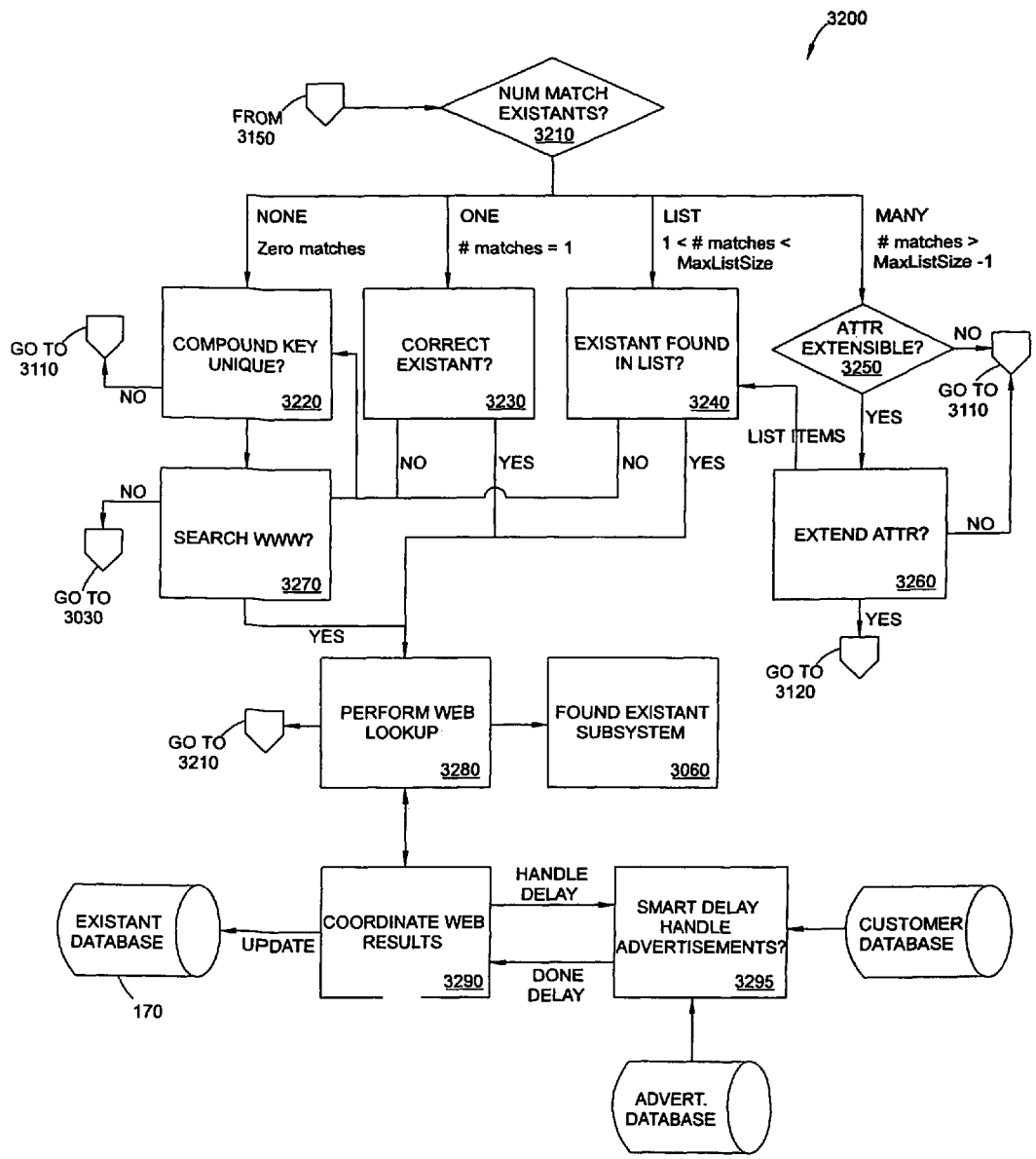
FIG. 32 is a flow diagram illustrating a second exemplary operational subsystem of the flow diagram of FIG. 30.

Referring now to FIG. 32, flow chart 3200 is shown illustrating a portion of the identify unique existant subsystem. After block 3150 is performed (FIG. 31), a block 3210 is performed to determine the number of matching existants from the search of database 170. Different actions are taken depending on the number of matches found in the search of the product database. If no matches are found, a block 3220 is performed in which a determination is made as to whether to seek a Compound Unique Key. A Compound Unique Key may exist if there are one or more unique keys or identifiers which are not contained within database 170, but may be used to find the desired item on the Internet.

If one match is found, a block 3230 is performed in which voice portal 10 verifies if the match is the correct existant. If the number of matches is greater than one but less than the maximum number for a list, a block 3240 is performed in which the user is requested to identify the existant from the list of matches. If more matches are found than the maximum number of possible entries in a list, a block 3250 is performed in which it is determined whether the attribute is "extensible." In other words, a determination is made as to whether more information can be provided about the attribute. If more information cannot be provided, control returns to block 3110 (FIG. 31) in which another attribute from the attribute dependency graph is obtained. If the attribute is extensible, a block 3260 is performed in which the attribute is attempted to be extended. If the attribute can be extended, control passes to block 3120 (FIG. 31) in which a vocabulary set is built and ASR techniques and methods are used to obtain an attribute value. If the attribute cannot be extended, control passes to block 3110 (FIG. 31) in which another attribute from the attribute dependency graph is obtained. If the extension of the attribute results in a list of items, control passes to block 3240.

Referring now to the query performed at block 3220, if a determination is made that there is not a Compound Unique Key to use for a WWW search, control passes to passes to block 3110 (FIG. 31). If the determination is made that a Compound Unique Key may exist, control passes to a block 3270 in which a determination is made as to whether the WWW is searched. If the WWW is not to be searched, control passes to block 3030 (FIG. 30) which is the top level of the current vertical domain. If the WWW is to be searched, control passes to a block 3280. Referring now to block 3230 and block 3240, if the correct existant is found or the correct existant is found from the list, control passes to block 3280. If the correct existant is not found in block 3230 or block 3240, control passes to block 3220 for a determination of whether there is a Compound Unique Key which can be searched on to find an item. At block 3280, a web lookup is performed. At this point, the customer may be presented targeted advertisement of a variety of lengths. Advertising is described in further detail with reference to FIG. 36. During block 3280, block 3060 is performed in which a found existant subsystem is executed.

Figure 33:
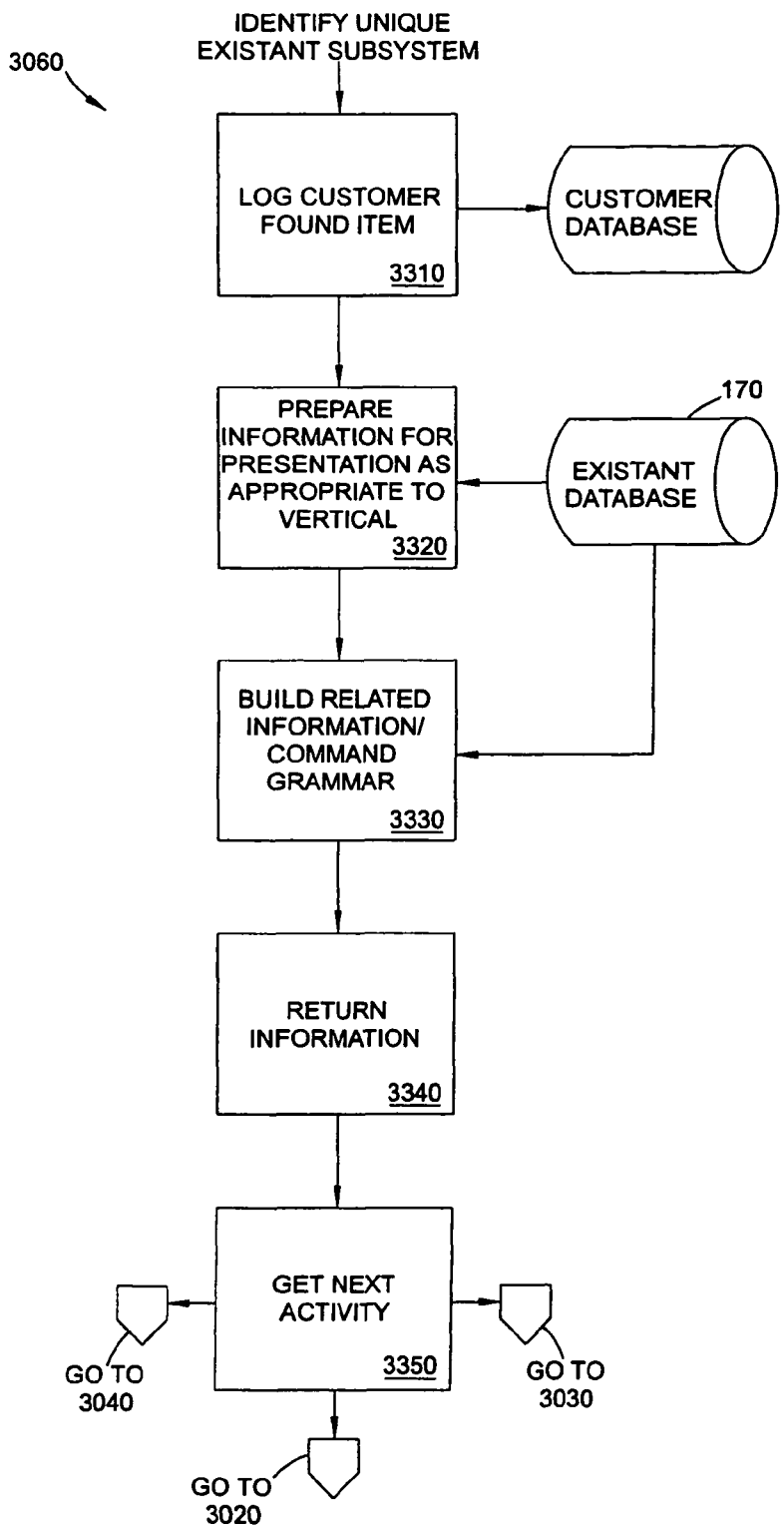
FIG. 33 is a flow diagram illustrating a third exemplary operational subsystem of the flow diagram of FIG. 30.

Referring now to FIG. 33, the found existant subsystem includes a block 3310 in which a log is made into the customer database of the found item. In a preferred embodiment, customer database is included in database 170. After block 3310, a block 3320 is performed in which information is prepared for presentation as appropriate to the vertical domain from information in database 170. After block 3320, a block 3330 is performed in which related information and command grammar is built. For example, in the movie vertical domain, if a list of movies showing at a specific theater is played, grammar would include the movie titles to allow the user to ask for more information about a particular movie.

At a block 3340, information is returned from the user. In a preferred embodiment, possible acceptable commands include commands to hear more detailed information, to hear information from a specific source, to hear related information (e.g., cheaper, better), and to take action appropriate to the vertical domain (e.g., increase the bid, change location). After block 3340, a block 3350 is performed in which the next activity is obtained. If a new vertical domain is desired, control passes to block 3020 (FIG. 30). If a new selection from the top of the current vertical domain is desired, control passes to block 3030 (FIG. 30). If a new existant is desired, control passes to block 3040 (FIG. 30).

Referring again to FIG. 32, after block 3280 is performed, a block 3290 is performed in which web lookup results are coordinated by updating database 170. During coordination of the web results at block 3290, a smart delay handle may be performed at a block 3295 in which advertisements or other forms of handling a delay are performed. Smart delay handle at block 3295 uses information from the customer database and the advertising database. In a preferred embodiment, the customer database and the advertising database are subsets of database 170. In alternative embodiments, the customer database and the advertising database are physically separate databases.

In operation, the system and method for voice access to Internet-based information described herein advantageously can identify a vertical domain of interest to the consumer (e.g., movies, shopping), and then "funnel" user responses from the range of all possible things in a vertical domain to the one or set of things that the consumer wants. This funneling within a vertical domain involves system-directed questioning the user about attributes of products or services, according to a set of pre-defined "paths" to funnel to a particular item. Paths are defined in terms of orderings of constraints about products to be ascertained and instantiated.

Figure 34:
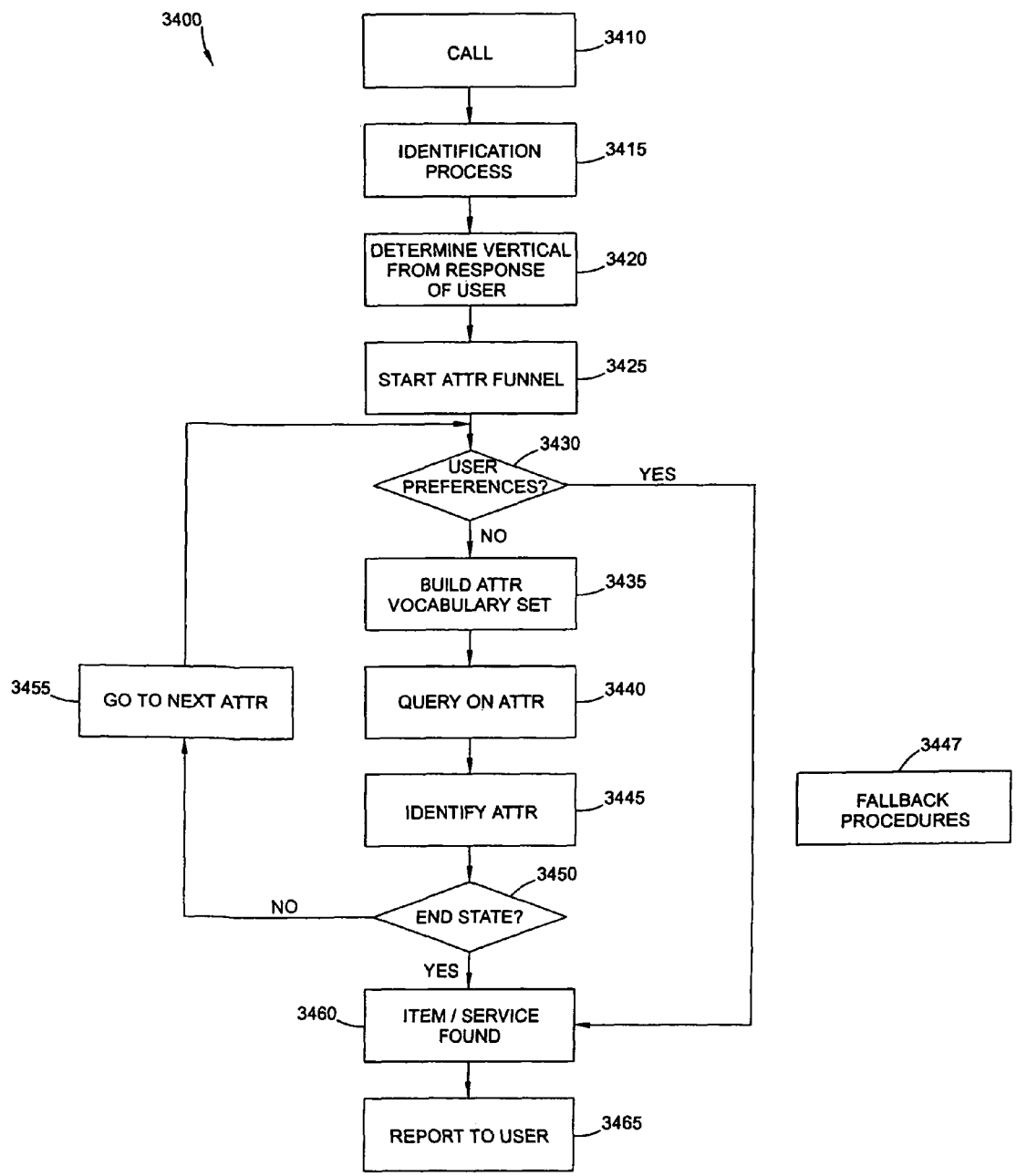
FIG. 34 is a flow diagram illustrating an exemplary process of funneling user responses in the voice portal of FIG. 1 to determine a desired item or service.

FIG. 34 illustrates a flow diagram 3400 of the funneling process which allows voice portal 10 to funnel user responses and achieve highly accurate rates of voice recognition for user responses. At step 3410, a user calls voice portal 10. After step 3410, a step 3415 is performed in which the caller is identified, using the different possible methods described above. After step 3415, a step 3420 is performed in which the user selects a vertical domain of interest. A step 3425 is then performed in which the attribute funnel characteristic to the chosen vertical domain of interest is started. After step 3425, a step 3430 is performed in which voice portal 10 determines whether the user has preferences in this vertical domain of interest. If there are preferences and the user does not want to over-ride them, control passes to a step 3460 in which the item or service is indicated as found based on user preferences.

If no preferences are available or the user over-rides his or her preferences, a step 3435 is performed in which an attribute vocabulary set is built. Vocabulary sets advantageously allow voice portal 10 to have a limited number of possible responses from which to use in speech recognition of user response at this point in the vertical domain of interest. With a defined vocabulary set, voice portal 10 advantageously achieves with high rates of recognition conventional speech recognition techniques. For example, it would be easier to recognize the term "Brewers" after the user has selected Major League Baseball (MLB) teams and a vocabulary set of possible requests for MLB teams has been built. Such a vocabulary set may include a variety of different types of user inputs for the same information. For example, in the MLB team example, a vocabulary set may include all the city or state names associated with MLB teams as well as the MLB team mascot. Thus, "Milwaukee" and "Brewers" would both be part of the vocabulary set of MLB teams.

After an appropriate vocabulary set has been built, a step 3440 is performed in which voice portal 10 queries on the attribute. For example, "What Major League Baseball team would you like to hear about?" After step 3440, a step 3445 is performed in which the attribute is identified. If an attribute is not identified, a step 3447 may be performed to carry out fallback procedures for the identification of the attribute. At a step 3450, voice portal 10 determines whether it has reached an "end state," or a point at which the item or service has been found. If an "end state" has not been reached, a step 3455 is performed in which the next attribute is accessed and control returns to step 3430. In the baseball example given, an end state has not been reached with only the team name. Other "narrower" attributes, such as, recent game results, player statistics, team standings, or other related information must be requested. Once step 3460 is performed, a step 3465 is performed in which the found item or service is reported to the user.

In an exemplary embodiment, the user selects item in the following manner. The user first specifies the domain of interest (e.g. e-commerce, traffic information, weather information, movies, etc.). The user then chooses an item (e.g., a book, a toy, a route of interest for traffic information, a city of interest for weather information, etc.) by specifying attributes of the item. The user is then provided with detailed information for an identified item, appropriate to the domain of the item (e.g. products, traffic, weather, movies, etc.). For example, in the E-commerce domain of interest reviews, vendor information including pricing, shipping costs and availability are available. In the movies domain of interest, directory, producer, and cast are provided. In the auctions domain of interest, outstanding bids are made available.

Advantageously, the user may request information by locale (e.g., the nearest vendor for an identified product, the nearest theater for a movie) with multiple ways to identify a locale (e.g., zip, town name, city area "Boston North, West etc.). In an exemplary embodiment, a strategy for location-identification around ZIP codes is used which involves asking for suburb name, falling back to city or even state and then zooming in again. In an exemplary embodiment, the user is provided upon request with the date and time on which information was last updated. Preferably, all data presented to the user is of currency appropriate to the domain. The user is informed of the source of the information ("provided by XXXXX") for "pure" source information, or information from only one source. In a preferred embodiment, a "help" or "instructions" option is available at every selection point.

The user may request item comparisons based on item attributes, as appropriate to the domain. The user may request identification of "better", "cheaper" and "related" items, as appropriate to the domain. Advantageously, the user may explicitly record items in a number of user-defined lists, as appropriate to the domain of interest. The user may review items from their lists. The user may request phone or email notification of information changes (appropriate to the domain) for items on their lists.

Figure 35:
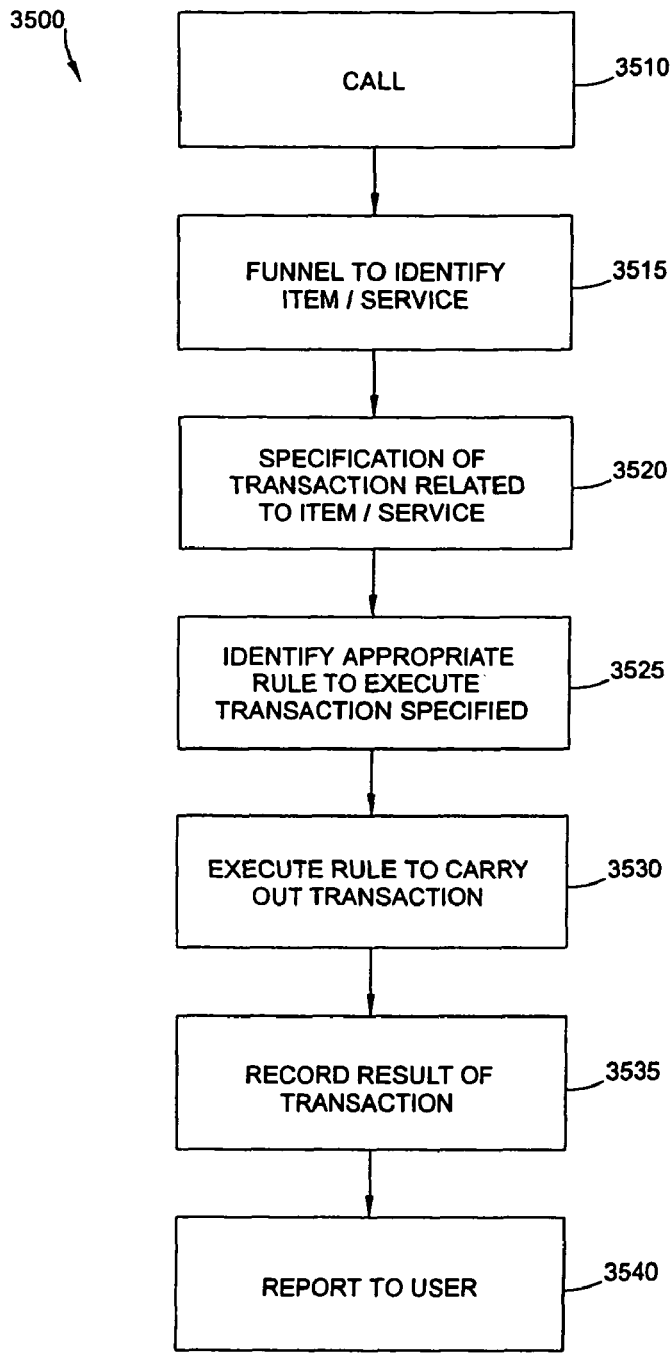
FIG. 35 is a flow diagram illustrating an exemplary process of carrying out a transaction using the voice portal of FIG. 1.

FIG. 35 illustrates a flow diagram 3500 of an exemplary process of carrying out a transaction using voice portal 10. At step 3510, a user accesses (telephones or calls) voice portal 10. After step 3510, a step 3515 is performed in which a funneling process is performed to identify an item or service desired by the user. Such funneling process performs the operations illustrated in flow diagram 3400 and described with reference to FIG. 34.

After step 3515, a step 3520 is performed in which voice portal 10 asks the user to specify a transaction desired and relating to the item or service identified. After step 3520 is performed, a step 3525 is executed in which voice portal 10 identifies the appropriate voice portal rule to execute the specified transaction. After step 3525, a step 3530 is performed in which the rule is executed to carry out the specified transaction. Transactions can include purchasing an item or service, making a bid on an auction, or any other type of transaction possible over the Internet. After step 3530, a step 3535 is performed in which voice portal 10 records the result of the transaction. Preferably, the result is recorded in database 170. After step 3535, a step 3540 is performed in which the transaction is reported to the user.

Different transactions (e.g., bid, watch, buy, track) are appropriate to different domains. For example, in the e-commerce domain of interest, the user may order an identified product from a chosen vendor. Further, the user may add an item to a shopping cart for purchase at a later time. The user may specify, when ordering, a billing credit card and shipping address (from user profile or manually). The user may also request status information for previously ordered products. As another example, in the auction vertical domain of interest, the user may increase existing bids or the user may place bids on new auctions.

Advantageously, the process of carrying out a transaction using voice portal 10 does not require a user to make any manual actions on a computer. The user can buy items, make bids, or do any other Internet transaction without clicking a mouse, pressing a key on a computer keyboard, or any other computer-interface manual action (e.g., mouse click, keyboard entry). Thus, the process described with reference to FIG. 35 can be a "No Click" Internet transaction process. User can utilize the touch pad of a phone and still perform a "No Click" Internet transaction.

Figure 36A:
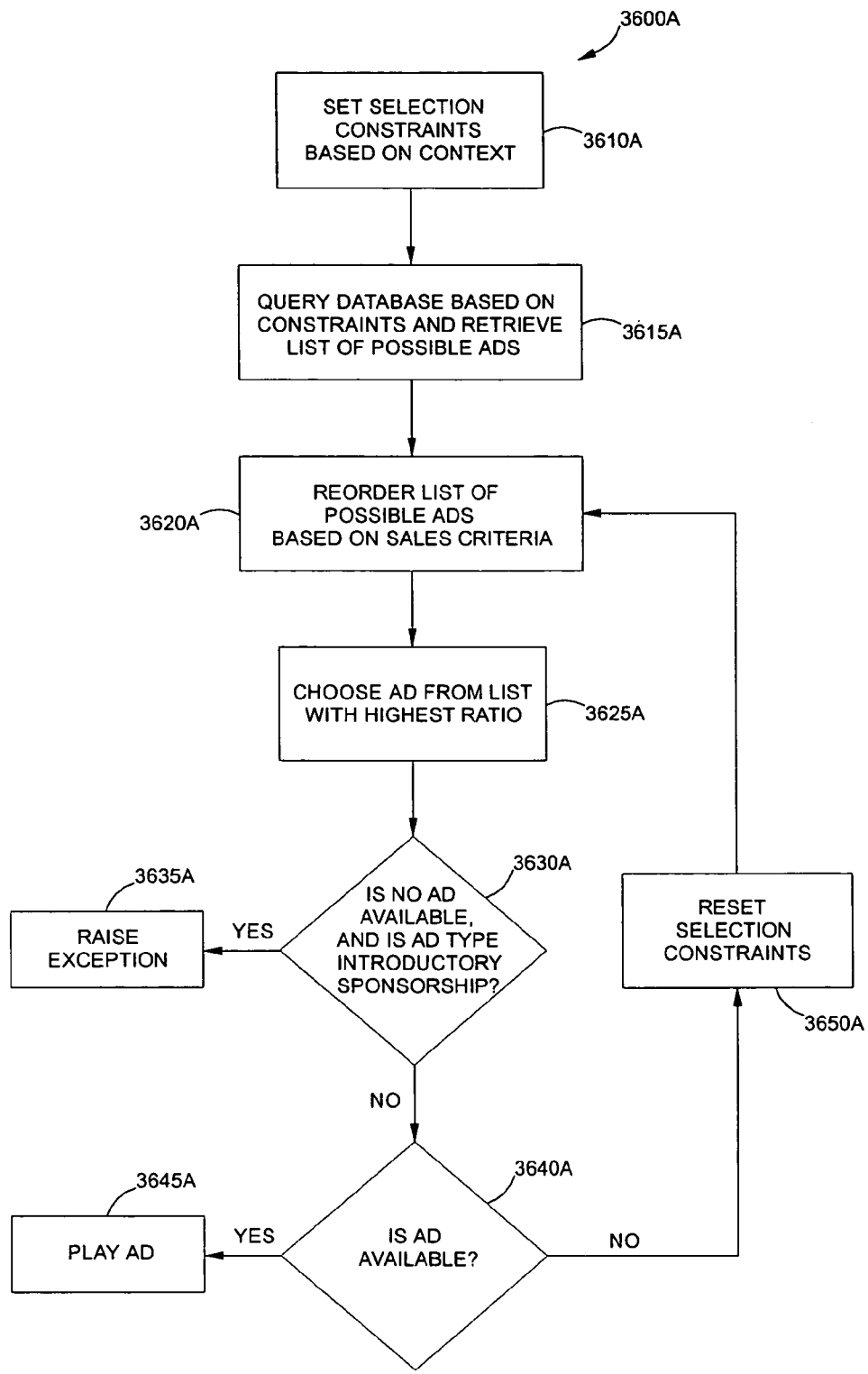
FIG. 36A is a flow diagram illustrating an exemplary process of advertising using the voice portal of FIG. 1.

FIG. 36A illustrates a flow diagram 3600A of an exemplary process of advertising using voice portal 10. Advantageously, advertising subsystem 120 includes a method for determining what advertisements to play to a specific user. Generally, this method includes setting selection constraints based on a context, such as, user demographics, location demographics, and a current vertical domain of interest. After selection constraints are set, the method queries an advertisement database based on the constraints and retrieves a list of possible advertisements. The list of possible advertisements is re-ordered based on a sales criteria for each advertisement. An advertisement is selected from the re-ordered list and presented to the user.

Referring to flow diagram 3600A, in a step 3610A, advertising subsystem 120 in voice portal 10 sets selection constraints for advertisements to be presented to a user. In one embodiment, the selection constraints are based on user-centric information, such as, user demographics, location demographics, and the current selected vertical domain of interest (if any) as well as advertising-centered information, such as, advertising sales criteria, lack of repetition, and other advertising effectiveness factors. Such constraints or criteria are used in selecting from a variety of different types of advertisements, such as, an introductory sponsorship advertisement, a vertical sponsorship advertisement, and a commercial advertisement. After step 3610A, a step 3615A is performed in which database 170 is queried for a list of possible advertisements based on the constraints selected in step 3610A.

After step 3615A, a step 3620A is performed in which the list of possible advertisements is re-ordered based on sales criteria factors. In one embodiment, sales criteria are used to determine the following: (1) Is the advertisement delivery rate being achieved for this advertisement? (2) Has the target delivery minimum been achieved for this advertisement? Advantageously, the sales criteria are used to make sure that each Advertisement customer will have their requirements for delivery satisfied. In one embodiment, a ratio is calculated to prioritize the advertisements on which should be delivered first.

The following provides an example of using a ratio as the determining factor of how advertisements are ordered. Advertisement X needs 100,000 deliveries in its contract. Voice portal 10 has already delivered 7,000 instances of Advertisement X. The start date of the contract is May 10 and end date is June 7th. The current date is assumed to be May 15th. So, an exemplary ratio is determined as follows:

Number of days since start of contract=5.
Length of contract=27 days.
Number of days that the Advertisement needs to be played=22.
Percent of ads played=7,000/100,000-=7%
Percent of days already played=5/27=18.5%

As such, an exemplary final ratio is:

(% of days already played–% of ads played)/Number of days remaining in contract

Advantageously, this ratio accounts for advertisements that should be played soon (lower denominator->higher ratio), and the discrepancies of advertisements that have already been played get pushed back with a lower ratio.

After step 3620A in which the list of possible advertisements are re-ordered, a step 3625A is performed in which an advertisement is chosen. In one embodiment, the advertisement is chosen based on the highest ratio available in the list of possible advertisements. After step 3625A, different actions are taken depending on the type of advertisement to be presented. In a step 3630A, if there is no advertisement available and if the advertisement type is an introductory sponsorship advertisement, an exception is raised in a step 3635A. Otherwise, a step 3640A is performed in which a decision is made as to whether an advertisement is available. If there is an advertisement available, a step 3645A is performed in which the advertisement is played. If no advertisement is available, a step 3640A is performed in which the selection constraints are reset and control returns to step 3620A.

As such, there are differences in the process steps for each type of Advertisement, of which there are three: introductory sponsorship Advertisements, vertical sponsorship Advertisements, and commercial Advertisements. The following is an exemplary process for selecting an introductory sponsorship Advertisement:

1. Set selection constraints based on location for the introductory sponsorship Advertisement type (vertical is not used because, no vertical is applied).
2. Query the database based on constraints with result transformed into a list of possible Advertisements to play.
3. Reorder the list based on the sales criteria.
4. Choose the Advertisements from the list with the highest ratio. There must be an Advertisement in the database and raise an exception otherwise.

The following is an exemplary process for selecting an vertical sponsorship Ad:

1. Set constraints based on user demographics, location demographics, and vertical type for the vertical sponsorship Advertisement type.
2. Query the database based on constraints with result transformed into a list of possible Advertisements to play.
3. Reorder the list based on the sales criteria.
4. Choose the Advertisement from the list with the highest ratio if one is available and return to the user interface.
5. If none are available, reset selection constraints based only on vertical type and set the type of vertical sponsorship to be only for Quack promotions.
6. Reorder the list based on the sales criteria.
7. Choose the Ad from the list with the highest ratio if one is available and return to the user interface.
8. If the user heard all of the Advertisements from the list, then return the Advertisement that was last played to the user. If for some reason the list is empty and no Advertisements are available, raise an exception.

The following is an exemplary process for selecting a commercial advertisement:

1. Set selection constraints based on location demographics, customer demographics and vertical type for the commercial Advertisement type.
2. Query the database based on those constraints with the result transformed into a list of possible Advertisements to play.
3. Reorder the list based on the sales criteria.
4. Choose the Ad from the list with the highest ratio if one is available and return to the user interface.
5. If none are available, reset selection constraints based only on vertical type and set the type of commercial to be either for Quack (i.e., voice portal system) commercials or paid commercials (regardless of type entered).
6. Reorder the list based on the sales criteria.
7. Choose the Advertisement from the list with the highest ratio if one is available and return to the user interface.
8. If the user heard all of the Advertisements from the list, then return the Advertisement that was last. If for some reason the list is empty and no Advertisements are available, then raise an exception.

Figure 36B:
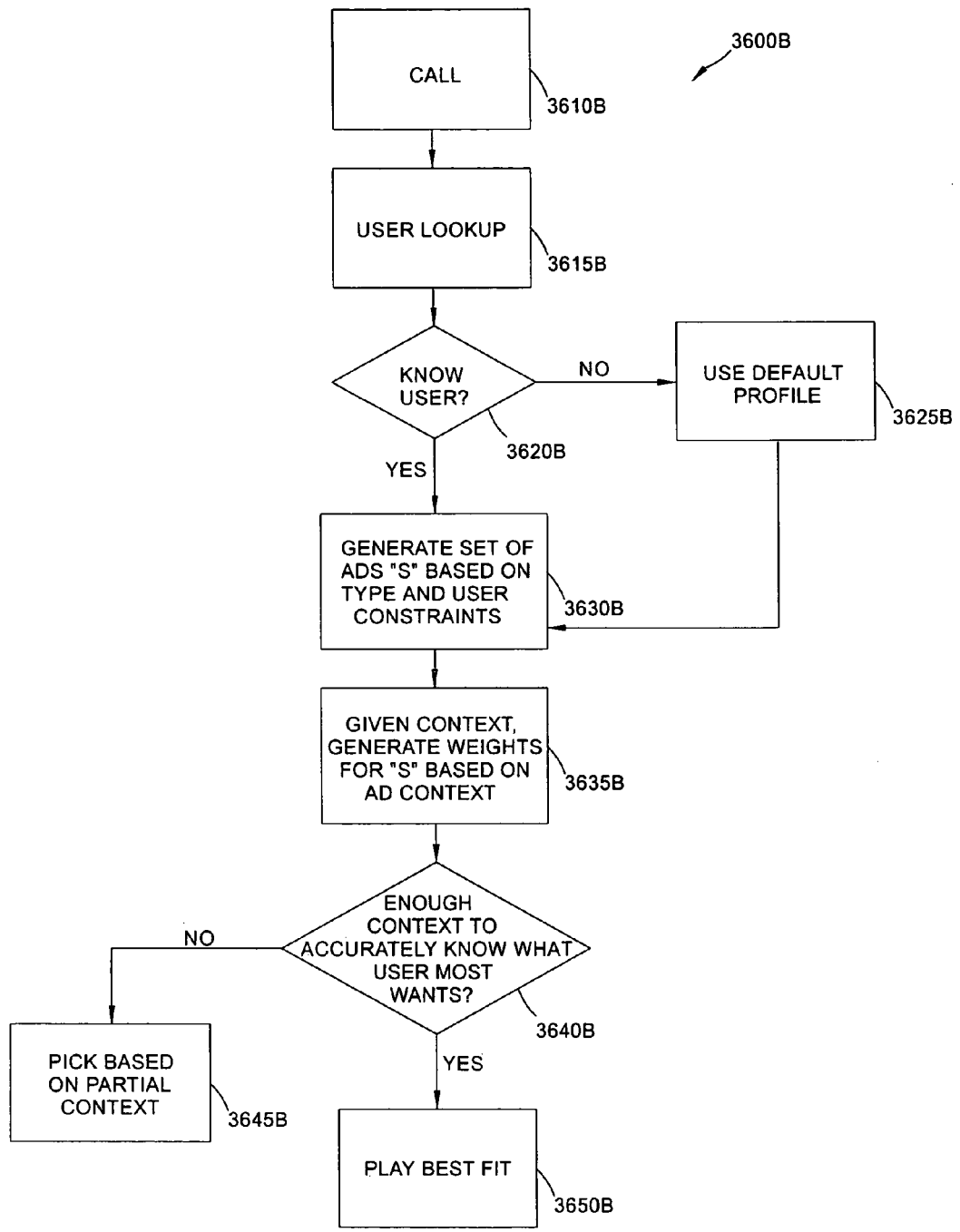
FIG. 36B is a flow diagram illustrating a second exemplary process of advertising using the voice portal of FIG. 1.

Referring now to FIG. 36B, a flow chart 3600B illustrates a second exemplary process of advertising using voice portal 10. In a step 3610B, a user accesses (telephone or calls) voice portal 10. After step 3610B, a step 3615B is performed in which a user lookup is performed to identify the user. Caller identification may be done in a variety of methods, some of which are described with reference to FIGS. 2 and 30. After step 3615B, in a step 3620B, a determination is made as to whether the user is known by voice portal 10. If the user is not known, a step 3625B is performed in which a default profile is used for the user. In an exemplary embodiment, the default profile does not include user constraints or limitations for certain advertisements. The default profile can be geared for certain parameters known about the call, such as for example, the area code of the user, time of day of the call, day of the week, etc. If the user is known or after step 3625B is performed, a step 3630B is performed in which advertising subsystem 120 generates a set "S" of advertisements based on the type of interface (e.g., speech, WAP, WWW) including user constraints particular to the current user.

Given the current operating context (e.g., particular user, vertical domain of interest), in a step 3635B, advertising subsystem 120 generates weights for advertisement set S based on the advertising context. After step 3635B, a step 3640B is performed to determine whether the context is enough to accurately know what the user most wants. If the context is not enough, a step 3645B is performed in which an advertisement is picked based on the partial context obtained. If the context is sufficient, a step 3650B is performed in which the best fit advertisement is played.

Advantageously, advertising subsystem 120 provides an initial general advertisement or sponsorship message to all callers. Advertising subsystem 120 also provides targeted audio advertisements to users, chosen based on a utility function appropriate to the domain. In an exemplary embodiment, the utility function is related to the availability of the product or service to be advertised, the relatedness of the current item (e.g., DVD is related to television), the relevance to the user (e.g., by demographic), the desirability of the user to the advertiser, and the value to the service provider (e.g., based on cost/return). Advantageously, advertising subsystem 120 is capable of delivering a certain number of advertisements to users within a certain time frame. Moreover, advertising subsystem 120 is capable of delivering advertisements across different platforms, such as wireless application protocol (WAP), WWW, and speech interfaces.

Taking for example, the speech interface platform, within the first minute, one sponsorship advertisement and one targeted advertisement are delivered to the user. Within each additional 40 seconds, a second targeted advertisement is delivered. In one embodiment, a sponsorship message will process in 3-5 seconds, and then a targeted advertisement takes 10-20 seconds.

The implementation of this structure is based on the fact that the introductory sponsorship advertisement is presented upon entering the system. Each time the user enters a vertical, the user is prompted with a "vertical sponsorship". Once the user is about to receive the data requested, a full commercial would be presented to the user. Advantageously, this model approximates the schedule listed in previously as the user is estimated to be searching for their piece of information for 40 seconds before receiving it.

In the advertising context, "Speak-throughs" are requests to deliver more detailed information upon presentation of an advertisement. Advantageously, speak-throughs apply not only to speech interface, but also to both the WAP and WWW. For the WAP, speech and text can be considered for a speak-through while clicking on a banner to find out more on an ad would be a speak-through on the WWW. One embodiment of a speak-through on a voice interaction is to point the customer to a website address or a phone number. In alternative embodiments, speak-throughs collect an email address or a custom phone number to provide to the advertiser to send more relevant information to the customer. With a WWW interface, speak throughs may include using an outside source to manage and audit customer information. Advertising subsystem 120 may also provide targeted "banner" advertisements to users, chosen based on a utility function appropriate to the domain (e.g., WWW interface).

The management of the advertising delivery of advertising subsystem 120 is based on a combination of several factors. In an exemplary embodiment, an advertisement is delivered in one of three places. First, an advertisement may be delivered when the user is preparing to enter the system to begin a new session. This sponsorship message will be in the voice of user interface 110, or "the system voice", and should rotate among several alternative advertising sponsors. For example, a sponsor message may say, "Quack is brought to you by Visa, the currency of the web" or "Quack is brought to you by Sprint-PCS; the clear future of cellular services."

Second, another sponsorship advertisement (a "vertical sponsorship" advertisement) may be delivered just before a user has accessed a certain vertical of the system, such as movies, traffic, or weather. For example, such an advertisement may say, "Brought to you by IMDB, the world's authorities on movie information" and "LCE Sony Metreon: Boston's ONLY choice for great movie selections."

Third, an advertisement may be delivered just before the user receives the refined request. This type of advertisement is defined as a "commercial". Such advertisements are timely (i.e., delivered at chosen points) but only on a so-often basis, such as every 2 minutes. Advantageously, the system voice can point out a value-added situation for the user that may be helpful. For example, a nearby restaurant may be suggested when a user is selecting a movie at a particular theater. Speak-through advertisements are preferably used here, although non-speak through advertisements are possible. The advertising content itself is preferably about 7 seconds in length. The speak-through ads are preferably of maximum possible quality (i.e., professionally produced), and of length of about preferably 15 to 20 seconds. For example, if the user selects American Beauty as a movie at LCE Sony Metreon, the system voice says, "I'm looking up the listing at Sony Metreon . . . if you would like to hear about 'Tony's Matriciana': Boston's best Italian food only 5 minutes from Sony Metreon, say 'Tony's !', or hold on for your listing." The user may then automatically set up a reservation. Other related-ness attributes may also be used for targeted advertising. Advantageously, the advertisement is delivered in these different spots due to the current assumptions that making a vertical-specified request will take the amount of time to deliver the advertisements.

Along with these issues, decisions are made on which advertisements users are to have delivered to them. Factors incorporated into this decision include the length of the call, what type of vertical content is requested, combination of content and user profile (and/or location) (i.e. restaurant ads should be local to the customer), revenue potential, callers requesting specific information, and if the user has heard the advertisement already. In an exemplary embodiment, advertisements are rotated based on the following factors: When was the last time that the ad was played? When was the last time the user heard the ad before this call? Did the user hear the ad already this call? Is the ad delivery rate being achieved for this ad? Has the target delivery minimum been achieved for this ad?

Advantageously, advertisements are delivered in a manner such that the presentation is appropriate to particular customers and are tracked accordingly to billing rates. Thus, certain basic data is gathered to manage each ad, such as, how many times has the ad been played and how many times has an individual user heard the ad?

As well, given this basic data, the following more complex queries are available. For example, queries may include the ability to create a report of all users who have heard an ad among various defined groupings as follows: name, demographic information, location, and relatedness information (what else have these users requested). Queries may also include the ability to create a report of all users who have requested speak-through information.

The capability of barging-in (i.e., stopping the advertisement from being played), which is possible during other modes of operation for voice portal 10 can be removed while presenting an ad. The capability to prevent barge-ins is important in that advertisers must be assured of the data that has been acquired with respect to the advertising that was given through voice portal 10. In one embodiment, the gathering of this advertising data is done by a third party auditor.

Advertising subsystem 120 keeps a record of all advertisements served to users, including successful (i.e., complete) and unsuccessful (i.e., incomplete) deliveries. Preferably, this record is stored in database 170. Advantageously, advertisements may be targeted by vertical domain of interest, or caller location or user, or user preferences, or user past interests, or by some other combination of advertiser interests and user collected information.

Advantageously, the use of context sensitive information can be used to narrowly target advertisement to a user. Context-sensitive Advertisement targeting in voice portal 10 relates an Advertisement commercial to nearly exactly what information the user receives. To make this function correctly, an appropriate pointer is passed into the selection algorithm just before the Advertisement is to be played. In the one embodiment, the vertical type is the context pointer.

In other embodiments, an existant is the context pointer that allows more specific targeting. This context pointer matches its attributes' criteria with market research criteria to determine weights in certain categories. These category weights combined with the sales criteria of the Advertisements in the initial list define an ordering of context weights from which to best select Advertisements. This initial list, created from demographics and vertical type, form the basis for the context weighting. Mathematical notation is introduced to generalize this problem into an algorithm, and an example follows to illustrate it.

First, variables are defined with respect to the parameters involved. Let the list of attributes of the existant passed into the algorithm be defined by the set $\{e_1, e_2, \ldots, e_m\}$, where m is the number of attributes in the existant. For example, for a movie existant, sample attributes are genre, location and show time. The list of categories available to associate Advertisements with, are defined by the set $\{C_1, C_2, \ldots, C_n\}$, where n is the total number of categories. Some sample categories in the system would be: family, restaurants, nightlife, movies, and entertainment. Let there be a context category weight, $W_i$, for each category $C_i$, where $i \in \{1, \ldots, n\}$. The purpose of having context category weights is to determine the strength of the context in comparison to the advertisement's category weights, as discussed below.

The market research criteria for all existants is represented by $P=\{p_1, p_2, \ldots, p_t\}$ where t is the total of all criteria in the database. Each criterion $p_j$ has an associated weight $w_j$, where $j \in \{1, \ldots, t\}$ and each attribute $e_i$ will try to satisfy all $p_j$, for all i, j, where $i \in \{1, \ldots, m\}, j \in \{1, \ldots, t\}$. Thus, if $e_i$ satisfies $p_j$, and $p_j$ belongs to category $C_k$, then $W_k=W_k+w_j$, where $i \in \{1, \ldots, m\}, j \in \{1, \ldots, t\}, k \in \{1, \ldots, n\}$. This iteration is used to define the aforementioned context weights of each category.

Once the total context weight for each category, $W_k$, is defined, its associated strength ratio, $R_k$, must be calculated. The strength ratio of a category is used to determine if the context of the existant is strong enough to merit in the selection of the Advertisement. For example, if the family category has many criteria in P, then we want to make sure that the weights corresponding to the context of the existant are in an acceptable proportion. So, $R_k=W_k/T_k$, where $T_k$ is the total weight of all criteria in P relating to category k.

The list of advertisements generated by the demographic query are defined by the set $A=\{A_1, A_2, \ldots, A_r\}$, where r is the total number of ads in the list. Each ad $A_i$ has its own category weight $x_k$, where $i \in \{1, \ldots, r\}$ and $k \in \{1, \ldots, n\}$ which is used in conjunction with the algorithm's corresponding context category weight ratio $R_k$.

Thus, once the initial list of Advertisements A has been created by filtering the demographics and Advertisement type on the database, the steps in the algorithm would be as follows:

1. Set category weights, $W_k$, for each category $C_k$ as follows
   Initialize each $W_k=0$, where $k \in \{1, \ldots, n\}$.
   For each $i \in \{1, \ldots, m\}$ and for each $j \in \{1, \ldots, t\}$, based on the current attributes of the existant, $\{e_1, e_2, e_m\}$, if $e_i$ satisfies $p_j$, and $p_j$ is associated with category $C_k$, then $W_k=W_k+w_j$, where $k \in \{1, \ldots, n\}$
2. Now tabulate the categories' total weights independent of the attributes of the existant. From those total weights, establish each category's context ratio
   For each $k \in \{1, \ldots, n\}$ and for each $j \in \{1, \ldots, t\}$, if $p_j$ is associated with category $C_k$, then $T_k=T_k+w_j$. Set the context category context ratio, $R_k=W_k/T_k$
3. For each category k, multiply each $R_k$ by the category weight $x_k$ of each Ad $A_i$, and then multiply the sum by the sales criteria ratio of the Ad, $S_i$, to get context total $G_i$
   For each $i \in \{1, \ldots, r\}$, calculate $G_i$ where $G_i = S_i \cdot (R_1 x_1 + \ldots + R_n x_n)$ 4. Select the Ad $A_i$, where i is defined by $\max(G_i)$, $i \in \{1, \ldots, r\}$.

The above algorithm can be illustrated by a simple example. Consider an example where a user is using the service of voice portal 10 while in the movies vertical domain of interest. The vertical sponsorship Advertisement has been played and the user is just about to receive information regarding a movie showing. Thus as context, the selection includes the pointer to the specific existant that is to be played, which is for arguments' sake, "Mission to Mars". Some of the attributes of the movie showing existant are rating (e.g., R), genre (e.g., Thriller) and a show time (e.g., 4:00 pm), which can be represented by $\{e_1, e_2, e_3\}$. Thus, there needs to be a list of matching context criteria containing the elements $P=\{p_1, p_2, \ldots, p_t\}$. A sample list of criteria could be represented in the database as:

| Attributes | Match Type | Value | Category | Weight |
| --- | --- | --- | --- | --- |
| Movie | — | — | Entertainment | 10 |
| Movie Rating | = | G | Family | 80 |
| Movie Rating | = | R | Nightlife | 50 |
| Movie Genre | = | Suspense | Teen | 40 |
| Movie Genre | = | Suspense | Adult | 50 |
| Movie Genre | = | Thriller | Teen | 80 |
| Movie Show Time | > | 7:00 PM | Teen | 80 |
| Movie Show Time | < | 4:00 PM | Family | 70 |

From this table, the categories can be inferred as C={Entertainment, Family, Nightlife, Teen, Adult} where k=5. So from step 1, $W_1=10$, $W_2=0$, $W_3=50$, $W_4=80$ and $W_5=0$. From step 2, establish $R_1=1$, $R_2=0$, $R_3=1$, $R_4=0.4$ and $R_5=0$ (this is assuming that P has only 8 elements, which will not likely be the case, and will be around 200 or more elements). Now, assume that the Advertisement list A has three Advertisements. Assume that the weightings of the advertisements' five categories are:

| Ad Name | Entertainment | Family | Nightlife | Teen | Adult | Sales Ratio |
| --- | --- | --- | --- | --- | --- | --- |
| IMDB | 0.9 | 0.5 | 0.7 | 0.9 | 0.9 | 0.8 |
| Mission to Mars | 0.9 | 0 | 0.9 | 0.9 | 0.8 | 1.1 |
| AMC Theaters | 0.9 | 0.9 | 0.7 | 0.9 | 0.7 | 1.0 |

So, from these weightings, $\{x_1, x_2, x_3, x_4, x_5\}$, we can make the calculations to get values for $G_i$ for each Ad $A_i$, where $i \in \{1, 2, 3\}$, as follows:

$G_i = S_i \cdot (R_1 x_1 + \ldots + R_n x_n)$ $G_1 = 0.8 \cdot ((1)(0.9) + 0 + (1)(0.7) + (0.4)(0.9) + 0) = 1.568$ $G_2 = 1.1 \cdot ((1)(0.9) + 0 + (1)(0.9) + (0.4)(0.9) + 0) = 2.376$ $G_3 = 1.0 \cdot ((1)(0.9) + 0 + (1)(0.7) + (0.4)(0.9) + 0) = 1.96$ Thus, based on context and sales ratio determination, the "Mission to Mars" Advertisement is most appropriate. This algorithm notes the context of different categories based on their relevance to the piece of information being retrieved. It also organizes the fact that the Advertisements that need to be played for sales criteria are noted and factored into the ordering. The example illustrates only a short list of ads, categories and criteria in P. The algorithm is intended to take advantage of many more categories and criteria.

FIGS. 37-43 illustrate an exemplary dialog map of the interaction between the user and voice portal 10. The dialog map described with reference to FIGS. 37-43 is for illustration purposes only. While only movies, weather, traffic, stocks, and sports vertical domains of interest are shown in the FIGURES, it should be apparent that any vertical domain of interest could be included in such a dialog map (and in the interaction of voice portal 10 with the user), particularly in light of the expansive and adaptive capabilities available due to data structure models 300, 400, and 450, described with reference to FIGS. 4-6. Furthermore, the specific blocks representing different interactions between the user and voice portal 10 are for illustration only. A wide variety of interactions are possible for each of the many possible vertical domains of interest.

Figure 37:
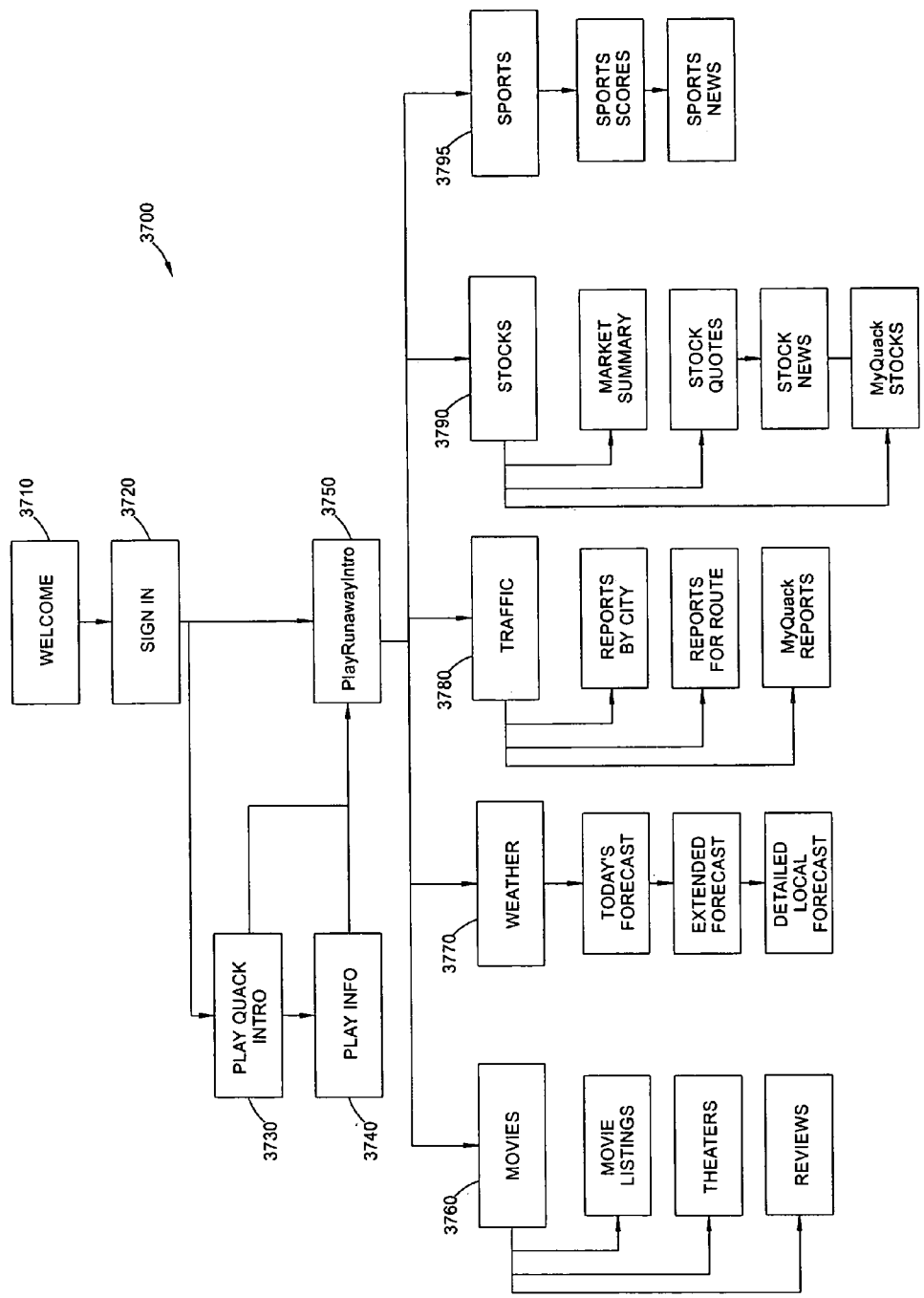
FIG. 37 is a flow diagram illustrating an exemplary dialog map of the voice portal of FIG. 1.

FIG. 37 illustrates a dialog map 3700 in which after a telephone call is made by a user to voice portal 10, a block 3710 is performed in which a welcome is provided. After block 3710, a block 3720 is performed in which a sign-in procedure is followed (described further with reference to FIG. 38). After the sign-in procedure of block 3720, the user can select to have an introduction to the service of voice portal 10 at blocks 3730 and 3740 or go directly to the runway information for introduction of the possible vertical domains of interest at a block 3750. Specifically, at block 3730, introductory information is provided on the service provider. At block 3740, introductory information is provided on how the service works. At block 3750, voice portal 10 requests the user to select a domain of interest from a "runway" (e.g., movies, weather, traffic, stocks, sports).

If the user selects the movies domain of interest, a block 3760 is performed in which a movies subsystem is executed (described further with reference to FIG. 39) and the user has access to movie information and transactions, such as, movie listings, theaters, and reviews. If the user selects the weather domain of interest, a block 3770 is performed in which a weather subsystem is executed (described further with reference to FIG. 40) and the user has access to weather information, such as, today's forecast or the extended forecast for a preferred location or any location. If the user selects the traffic domain of interest, a block 3780 is performed in which a traffic subsystem is executed (described further with reference to FIG. 41) and the user has access to traffic information, such as, reports by city, reports for a certain route, or personalized reports. If the user selects the stocks domain of interest, a block 3790 is performed in which a stocks subsystem is executed (described further with reference to FIG. 42) and the user has access to stocks information and transactions, such as, market summaries, stock quotes, stock news, and personalized stock news or transactions (e.g., buy, sell). If the user selects the sports domain of interest, a block 2500 is performed in which a sports subsystem is executed (described further with reference to FIG. 43) and the user has access to sports information and transactions, such as, sports scores, sports news, sports events ticket information, and sports fantasy league transactions.

Figure 38:
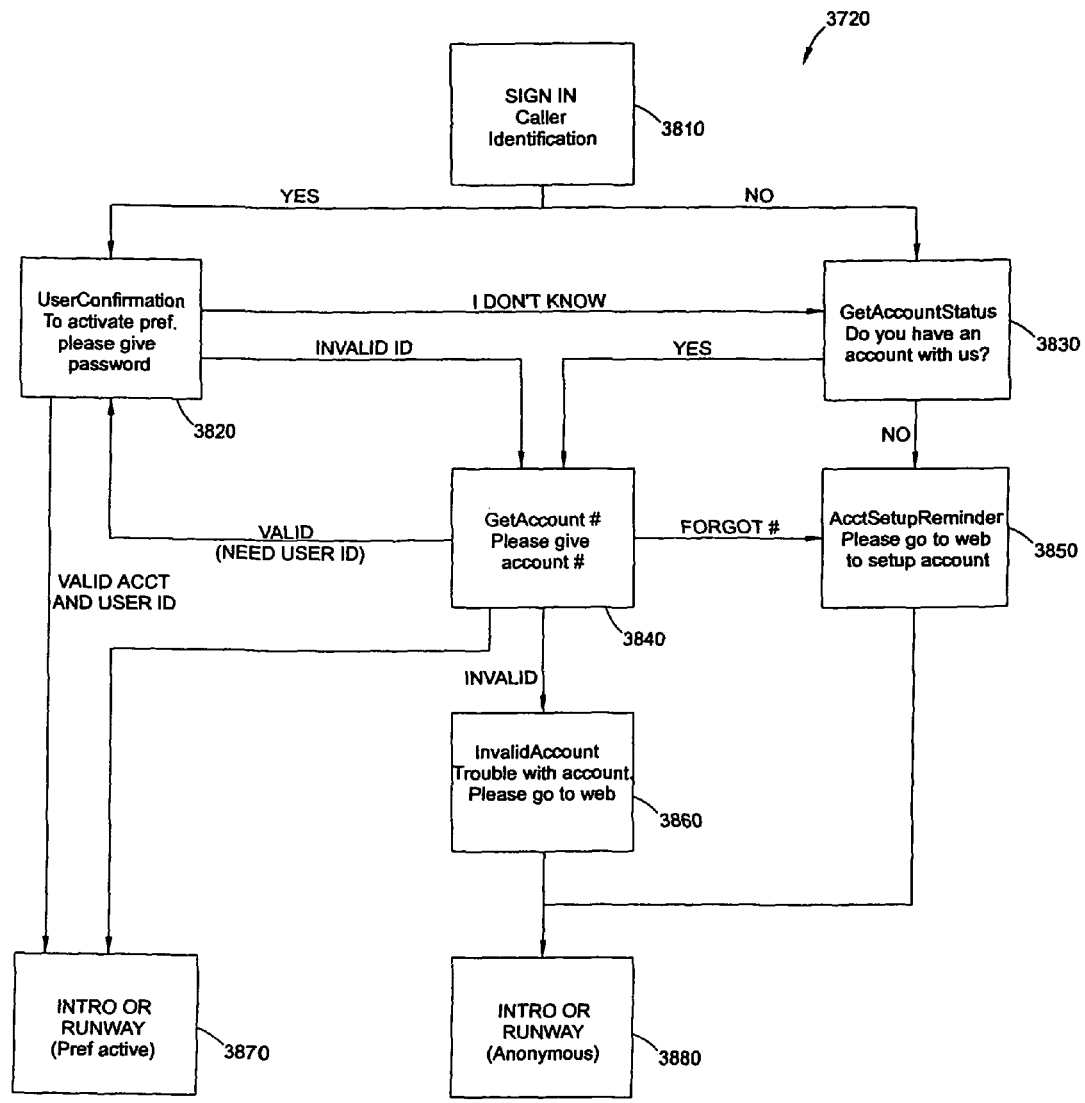
FIG. 38 is a flow diagram illustrating an exemplary subsystem of the exemplary dialog map of FIG. 37.

Referring now to FIG. 38, a sign-in subsystem is shown. At a block 3810, caller identification is attempted. One type of user of voice portal 10 is an unidentified user. The unidentified user calls in (possibly for the first time) and is either locatable by conventional caller-identification techniques ("caller ID") or not. If the caller-ID does not exist in database 170, the caller is possibly a new caller. If the caller-ID is suppressed, voice portal 10 can't tell either way. In one embodiment, voice portal 10 asks for a phone number (or other identifier) and continues with an "identified" caller. In an alternative embodiment, voice portal 10 continues without verification. This decision may depend on the kinds of information being requested. For example, in particular vertical domains, the identity of the user may need to be determined to identify the user before proceeding (e.g., auctions).

Identified users are either subscribed or non-subscribed. If the identified user is subscribed, voice portal 10 has information on the user, such as, credit cards and preferences from database 170. Preferably, a user subscribes so that voice portal 10 can start tracking preferences and interests to achieve a higher degree of consumer-value-added and thus loyalty to the service. The user may specify profile information, including addresses and credit card numbers, upon subscription. Further, the more information amassed about a particular caller, the more directed (and hence valuable) advertisements are.

If caller identification is possible, a block 3820 is performed in which user confirmation is performed by asking the user for a password. Once the password is verified, user preferences can be set and control passes to a block 3870 and control returns to FIG. 37 where an introduction or runway selection is performed. If the password given is invalid, control passes to a block 3840.

If caller identification is not possible or the user did not know his or her password, control passes to a block 3830 where voice portal 10 determines the user's account status. If the user does not have an account, control passes to a block 3850 where an account setup reminder is given that the user should set up an account. If the user has an account, control passes to block 3840 where voice portal 10 gets the user's account number. If the user has forgotten the account number, control passes to block 3850 where the user is asked to set up an account. If the user provides a valid account number, control passes to block 3820 for user confirmation. If the user gives an account number which is invalid, control passes to block 3860 where voice portal 10 informs the user that the account is invalid and to visit a web site or call a support number for assistance. Control then passes to block 3880 and to FIG. 37 where an introduction or runway selection is performed.

Figure 39:
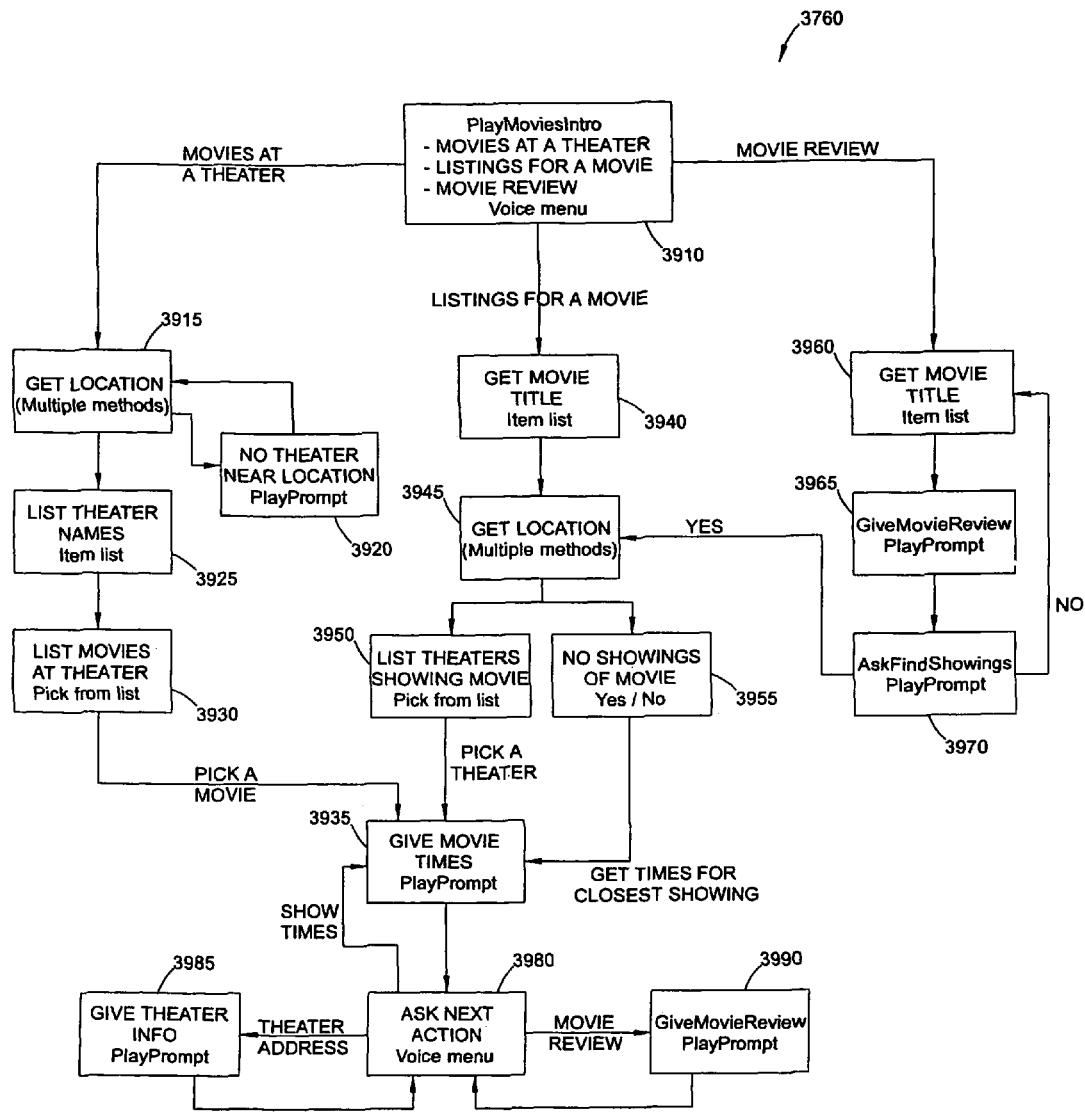
FIG. 39 is a flow diagram illustrating a second exemplary subsystem of the exemplary dialog map of FIG. 37.

Referring now to FIG. 39, a movies subsystem is performed. At a block 3910, voice portal 10 plays an introduction to the movies domain of interest. The user can select options, such as, movies at a theater, listings for a movie, and movie reviews. If the user selects movies at a theater, control passes to a block 3915 in which voice portal 10 determines the geographic location desired by the user. Various methods may be employed to determine location, such as, ZIP code, state and city, or preferences. If there is no theater near the given location, a block 3920 is performed in which a message is played to inform the user that no theater is located in the given area. After location is determined, a block 3925 is performed in which theater names within the location are listed. After block 3925, a block 3930 is performed in which movies are listed which are playing at theaters within the area. Voice portal 10 requests the user select a movie and control passes to a block 3935.

Returning now to block 3910, which played an introduction to the movies domain of interest, if the user requests listings for a movie, a block 3940 is performed in which voice portal 10 requests the movie title from the user. After block 3940, a block 3945 is performed in which the geographic location desired by the user. As discussed above, a variety of methods may be used to determine the caller's location. If there are theaters showing the selected movie, a block 3950 is performed in which the theaters playing the movie are listed and the user is asked to select from the list. Control then passes to block 3935. If there are no theaters showing the selected movie, a block 3955 is performed and the times for the movie at the closest locations are provided to the user. Control then passes to block 3935.

Referring now to block 3910, which played an introduction to the movies domain of interest, if the user requests a movie review, a block 3960 is performed in which voice portal 10 requests the movie title from the user. After block 3960, a block 3965 is performed in which the review is played for the selected movie. After block 3965, a block 3970 is performed in which voice portal 10 asks the user if he or she would like to find showings for the movie selected. If the user declines, control returns to block 3960 to get another movie title for a movie review. If the user accepts, control passes to block 3945.

At block 3935, voice portal 10 provides movie showing times for the selected movie and theater. At a block 3980, voice portal 10 requests a next action. The user can request the theater address, which is then provided at a block 3985. The user can also request a review of the movie, which is then provided at a block 3990. Once the user wants to leave the movie domain of interest, control returns to block 3750 of FIG. 37.

Figure 40:
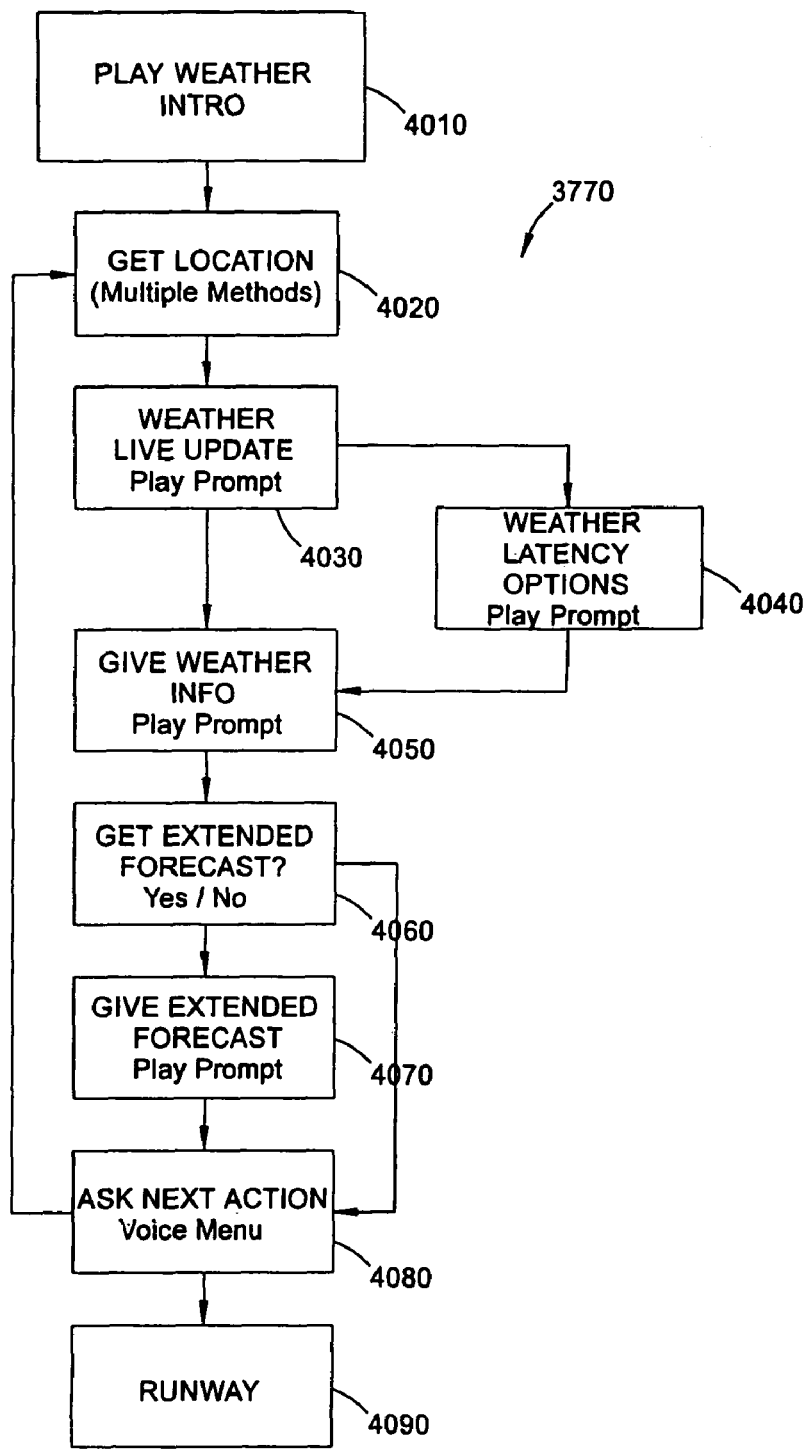
FIG. 40 is a flow diagram illustrating a third exemplary subsystem of the exemplary dialog map of FIG. 37.

Referring now to FIG. 40, a weather subsystem is performed, as shown. At a block 4010, voice portal 10 plays an introduction to the weather domain of interest. After the introduction is played at block 4010, control passes to a block 4020 in which voice portal 10 obtains location information to use in the weather domain of interest. As described above, multiple methods are possible to obtain location information, such as, obtaining location from ZIP code, city or state, and other locational indicia. After block 4020, control passes to a block 4030 in which voice portal 10 provides a prompt as to whether the user would like live weather information or weather information for later periods of time. If the user selects to hear weather information for later periods of time, control passes to a block 4040 in which voice portal 10 plays a prompt which provides weather latency options to the user. If the user wants current weather information or after the user has selected latency options at a block 4040, control passes to a block 4050 in which voice portal 10 provides the weather information desired.

After block 4050 is performed, control passes to a block 4060 in which voice portal 10 asks the user whether an extended forecast is desired. If a extended forecast is desired, control passes to a block 4070 in which voice portal 10 provides an extended forecast. After block 4070 or if the user does not want an extended forecast, control passes to block 4080 in which voice portal 10 asks for the next action from the user. If the user wants to continue in the weather domain of interest, control passes to block 4020. If the user wants to leave the weather domain of interest, control passes to a block 4090 corresponding to the runway described with reference to FIG. 37 as block 3750.

Figure 41:
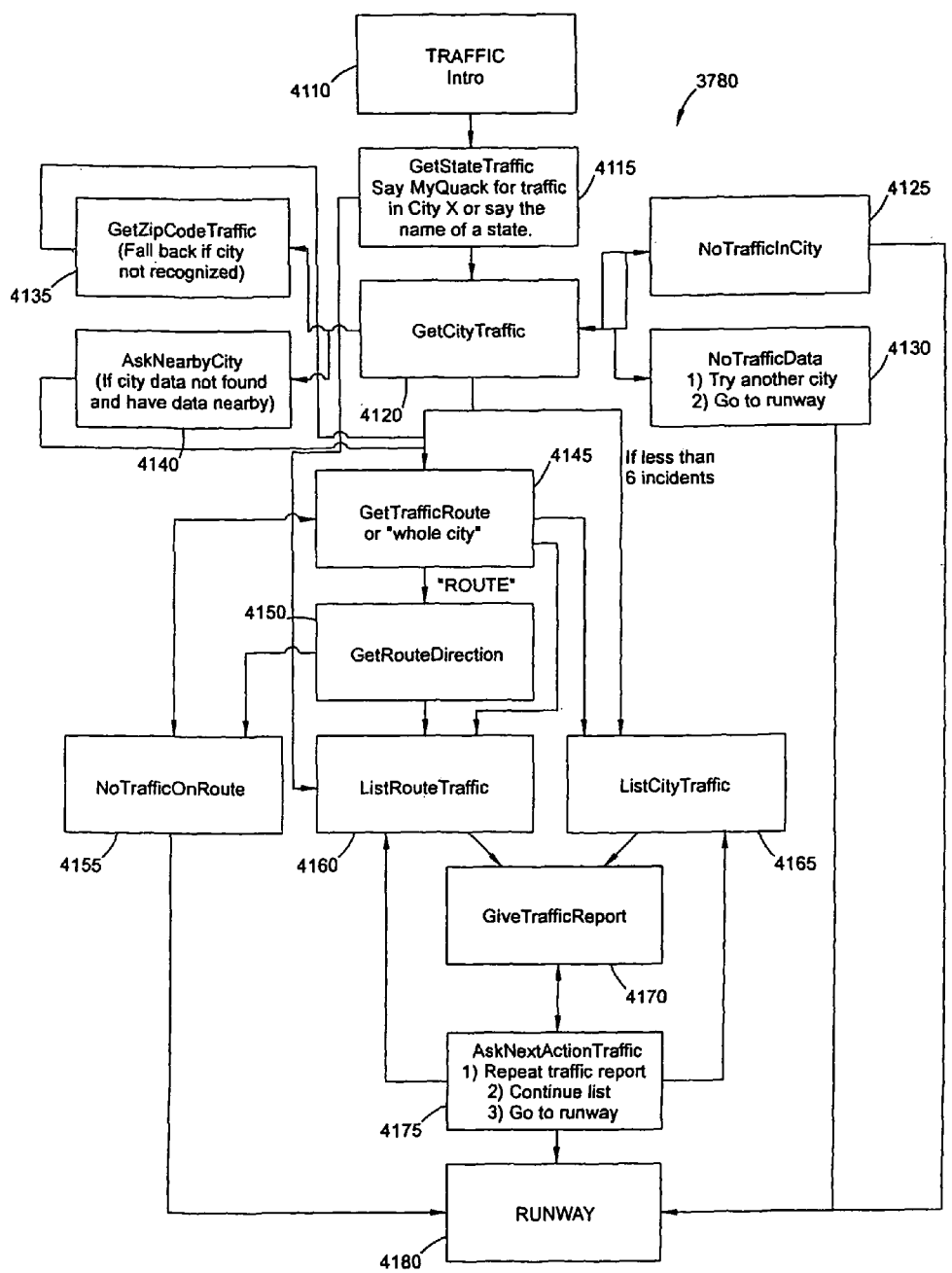
FIG. 41 is a flow diagram illustrating a fourth exemplary subsystem of the exemplary dialog map of FIG. 37.

Referring now to FIG. 41, a traffic subsystem is performed. At a block 4110, voice portal 10 plays an introduction to the traffic domain of interest. After block 4110, control passes to a block 4115 in which voice portal 10 obtains location information for user or personalized information on the user. After block 4115, control passes to a block 4120 in which voice portal 10 obtains city traffic information. If no city traffic information is possible, control passes to a block 4135 in which ZIP code traffic information is obtained. ZIP code traffic information is a fallback if a city is not recognized by voice portal 10. If the city data is not found and data is contained for locations nearby, control passes to a block 4140 in which voice portal 10 asks for a nearby city. If at block 4120 no traffic events are reportable, control passes to a block 4125 in which the user is told no traffic is reportable in the city. If at block 4120 no traffic data is available, control passes to a block 4130 in which the user is provided the option to try another city or to go to the runway for selection of a new domain of interest.

After block 4120, control passes to a block 4145 in which voice portal 10 requests a specific traffic route or the "whole city." After block 4145, control passes to a block 4150 in which voice portal 10 obtains route direction information. After block 4150, control passes to a block 4155 if there is no traffic on the route to report. At block 4155, the user is given the option to select a new traffic route or the "whole city" as well as going to the runway and selecting a new domain of interest. If route traffic information is available, after block 4150, control passes to a block 4160 in which voice portal 10 lists the route traffic for the selected route. If the user has selected "whole city" in block 4145, control passes a block 4165 in which voice portal 10 lists city traffic information.

After block 4160 and block 4165, control passes to a block 4170 in which voice portal 10 provides the desired traffic report to the user. After block 4170, control passes to a block 4175 in which voice portal 10 asks for the next action to be performed in the traffic domain of interest. In an exemplary embodiment, next actions may include repeat the traffic report, continue the list of traffic information, and going to the runway. After the user has made the selection at block 4175, control passes to an appropriate block. For example, if the user selects to repeat the traffic report, control passes to a block 4170. If the user selects the continue list option, control passes to either block 4160 or block 4165, depending on the selection of a specific traffic route or the "whole city" made at block 4145. If the user selects go to runway, the control passes to a block 4180 which corresponds to the runway described with reference to FIG. 37 as block 3750.

Figure 42:
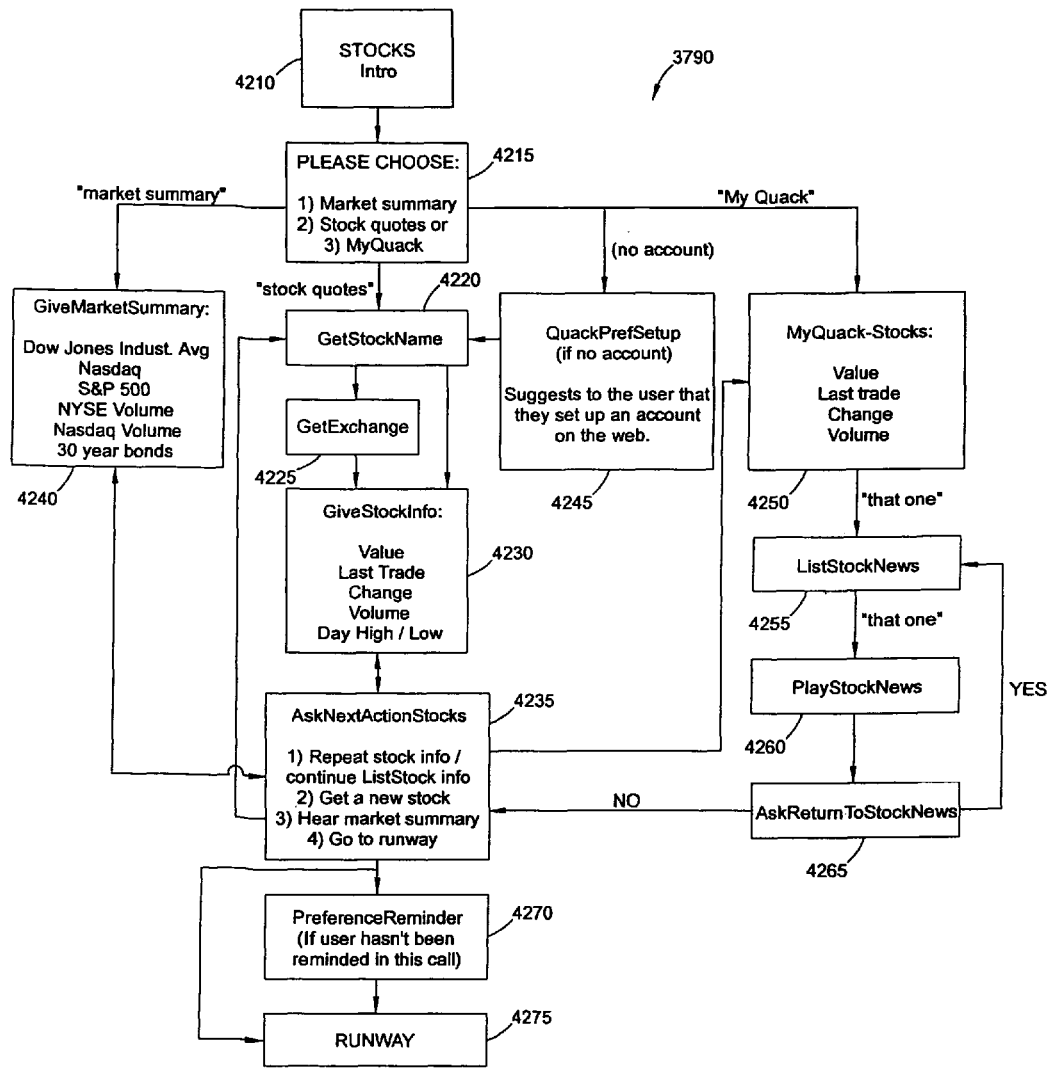
FIG. 42 is a flow diagram illustrating a fifth exemplary subsystem of the exemplary dialog map of FIG. 37.

Referring now to FIG. 42, a stocks subsystem is performed. At a block 4210, voice portal 10 plays an introduction to the stocks domain of interest. After block 4210, control passes to a block 4215 in which voice portal 10 provides the user with the option of selecting for a market summary, stock quotes, or a personalized listing called "MyQuack." If the user selects market summary, control passes to a block 4240 in which a market summary is provided for a variety of markets, such as, the Dow Jones Industrial Average, NASDAQ, S&P 500, NYSE Volume, NASDAQ Volume, and 30 year bonds. If the user selects stock quotes, control passes to a block 4220 in which voice portal 10 obtains a specific stock name from the user. After block 4220, control passes to a block 4225 in which voice portal 10 obtains the stock exchange corresponding to the stock name provided in block 4220. After the exchange is identified, control passes to a block 4230 in which voice portal 10 provides stock information, such as, value, last trade, change, volume, and day high/low.

After block 4230, control passes to a block 4235 in which voice portal 10 asks for the next action to be performed in the stocks domain of interest. In an exemplary embodiment, the user may select to repeat stock information/continue listing stock information, get a new stock, hear market summary, or go to runway. Depending on the selection made by the user at block 4235, control passes to block 4240 for market summary, block 4220 for a new stock name, a block 4250 for a personalized my quack stock, or a block 4275 for the runway. Before block 4275, control may pass to a block 4270 in which voice portal 10 provides a preference reminder to the user that preferences may be set to obtain personalized information in a quicker fashion. If the user has already been reminded in this call about preferences, control passes directly to block 4275.

If in block 4215 the user selects "MyQuack" control passes to a block 4245 if no account information is identified and block 4250 if account information is identified. In block 4245 a preference setup and account information is established. A suggestion may be made to the user that an account be setup on the Web. At block 4250, personalized stock information is provided, such as, value, last trade, change, and volume. During operation of block 4250, the user may identify a specific stock by saying, for example, "that one" during the playing of information on the particular stock. If such a selection is made, control passes to a block 4255 in which stock news options are listed for the particular stock. After the user has selected a particular type of stock news from the list in block 4255, control passes to a block 4260 in which voice portal 10 plays the selected stock news. After block 4260, control passes to block 4265 in which voice portal 10 asks the user whether to return to get list of stock news (block 4255) or exist stock news. If the user selects to exist the stock news, control passes to block 4235 in which the next action for stocks is requested. Once the user has completed the stocks domain of interest, control passes to block 4275 corresponding to the runway described with reference to FIG. 37 as block 3750.

Figure 43:
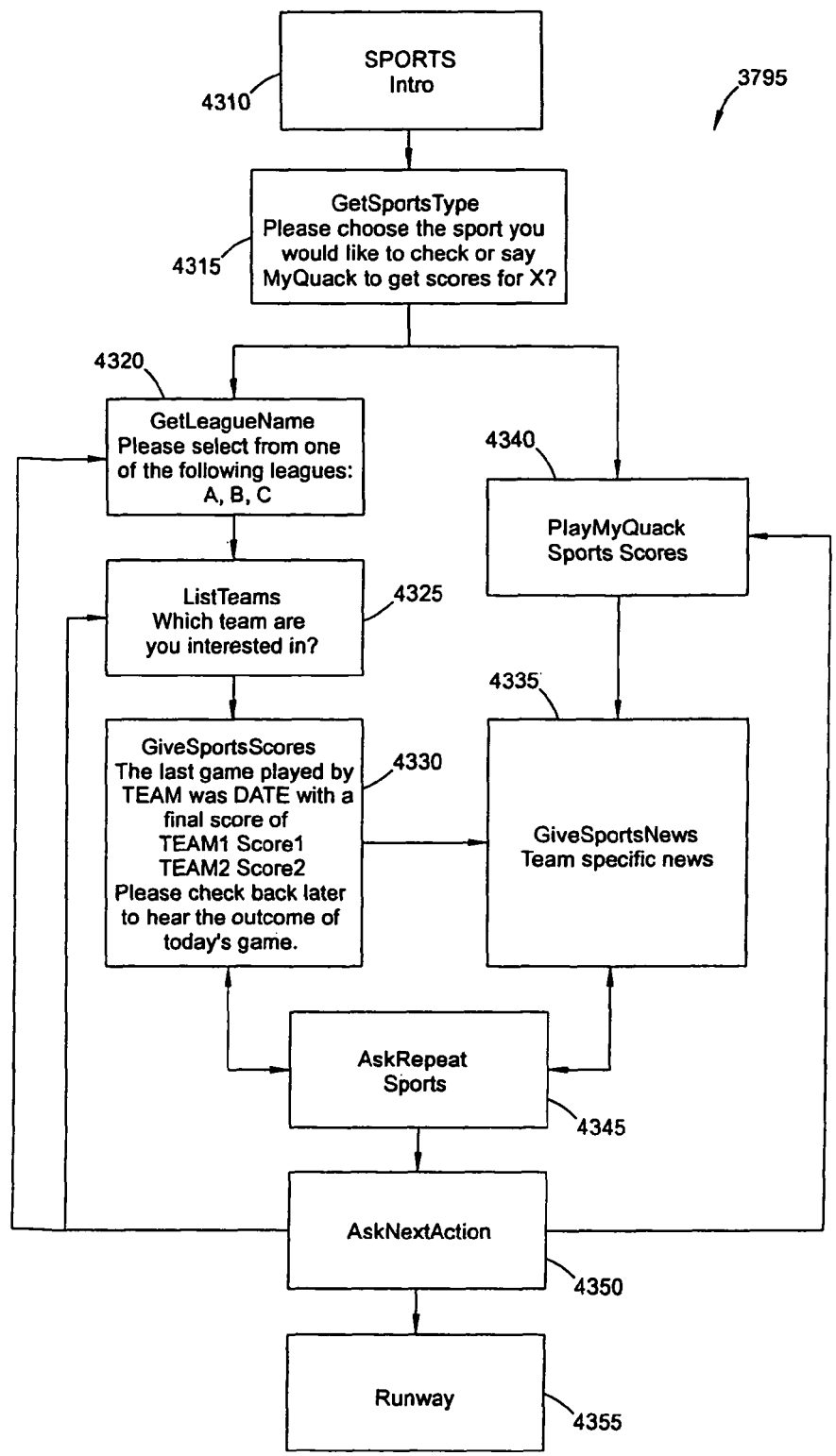
FIG. 43 is a flow diagram illustrating a sixth exemplary subsystem of the exemplary dialog map of FIG. 37.

Referring now to FIG. 43, a sports subsystem is performed. At a block 4310, voice portal 10 plays an introduction to the sports domain of interest. After block 4310, control passes to a block 4315 in which voice portal 10 obtains the type of sports desired by the user or the user may say "MyQuack" to get scores for a personalized sports type. If the user chooses a particular sport, control passes to a block 4320 in which voice portal 10 obtains the league name of a selected sport from a list. For example, voice portal 10 may list "NFL, NBA, NHL, and Major League Baseball." After the user has made a selection of the league name, control passes to a block 4325 in which voice portal 10 obtains the specific team the user is interested in. After block 4325, control passes to a block 4330 in which sports scores are provided. For example, voice portal 10 may say, "The last game played by TEAM was DATE with a final score of TEAM 1, SCORE 1, TEAM 2, SCORE 2."

If in block 4315 the user has selected "MyQuack," control passes to block 4340. At block 4340, voice portal 10 provides sports scores for the personalized MyQuack sports teams. After block 4340, control passes to a block 4335 in which voice portal 10 provides sports news for teams specific news. After block 4330 and block 4335 control passes to a block 4345 in which voice portal 10 asks whether the user would like the sports information just heard to be repeated. If the user responds affirmatively, voice portal 10 returns to repeat the information provided. If the user does not want the information repeated, control passes to a block 4350 in which voice portal 10 asks for the next action to be performed in the sports domain of interest. After block 4350, control passes to block 4320 to select a league name, block 4340 to provide my quack sports scores, or to a block 4355 for runway information. A block 4355 corresponds to the runway described further with reference to FIG. 37 as block 3750. Each subsystem of FIGS. 40-43 is shown by way of example only.

While the embodiments illustrated in the FIGURES and described above are presently preferred, it should be understood that these embodiments are offered by way of example only. Other embodiments may include various data structures for simplifying access to the Internet via voice portals. The invention is not limited to a particular embodiment, but extends to various modifications, combinations, and permutations that nevertheless fall within the scope and spirit of the appended claims.

What is claimed is:

1. A computer-implemented method of operating an interactive user operated Internet voice portal having established multiple predetermined vertical domains of interest and a hierarchy of attributes within each vertical domain of interest from top to bottom, the method comprising operations of:
    responsive to a user placing a telephone call to the voice portal, a processor identifying the user and obtaining user selection of a vertical domain of interest;
    a processor performing funneling operations comprising:
        (a) building a vocabulary set containing top-level attribute values appropriate to the selected vertical domain of interest;
        (b) querying the user to choose a top-level attribute value, applying speech recognition to user responses where recognized answers are limited to contents of the vocabulary set;
        (c) until a bottom level attribute value is chosen, repeatedly performing operations comprising: (1) building an updated vocabulary set containing attribute values appropriate to the latest chosen attribute value, and (2) querying the user to choose a next-lower-level attribute value and applying speech recognition to user responses where recognized answers are limited to contents of the updated vocabulary set;
    responsive to a bottom level attribute being chosen, a processor conducting an Internet search of HTML non-voice sources for prescribed types of information pertaining to the chosen bottom-level attribute value and, unassisted by voice extensions and enhancements to said HTML, audibly providing resultant information to the user via the telephone call.

2. The computer-implemented method of claim 1, where:
    the funneling operation is performed if the voice portal has not previously stored any attribute value preferences of the user for the selected vertical domain of interest;
    the funneling operation is additionally performed if the voice portal has previously stored any attribute value preferences of the user for the selected vertical domain of interest, but the user has opted to override the stored attribute value preferences.

3. The method of claim 1, where:
    the funneling operation is only performed if the voice portal has not previously stored any attribute value preferences of the user for the selected vertical domain of interest;
    the operations further comprise, if the voice portal has previously stored any attribute value preferences of the user for the selected vertical domain of interest, instead of the funneling operation, a processor performing an operation of conducting an Internet search for prescribed types of information pertaining to the stored attribute value preferences.

* * * * *